(12) United States Patent
Lee et al.

(10) Patent No.: US 12,414,150 B2
(45) Date of Patent: Sep. 9, 2025

(54) ELECTRONIC DEVICE AND METHOD FOR SCHEDULING OF DATA LINK

(71) Applicant: SAMSUNG ELECTRONICS CO., LTD., Suwon-si (KR)

(72) Inventors: Soonho Lee, Suwon-si (KR); Buseop Jung, Suwon-si (KR); Beomjip Kim, Suwon-si (KR); Hyejung Bang, Suwon-si (KR); Dooho Lee, Suwon-si (KR); Sunkee Lee, Suwon-si (KR); Wonjun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 17/967,849

(22) Filed: Oct. 17, 2022

(65) Prior Publication Data

US 2023/0063981 A1    Mar. 2, 2023

Related U.S. Application Data

(63) Continuation of application No. PCT/KR2022/010449, filed on Jul. 23, 2022.

(30) Foreign Application Priority Data

Aug. 10, 2021  (KR) .................. 10-2021-0105114

(51) Int. Cl.
*H04W 72/12* (2023.01)
*H04L 69/18* (2022.01)
(Continued)

(52) U.S. Cl.
CPC .......... *H04W 72/569* (2023.01); *H04L 69/18* (2013.01); *H04W 80/00* (2013.01)

(58) Field of Classification Search
CPC ... H04W 72/569; H04W 80/00; H04W 72/21; H04W 84/12; H04W 72/563;
(Continued)

(56) References Cited

U.S. PATENT DOCUMENTS 9,516,540 B2    12/2016  Emmanuel et al.
10,004,095 B2    6/2018  Jung
(Continued)

FOREIGN PATENT DOCUMENTS

KR    10-2018-0005471    1/2018
KR    10-2018-0054694    5/2018
(Continued)

OTHER PUBLICATIONS

Neighbor Awareness Networking Specification Addendum version 3.0.3, 2019, pp. 1-50.
(Continued)

*Primary Examiner* — Lan-Huong Truong
(74) *Attorney, Agent, or Firm* — Nixon & Vanderhye P.C.

(57) ABSTRACT

An electronic device according to various example embodiments includes: at least one wireless communication module comprising wireless communication circuitry configured to support a first communication protocol and a second communication protocol, at least one processor operatively connected to the wireless communication module, and a memory electrically connected to the processor and configured to store instructions executable by the processor. When the instructions are executed by the processor, the processor may, using the wireless communication module, set a schedule for a first data link that uses a first frequency band as the second communication protocol with a first external electronic device, set a schedule for a second data link that uses a second frequency band as the second communication protocol with a second external electronic device, and
(Continued)

change the second data link to a third data link that uses a third frequency band and perform communication with the second external electronic device, based on the third frequency band being available due to a termination of the first data link.

19 Claims, 43 Drawing Sheets

(51) Int. Cl.
*H04W 72/566* (2023.01)
*H04W 80/00* (2009.01)

(58) Field of Classification Search
CPC ..... H04W 72/51; H04W 76/20; H04W 84/18; H04W 88/06; H04L 69/18; Y02D 30/70
See application file for complete search history.

(56) References Cited

U.S. PATENT DOCUMENTS

| | | |
|---|---|---|
| 2015/0103740 A1 | 4/2015 | Emmanuel et al. |
| 2016/0286574 A1 | 9/2016 | Abraham et al. |
| 2016/0350973 A1* | 12/2016 | Shapira .................. G06F 3/011 |
| 2017/0311341 A1 | 10/2017 | Patil et al. |
| 2017/0325230 A1 | 11/2017 | Abraham et al. |
| 2018/0014341 A1 | 1/2018 | Jung |
| 2019/0124660 A1* | 4/2019 | Huang .................. H04W 76/14 |
| 2020/0008095 A1* | 1/2020 | Patil ...................... H04W 12/03 |
| 2021/0185746 A1 | 6/2021 | Mullati et al. |
| 2024/0057062 A1* | 2/2024 | Homchaudhuri ..... H04W 72/52 |

FOREIGN PATENT DOCUMENTS

| | | |
|---|---|---|
| KR | 10-1983362 | 5/2019 |
| KR | 10-2019-0124534 | 11/2019 |
| KR | 10-2021-0051274 | 5/2021 |

OTHER PUBLICATIONS

Neighbor Awareness Networking Technical Specification Version 2.0 r6, 2017, pp. 1-220.

Search Report dated Oct. 19, 2022 issued in International Patent Application No. PCT/KR2022/010449.

Extended European Search Report dated Sep. 4, 2024 issued in European Patent Application No. 22856042.1.

* cited by examiner

FIG. 14D

ELECTRONIC DEVICE AND METHOD FOR SCHEDULING OF DATA LINK

CROSS-REFERENCE TO RELATED APPLICATIONS

This application is a continuation of International Application No. PCT/KR2022/010449 designating the United States, filed on Jul. 23, 2022, in the Korean Intellectual Property Receiving Office and claiming priority to Korean Patent Application No. 10-2021-0105114, filed on Aug. 10, 2021, in the Korean Intellectual Property Office, the disclosures of which are incorporated by reference herein in their entireties.

BACKGROUND

1. Field

The disclosure relates to an electronic device and a method of scheduling a data link.

2. Description of Related Art

Recently, various proximity services using low-power discovery technology employing short-range communication technology are being actively developed. For example, a proximity communication service that enables neighboring electronic devices to quickly exchange data through a proximity network is being developed.

Recently, in the wireless fidelity (Wi-Fi) standard, low-power discovery technology called neighbor awareness networking (NAN) is being developed, and a short-range proximity service based on NAN is being actively developed.

An electronic device may form a data link with each of external electronic devices (e.g., a neighbor awareness networking (NAN) supporting device, and an access point (AP)). A data link may be set between an electronic device and external electronic devices according to device performance (e.g., support for various frequency bands, and support for real simultaneous dual band (RSDB)). If a data link between the electronic device and an arbitrary external electronic device is terminated, a data link formed between the electronic device and each of external electronic devices other than the arbitrary external electronic device may be maintained without a change. If an available frequency band is present due to a termination of the data link, it may be advantageous in terms of performance to perform communication using a data link that uses the available frequency band. Accordingly, the electronic device may need to schedule a data link by efficiently using multiple frequency bands according to circumstances.

SUMMARY

Embodiments of the disclosure may provide a technology of scheduling a data link using multiple frequency bands in response to a change in an available frequency band.

An electronic device according to various example embodiments includes: at least one wireless communication module including wireless communication circuitry configured to support a first communication protocol and a second communication protocol, at least one processor operatively connected to the wireless communication module, and a memory electrically connected to the processor and configured to store instructions executable by the processor. When the instructions are executed by the processor, the processor may be configured to: using the wireless communication module, set a schedule for a first data link that uses a first frequency band as the second communication protocol with a first external electronic device, set a schedule for a second data link that uses a second frequency band as the second communication protocol with a second external electronic device, change the second data link to a third data link that uses a third frequency band and perform communication with the second external electronic device based on the third frequency band being available due to a termination of the first data link.

An electronic device according to various example embodiments includes: at least one wireless communication module comprising wireless communication circuitry configured to support a first communication protocol and a second communication protocol, at least one processor operatively connected to the wireless communication module, and a memory electrically connected to the processor and configured to store instructions executable by the processor. When the instructions are executed by the processor, the processor may be configured to: using the wireless communication module, set a schedule for a first data link that uses a first frequency band as the first communication protocol with a first external electronic device, set a schedule for a second data link that uses both the first frequency band and a second frequency band as the second communication protocol with a second external electronic device, and change the second data link to a third data link that uses an interval of a frequency band having a lower priority between the first frequency band and the second frequency band as an interval of a third frequency band and perform communication with the second external electronic device based on an interval of a frequency band used in the second data link being changeable due to a termination of the first data link.

A method of operating an electronic device according to various example embodiments includes: setting a schedule for a first data link that uses a first frequency band as a second communication protocol with a first external electronic device, setting a schedule for a second data link that uses a second frequency band as the second communication protocol with a second external electronic device, and changing the second data link to a third data link that uses a third frequency band and performing communication with the second external electronic device based on the third frequency band being available due to a termination of the first data link.

An electronic device according to various example embodiments includes: at least one wireless communication module comprising wireless communication circuitry configured to support a first communication protocol and a second communication protocol, at least one processor operatively connected to the wireless communication module, and a memory electrically connected to the processor and configured to store instructions executable by the processor. When the instructions are executed by the processor, the processor may be configured to: using the wireless communication module, set a schedule for a first data link that uses a first frequency band as the first communication protocol with a first external electronic device, set a schedule for a second data link that uses a second frequency band as the second communication protocol with a second external electronic device, and change the second data link to a third data link that uses a third frequency band and perform communication with the second external electronic device based on the third frequency band being available due to a termination of the first data link.

According to various example embodiments, an existing data link may be changed to a new data link through scheduling of a data link using multiple frequency bands according to a situation in which an available frequency band is changed, and communication may be performed, and thus it is possible to enhance communication performance by efficiently using the multiple frequency bands.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 14D is a diagram illustrating slots of newly set data links of FIGS. 14A, 14B and 14C according to various embodiments;

DETAILED DESCRIPTION

Figure 1:
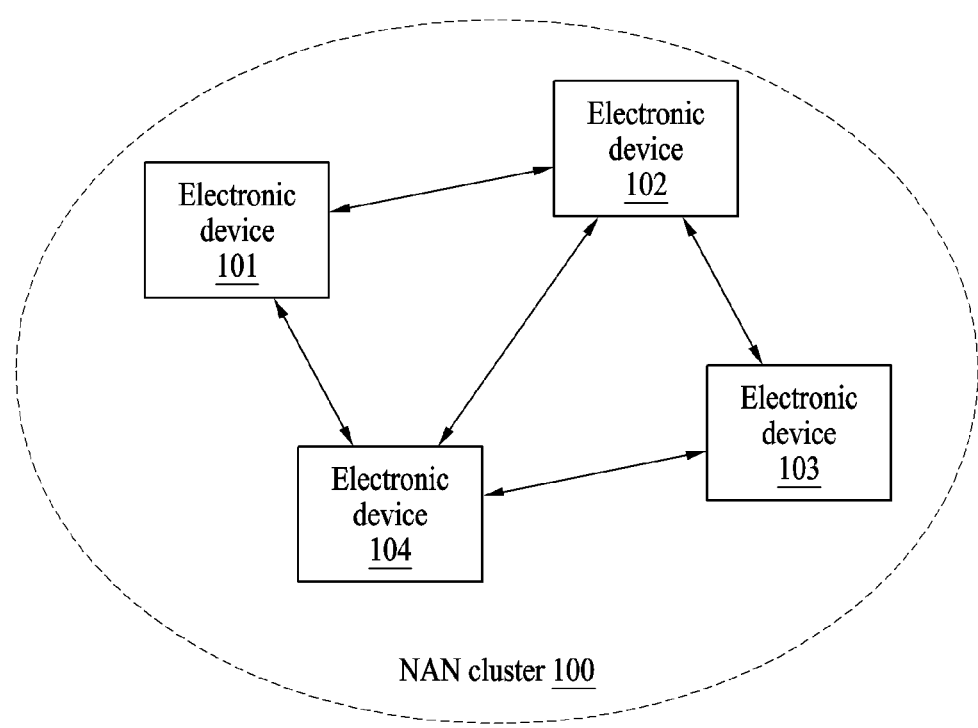
FIG. 1 is a diagram illustrating an example neighbor awareness networking (NAN) cluster according to various embodiments.

Hereinafter, various example embodiments will be described in greater detail with reference to the accompanying drawings. When describing the example embodiments with reference to the accompanying drawings, like reference numerals refer to like elements and a repeated description related thereto may not be provided.

FIG. 1 is a diagram illustrating an example neighbor awareness networking (NAN) cluster according to various embodiments.

Referring to FIG. 1, according to various example embodiments, a NAN cluster 100 may include at least one device (e.g., an electronic device 101, an electronic device 102, an electronic device 103 and/or an electronic device 104 of FIG. 1). Within the NAN cluster 100, the electronic devices 101, 102, 103, and/or 104 may communicate with each other through a NAN. The NAN cluster 100 may refer to a set of the electronic devices 101, 102, 103, and/or 104 that configure a proximity network to transmit and receive data between the electronic devices 101, 102, 103, and/or 104.

According to various example embodiments, the electronic device 101, 102, 103, or 104 may refer to a device that supports NAN, which is a low-power discovery technology, and may also be referred to as a "NAN device (or a NAN terminal)". In addition, the electronic device 101, 102, 103, or 104 may operate in a frequency band of 2.4 GHz, 5 GHz, and/or 6 GHz, and may exchange signals based on the institute of electrical and electronic engineers (IEEE) 802.11 protocol (e.g., 802.11 a/b/g/n/ac/ax/be). The electronic devices 101, 102, 103, and/or 104 may exchange signals in a unicast, broadcast, and/or multicast manner.

According to various example embodiments, the electronic devices 101, 102, 103, and/or 104 may configure one NAN cluster 100 by transmitting and receiving beacons (e.g., discovery beacons). The electronic device 101, 102, 103, or 104 in the NAN cluster 100 may perform time and channel synchronization.

According to various example embodiments, the discovery beacon may refer to a beacon signal for discovering an electronic device for forming a cluster in order to form a cluster (e.g., the NAN cluster 100) for a proximity network. The discovery beacon may be a signal transmitted to allow another electronic device that failed to join the NAN cluster 100 to discover the NAN cluster 100. For example, the discovery beacon may be a signal to inform of the existence of the NAN cluster 100, and an electronic device that does not join the NAN cluster 100 may perform a passive scan to receive the discovery beacon, thereby discovering and joining the NAN cluster 100.

According to various example embodiments, the discovery beacon may include information necessary for synchronization with the NAN cluster 100. For example, the discovery beacon may include at least one of a frame control (FC) field indicating a function of a signal (e.g., a beacon), a broadcast address, a media access control (MAC) address of a transmission electronic device, a cluster identifier (ID), a sequence control field, a time stamp for a beacon frame, a beacon interval indicating a transmission interval of the discovery beacon, or capability information on a transmission electronic device. In addition, the discovery beacon may further include an information element related to at least one proximity network (or cluster) (e.g., the NAN cluster 100). Proximity network-related information may be referred to as "attribute information".

According to various example embodiments, the electronic devices 101, 102, 103, and/or 104 may transmit and receive signals (e.g., synchronization beacons, service discovery frames (SDFs) or NAN action frames (NAFs)) within a synchronized time duration (e.g., a discovery window (DW)). For example, the electronic devices 101, 102, 103, and/or 104 may have time clocks synchronized with each other, and transmit and receive beacons and SDFs to and from each other in DWs synchronized in the same time.

According to various example embodiments, the synchronization beacon may indicate a signal for maintaining synchronization between the synchronized electronic devices 101, 102, 103, and/or 104 in the NAN cluster 100. The synchronization beacon may be periodically transmitted and received in each DW in order to continuously maintain the time and channel synchronization of the electronic devices 101, 102, 103, and/or 104 in the NAN cluster 100. The synchronization beacon may be transmitted by any electronic device among the electronic devices 101, 102, 103, and 104 in the cluster 100. An electronic device that transmits a synchronization beacon may include or may be referred to as an anchor master device defined in the NAN standard, a master device, or a non-master sync device.

According to various example embodiments, the synchronization beacon may include information necessary for synchronization of the electronic devices 101, 102, 103, and 104 in the NAN cluster 100. For example, the synchronization beacon may include at least one of an FC field indicating a function of a signal (e.g., a beacon), a broadcast address, a MAC address of a transmission electronic device, a cluster ID, a sequence control field, a time stamp for a beacon frame, a beacon interval indicating an interval between start points of a DW, and capability information on the transmission electronic device. The synchronization beacon may further include an information element related to at least one proximity network (or cluster) (e.g., the NAN cluster 100). Proximity network-related information may include content for a service provided through the proximity network.

According to various example embodiments, the SDF may be a signal to exchange data through a proximity network (or cluster) (e.g., the NAN cluster 100). The SDF may indicate a vendor-specific public action frame and may include various fields. For example, the SDF may include a category or an action field, and may further include at least one piece of proximity network (e.g., the NAN cluster 100)-related information According to various example embodiments, the electronic device 101, 102, 103, or 104 included in the NAN cluster 100 may transmit and receive a NAF within the DW. For example, the NAF may include at least one of information for setup of a NAN data path (NDP), information for schedule update, and information to perform NAN ranging (e.g., NAN ranging in a fine timing measurement (FTM) period), to perform data communication in an interval between DWs. The NAF may be used to control a schedule of radio resources for coexistence of a NAN operation and a non-NAN operation (e.g., wireless fidelity (Wi-Fi) direct, mesh, independent basic service set (IBSS), wireless local area network (WLAN), Bluetooth™, or near-field communication (NFC)). The NAF may include time and channel information available for NAN communication.

Figure 2:
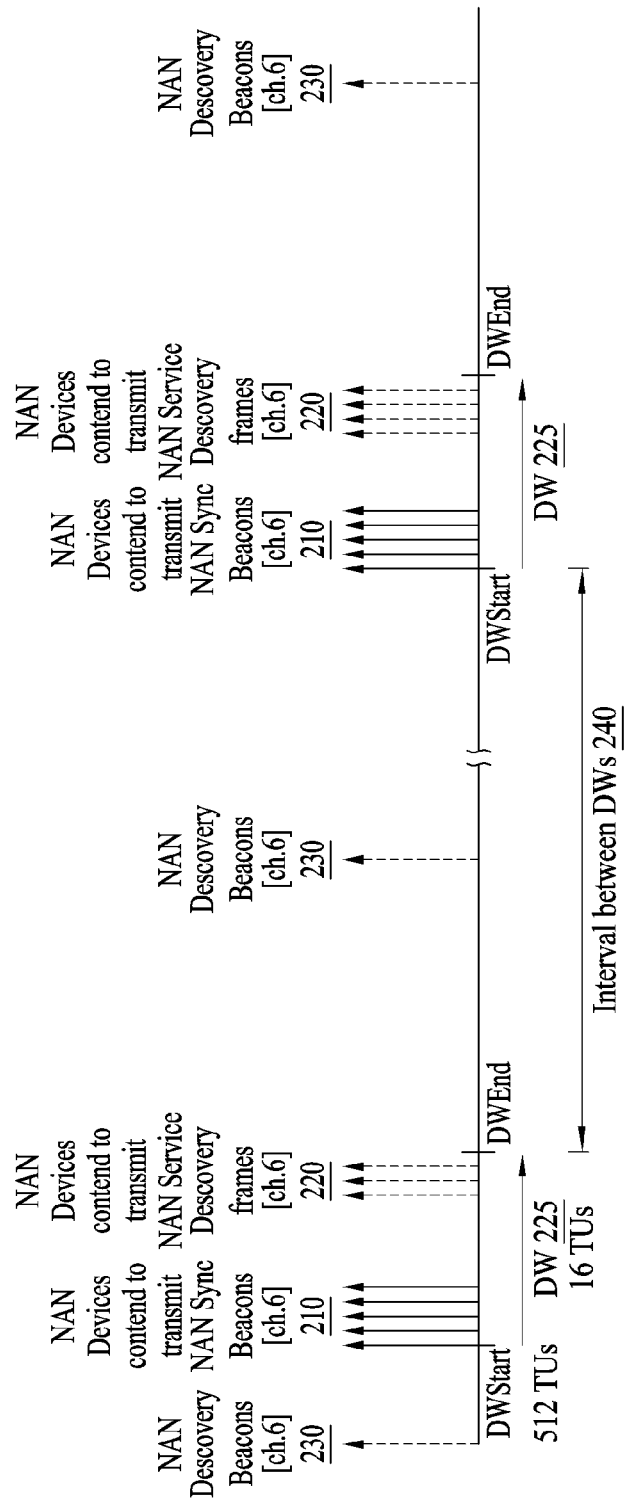
FIG. 2 is a diagram illustrating an example of communication based on a NAN protocol according to various embodiments.

FIG. 2 is a diagram illustrating an example of communication based on a NAN protocol according to various embodiments.

FIG. 2 illustrates an example of a DW, and an electronic device (e.g., the electronic device 101, 102, 103, or 104 of FIG. 1) included in one cluster (e.g., the NAN cluster 100 of FIG. 1) may perform discovery, synchronization, and data exchange operations according to the NAN protocol. In FIG. 2, it may be assumed that communication is performed through a specific channel (e.g., channel 6 (CH6)) based on the NAN standard.

According to various example embodiments, the electronic device 101, 102, 103, or 104 may broadcast a discovery beacon 230 for discovering another electronic device 101, 102, 103, or 104 in a predetermined first period (e.g., about 100 milliseconds (msec)), and may perform scanning in a predetermined second cycle (e.g., about 10 msec), to receive a discovery beacon 230 broadcast from the other electronic device 101, 102, 103, or 104. One electronic device among the electronic devices 101, 102, 103, and 104 may recognize at least one of the other electronic devices located near the one electronic device, based on the discovery beacon 230 received through scanning, and may perform time and channel synchronization with the at least one recognized electronic device. Accordingly, one NAN cluster 100 may be configured.

According to various example embodiments, the time and channel synchronization may be performed based on a time and channel of an electronic device having the highest master preference in the NAN cluster 100. For example, the electronic device 101, 102, 103, or 104 in the NAN cluster 100 configured through discovery may exchange signals regarding master preference information indicating a preference for operating as an anchor master, and an electronic device having the highest master preference may be determined to be an anchor master (or a master electronic device) through the exchanged signals. The anchor master may refer to a reference electronic device for time and channel synchronization of the electronic device 101, 102, 103, or 104 in the NAN cluster 100. The anchor master may vary depending on the master preference of the electronic device.

According to various example embodiments, the anchor master may transmit the discovery beacon 230 including information such as a cluster ID (e.g., an ID of the NAN cluster 100) in an interval 240 (e.g., an interval between DWs 225) other than the DW 225. Here, the discovery beacon 230 may be used to inform of the existence of the NAN cluster 100, and the anchor master may transmit the discovery beacon 230 to allow another electronic device that failed to join the NAN cluster 100 to discover the NAN cluster 100.

According to various example embodiments, the DW 225 may be an interval in which a corresponding electronic device is activated by switching from a sleep state, which corresponds to a power saving mode, to a wake-up state in order for the electronic devices 101, 102, 103, and/or 104 to exchange data with each other. For example, the DW 225 may be divided into time units (TUs) in milliseconds. The DW 225 for transmitting and receiving a synchronization beacon 210 and an SDF 220 may occupy "16" TUs, and may have a cycle (or period) that is repeated every "512" TUs.

According to various example embodiments, the electronic device 101, 102, 103, or 104 may operate in an active state during the DW 225, and may operate in a low-power state (e.g., a sleep state) during intervals other than the DW 225, thereby reducing power consumption. For example, the DW 225 may be a period of time (e.g., milliseconds) during which the electronic device 101, 102, 103, or 104 is in an active state (or a wake-up state) in which a large amount of power is consumed, and the electronic device 101, 102, 103, or 104 may remain in a sleep state in intervals other than the DW 225, so that low-power discovery may be possible. Accordingly, the electronic devices 101, 102, 103, and/or 104 may be simultaneously activated at the start time (e.g., a DW start) of the DW 225, which is time-synchronized, and may simultaneously switch to the sleep state at the end time (e.g., a DW end) of the DW 225.

According to various example embodiments, the electronic device 101, 102, 103, or 104 included in the NAN cluster 100 may transmit the synchronization beacon 210 within the DW 225 (e.g., a synchronized DW). In addition, the electronic device 101, 102, 103, or 104 may transmit the SDF 220 within the DW 225. The electronic device 101, 102, 103, or 104 may transmit the synchronization beacon 210 and the SDF 220 on a contention basis. For example, a transmission priority of the synchronization beacon 210 may be higher than that of the SDF 220.

Figure 3:
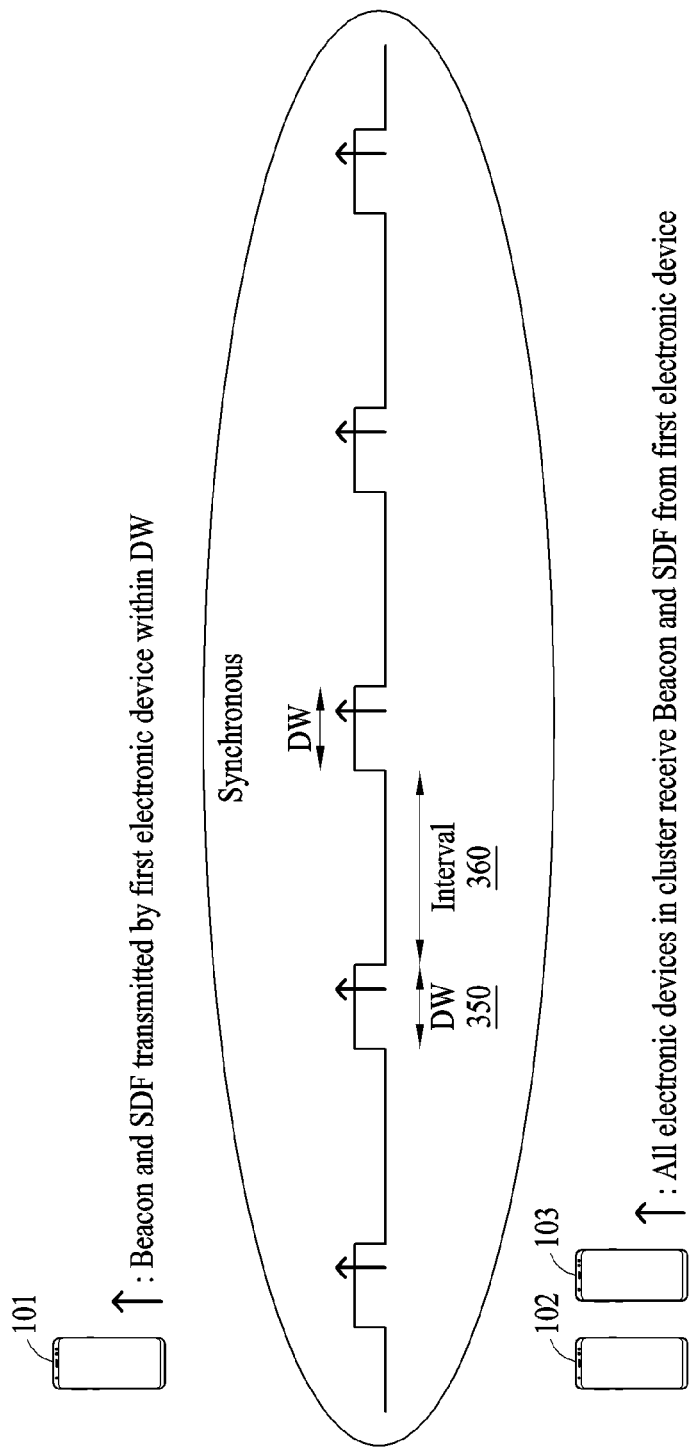
FIG. 3 is a diagram illustrating communication between electronic devices in a NAN cluster according to various embodiments.

FIG. 3 is a diagram illustrating example communication between electronic devices in a NAN cluster according to various embodiments.

FIG. 3 illustrates an operation in which the electronic devices 101, 102 and 103 (which may be referred to as devices 101 to 103) form one cluster (e.g., the NAN cluster 100 of FIG. 2) through a wireless short-range communication technology and communicate with each other. For convenience of description, it may be assumed that the electronic device 101 is a master electronic device in FIG. 3.

Referring to FIG. 3, according to various example embodiments, the electronic device 101 may transmit a beacon (e.g., a synchronization beacon), an SDF, or a NAF within a DW 350. For example, the electronic device 101 may broadcast a beacon, SDF, or NAF within the DW 350 that is repeated every predetermined interval (or period) (e.g., an interval 360).

According to various example embodiments, the electronic devices 102 and 103 may receive beacons, SDFs, or NAFs transmitted by the electronic device 101. For example, each of the electronic devices 102 and 103 may receive a beacon, SDF, or NAF broadcast from the electronic device 101 every DW 350.

According to various example embodiments, the beacon transmitted in the DW 350 may indicate a synchronization beacon and may include information for maintaining synchronization between the electronic devices 101 to 103. For example, when the electronic devices 101 to 103 are included in a cluster, a time clock may be synchronized with a master electronic device (e.g., the electronic device 101), so that the DW 350 may be simultaneously activated.

According to various example embodiments, the electronic devices 101 to 103 may remain in a sleep state in intervals (e.g., the interval 360) other than the DW 350, to reduce current consumption. For example, the electronic devices 101 to 103 may operate in a wake-up state only in the DW 350, based on the synchronized time clock, thereby reducing power consumption.

Figure 4:
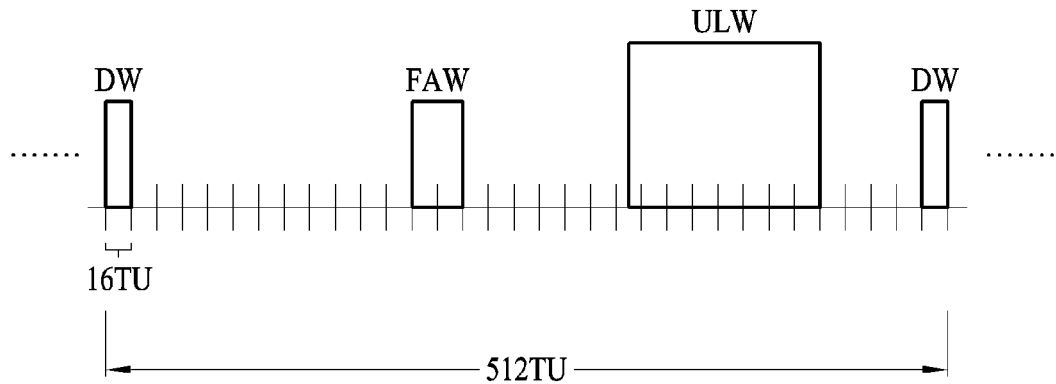
FIG. 4 is a diagram illustrating an example of communication based on a NAN protocol according to various embodiments.

FIG. 4 is a diagram illustrating an example of communication based on a NAN protocol according to various embodiments.

According to various example embodiments, a NAN data link (NDL) (or NDP) may be set up between the electronic devices 101, 102, 103, and/or 104. Unlike other communication schemes, the NDL may enable data communication with a fast setup time by operating on a connectionless basis. Through the NDL, flexible data communication with a plurality of electronic devices 101, 102, 103, and 104 may be possible. The electronic device 101, 102, 103, or 104 may define (e.g., set) a time slot (e.g., an active time slot) for data transmission using an interval between DWs without a separate connection between devices, and may perform additional communication (e.g., NAN communication and/or non-NAN communication) using the time slot. Here, data transmitted through a corresponding NDL may be encrypted with security.

According to various example embodiments, the electronic device 101, 102, 103, or 104 may perform an operation of controlling a schedule of resources (e.g., radio resources) for concurrence of a NAN operation (e.g., a NAN communication operation) and a non-NAN operation (e.g., a non-NAN communication operation). Each electronic device 101, 102, 103, or 104 may transfer schedule information including an available time and channel for a NAN function and a concurrent operation to neighboring devices.

According to various example embodiments, the electronic device 101, 102, 103, or 104 may set a schedule of a further available window (FAW) and an unaligned window (ULW) for a NAN operation and/or a non-NAN operation (e.g., WLAN, Wi-Fi direct, IBSS, mobile hotspot, and/or mesh) in an interval between DWs. The FAW may have radio resources allocated for a NAN operation and/or a non-NAN operation, and may be divided into TUs in milliseconds. The ULW may have radio resources allocated for a non-NAN operation, and may be divided in units of microseconds.

According to various example embodiments, the FAW may be set based on a NAN availability attribute (or NAN availability information), and the ULW may be set based on an unaligned schedule attribute (or unaligned schedule information). The NAN availability attribute and/or the unaligned schedule attribute may be included in at least one of management frames such as beacons (e.g., synchronization beacons), SDFs, and NAFs transmitted within a DW, and may be transmitted.

According to various example embodiments, a plurality of NAN availability attributes and/or unaligned schedule attributes may be included in the management frame. Various FAWs may be configured based on a combination of the plurality of NAN availability attributes, and various ULWs may be configured based on a combination of the plurality of unaligned schedule attributes.

According to various example embodiments, the FAW and the ULW may overlap each other. If the FAW and the ULW overlap each other, the ULW may have priority over the FAW.

According to various example embodiments, the NAN availability attribute may be an attribute (or information) for setting an FAW to allocate and use radio resources for a NAN operation and/or a non-NAN operation. The NAN availability attribute may include a plurality of fields (e.g., Attribute ID, Length, Sequence ID, Attribute Control, and Availability Entry List). Table 1 shows a format of the NAN availability attribute.

TABLE 1

| Field | Size (octets) | Value | Description |
| --- | --- | --- | --- |
| Attribute ID | 1 | 0x12 | Identifies the type of a NAN attribute. |
| Length | 2 | Variable | The length in octets of the fields following the length field in the attribute. |
| Sequence ID | 1 | Variable | An integer value that identifies the sequence of the advertised availability schedule. It is incremented by one when any schedule change flag in the Attribute Control field is set to 1; otherwise, it remains unchanged. |
| Attribute Control | 2 | Variable | Refer to Table 2. |
| Availability Entry List | Variable | Variable | Including one or more Availability Entries. The format of an Availability Entry List is defined in Table 3. |

Table 2 shows a format of an Attribute Control field included in the NAN availability attribute. The Attribute Control field may include a plurality of fields (e.g., Map ID, Committed Changed, Potential Changed, Public Availability Attribute Changed, NDC Attribute Changed, Reserved (Multicast Schedule Attribute Changed), Reserved (Multicast Schedule Change Attribute Changed), and Reserved).

TABLE 2

| Field | Size (bits) | Value | Description |
| --- | --- | --- | --- |
| Map ID | 4 | Variable | Identify the associated NAN Availability attribute |
| Committed Changed | 1 | 0 or 1 | Set to 1 if Committed Availability changed, compared with last schedule advertisement; or any Conditional Availability is included. Set to 0, otherwise. This setting shall be the same for all the maps in a frame |

TABLE 2-continued

| Field | Size (bits) | Value | Description |
|---|---|---|---|
| Potential Changed | 1 | 0 or 1 | Set to 1 if Potential Availability changed, compared with last schedule advertisement. Set to 0, otherwise. This setting shall be the same for all the maps in a frame |
| Public Availability Attribute Changed | 1 | 0 or 1 | Set to 1 if Public Availability attribute changed, compared with last schedule advertisement. Set to 0, otherwise. |
| NDC Attribute Changed | 1 | 0 or 1 | Set to 1 if NDC attribute changed, compared with last schedule advertisement. Set to 0, otherwise. |
| Reserved (Multicast Schedule Attribute Changed) | 1 | 0 or 1 | Set to 1 if Multicast Schedule attribute changed, compared with last schedule advertisement. Set to 0, otherwise. |
| Reserved (Multicast Schedule Change Attribute Changed) | 1 | 0 or 1 | Set to 1 if Multicast Schedule Change attribute changed, compared with last schedule advertisement. Set to 0, otherwise. |
| Reserved | 6 | Variable | Reserved |

Table 3 shows a format of the Availability Entry List field included in the NAN availability attribute. The Availability Entry List field may include a plurality of fields (e.g., Length, Entry Control, Time Bitmap Control, Time Bitmap Length, Time Bitmap, and Band/Channel Entry List).

TABLE 3

| Field | Size (octets) | Value | Description |
|---|---|---|---|
| Length | 2 | Variable | The length of the fields following the Length field in the attribute, in the number of octets. |
| Entry Control | 2 | Variable | See Table 4 for details. |
| Time Bitmap Control | 2 | Variable | Indicates the parameters associated with the subsequent Time Bitmap field. See Table 5 for details. |
| Time Bitmap Length | 1 | Variable | Indicate the length of the following Time Bitmap field, in the number of octets. |
| Time Bitmap | Variable | Variable | Each bit in the Time Bitmap corresponds to a time duration indicated by the value of Bit Duration subfield in the Time Bitmap Control field. When the bit is set to 1, the NAN Device indicates its availability for any NAN operations for the whole time duration associated with the bit. When the bit is set to 0, the NAN Device indicates unavailable for any NAN related operations for the time duration associated with the bit. |
| Band/Channel Entry List | Variable | Variable | The list of one or more Band or Channel Entries corresponding to this Availability Entry. See Table 6 for details. |

Table 4 shows a format of the Entry Control field included in the Availability Entry List field.

TABLE 4

| Number of Bit(s) | Information | Notes |
|---|---|---|
| 0-2 | Availability Type | b0: 1, Committed; 0, otherwise; b1: 1, Potential; 0, otherwise. b2: 1, Conditional; 0, otherwise. 000, 101, and 111 are reserved. Note - At least one of the three bits is set to 1 to be meaningful. |
| 3-4 | Usage Preference | An integer ranging from 0 to 3, which represents the preference of being available in the associated FAWs. The preference is higher when the value is set larger. Note: It does not apply to Committed or Conditional FAWs. |
| 5-7 | Utilization | Values 0-5 indicating proportion within the associated FAWs that are already utilized for other purposes quantized to 20%. Value 6 is reserved. Value 7 indicates unknown utilization. |

TABLE 4-continued

| Number of Bit(s) | Information | Notes |
|---|---|---|
| 8-11 | Rx Nss | Indicate the max number of spatial streams the NAN Device can receive during the associated FAWs. |
| 12 | Time Bitmap Present | 1: Time Bitmap Control, Time Bitmap Length, and Time Bitmap fields are present<br>0: Time Bitmap Control, Time Bitmap Length, and Time Bitmap are NOT present, and all NAN Slots are available |
| 13-15 | Reserved | Reserved |

Table 5 shows a format of the Time Bitmap Control field included in the Availability Entry List field. The Time Bitmap Control field may include a plurality of fields (e.g., Bit Duration, Period, Start Offset, and Reserved). The Bit Duration field may indicate how long a corresponding FAW lasts, and the Period field may indicate a length of a period in which the same FAW starts. The Start Offset field may indicate an amount of time from DW0 to a start of a corresponding FAW, and may determine a start time of an FAW.

TABLE 5

| Bit(s) | Field | Notes |
|---|---|---|
| 0-2 | Bit Duration | 0: 16 TU<br>1: 32 TU<br>2: 64 TU<br>3: 128 TU<br>4-7 reserved |
| 3-5 | Period | Indicate the repeat interval of the following bitmap. When set to 0, the indicated bitmap is not repeated.<br>When set to non-zero, the repeat interval is:<br>1: 128 TU<br>2: 256 TU<br>3: 512 TU<br>4: 1024 TU<br>5: 1048 TU<br>6: 4096 TU<br>7: 8192 TU |
| 6-14 | Start Offset | Start Offset is an integer. The time period specified by the Time Bitmap field starts at the 16 * Start Offset TUs after DW0. Note that the NAN Slots not covered by any Time Bitmap are assumed to be NOT available. |
| 15 | Reserved | Reserved |

Table 6 shows a Band/Channel Entries List field included in the Availability Entry List field. The Band/Channel Entries List field may include a plurality of fields (e.g., Type, Non-contiguous Bandwidth, Reserved, Number of Band or Channel Entries, and Band or Channel Entries). The Band or Channel Entries field may include one or more Band Entries and/or one or more Channel Entries.

TABLE 6

| Bit(s) | Field | Description |
|---|---|---|
| 0 | Type | Specifies whether the list refers to a set of indicated bands or a set of operating classes and channel entries.<br>0: The list is a set of indicated bands.<br>1: the list is a set of Operating Classes and channel entries |
| 1 | Non-contiguous Bandwidth | 0: Contiguous bandwidth<br>1: Non-contiguous bandwidth<br>This field is set to 1 if there is at least one Channel Entry indicates non-contiguous bandwidth. |
| 2-3 | Reserved | Reserved |
| 4-7 | Number of Band or Channel Entries | The number of band entries or channel entries in the list. Value 0 is reserved. |
| Variable | Band or Channel Entries | If the Type value is 0, including one or more Band Entries, as shown FIG. 55 in Neighbor Awareness NetworkingTechnical Specification. The value of each Band Entry is specified by the Table 9-63 Band ID field in IEEE Std. 802.11, which is also quoted in Table 7.<br>If the Type value is 1, including one or more Channel Entries as defined in Table 8. |

Table 7 shows a list of Band Entries. The list of Band Entries may be used to determine a frequency band (e.g., 2.4 GHz, 5 GHz, or 6 GHz) to be used in an FAW. For example, when Band IDs are 6 to 255 in the list of Band Entries, an FAW may use a frequency band of 6 GHz.

TABLE 7

| Band ID | Meaning |
| --- | --- |
| 0 | Reserved (for TV white spaces) |
| 1 | Sub-1 GHz (excluding TV white spaces) |
| 2 | 2.4 GHz |
| 3 | Reserved (for 3.6 GHz) |
| 4 | 4.9 and 5 GHz |
| 5 | Reserved (for 60 GHz) |
| 6-255 | Reserved |

Table 8 shows a format of a Channel Entry field included in the Band/Channel Entries List field. The Channel Entry field may include a plurality of fields (e.g., Operating Class, Channel Bitmap, Primary Channel Bitmap, and Auxiliary Channel Bitmap). The Channel Entry field may include channel information to be used for an FAW. The Channel Bitmap field may be used to designate a channel corresponding to a specific Operating Class, and the Primary Channel Bitmap field may be used to designate a specific channel.

According to various example embodiments, the unaligned schedule attribute may be an attribute (or information) for setting a ULW to allocate and use radio resources for a non-NAN operation. The unaligned schedule attribute may include a plurality of fields (e.g., Attribute ID, Length, Attribute Control, Starting Time, Duration, Period, Count Down, ULW Overwrite, ULW Control, and Band ID or Channel Entry).

Table 9 shows a format of the unaligned schedule attribute, Table 10 shows a format of the Attribute Control field included in the unaligned schedule attribute, and Table 11 shows a format of the ULW Overwrite field included in the unaligned schedule attribute. The Starting Time field may include a point in time at which a ULW starts (e.g., based on 1 TU in the NAN standard). The Duration field may include a time (e.g., in microseconds) for maintaining a ULW. The Period field may include time information regarding a length of a period in which a ULW starts. The Band ID or Channel Entry field may include information (e.g., frequency band information, Operating Class setting, and Primary Channel setting information) described in Tables 7 and 8.

TABLE 8

| Field | Size (octets) | Value | Description |
| --- | --- | --- | --- |
| Operating Class | 1 | Variable | Global Operating Class as defined in Table E-4 in Annex E of IEEE Std. 802.11. |
| Channel Bitmap | 2 | Variable | Channels are as defined in Annex E of IEEE Std. 802.11 for the given Operating Class. One or more channels are defined per Operating Class. Bit i of the Channel Bitmap is set to one when the ith Channel, in increasing numerical order, of the possible channels within the Operating Class is selected, and set to zero otherwise. |
| Primary Channel Bitmap | 1 | Variable | If exactly one bit is set in the Channel Bitmap subfield, then this field indicates the set of selected preferred primary channels. It is reserved otherwise. The detailed setting of Primary Channel Bitmap is shown in Table 93 in Neighbor Awareness NetworkingTechnical Specification. For 11ah, this field is a Channel Bitmap extension if the channel bandwidth is 1 MHz. Note: The field is reserved when the Operating Class field indicates a 20 MHz or 40 MHz bandwidth |
| Auxiliary Channel Bitmap | 2 | Variable | Present only if the Non-contiguous Bandwidth field is set to one. For an 80 + 80 MHz operating channel width, indicates the channel center frequency index of the 80 MHz channel of frequency segment 1 on which the device operates. Bit i of the Auxiliary Channel Bitmap is set to one when the ith Channel, in increasing numerical order, of the possible channels within the Operating Class is selected, and set to zero otherwise. When the whole field is set to zero, the field is ignored. |

TABLE 9

| Field | Size (octets) | Value | Description |
|---|---|---|---|
| Attribute ID | 1 | 0x17 | Identifies the type of NAN attribute. |
| Length | 2 | Variable | Length of the following fields in the attribute. |
| Attribute Control | 2 | Variable | Refer to Table 10. |
| Starting Time | 4 | Variable | The starting time of the first indicated ULW expressed in terms of the lower 4 bytes of the NAN TSF |
| Duration | 4 | Variable | The duration for each ULW in units of microseconds |
| Period | 4 | Variable | The time between consecutive ULWs in units of microseconds |
| Count Down | 1 | Variable | Number of indicated ULWs. The value of 255 indicates the ULWs does not end until next schedule update. The value of 0 indicates that the remaining ULWs are cancelled. |
| ULW Overwrite | 1 | Variable | See Table 11. |
| ULW Control | 0 or 1 | Variable | Optional field, when NOT present, indicating the NAN Device is NOT available on any channel during all ULWs, and all the following fields are not present; when present, see Table 12. |
| Band ID or Channel Entry | Variable | Variable | If present and the Type value is 00, a Band ID as specified by the Table 9-63 Band ID field in IEEE Std. 802.11, which is also quoted in Table 7. If present, and the Type value is 01 or 10, a Channel Entry as defined in Table 8. |

TABLE 10

| Field | Size (bits) | Value | Description |
|---|---|---|---|
| Schedule ID | 4 | Variable | Identify the associated Unaligned Schedule |
| Reserved | 4 | Variable | Reserved |
| Sequence ID | 8 | Variable | An integer value that identifies the sequence of the Unaligned Schedule. It is incremented by one when the schedule changes to indicate the freshness of the information contained in the corresponding attribute |

TABLE 11

| Field | Size (bits) | Value | Description |
|---|---|---|---|
| Overwrite All | 1 | Variable | Set to 1 when the unaligned schedule takes precedence over all NAN Availability attributes; set to 0, otherwise. |
| Map ID | 4 | Variable | When Overwrite All flag set to 0, identify the NAN Availability attribute, which the unaligned schedule takes precedence over; reserved otherwise. |
| Reserved | 3 | Variable | Reserved |

Table 12 shows a format of the ULW Control field included in the unaligned schedule attribute. The ULW Control field may include information on whether a ULW uses a channel or a frequency band. The ULW Control field may include a plurality of fields (e.g., Type, Channel Availability, Rx Nss, and Reserved).

TABLE 12

| Field | Size (bits) | Value | Description |
|---|---|---|---|
| Type | 2 | Variable | 00: Followed by a Band ID field 01: Followed by Channel Entry field without Auxiliary Channel 10: Followed by a Channel Entry field with Auxiliary Channel 11: Reserved |
| Channel Availability | 1 | Variable | 1: Indicate the NAN Device is available during the ULWs on the channel specified in the followed Channel Entry field; and the Channel Entry field only specifies one channel 0: Indicate the NAN Device cannot be available on the band or channels specified in the followed Band ID field or Channel Entry field |

TABLE 12-continued

| Field | Size (bits) | Value | Description |
|---|---|---|---|
| Rx Nss | 4 | Variable | Indicate the max number of spatial streams the NAN Device can receive during ULWs, if the Channel Availability subfield is set to 1; otherwise, reserved |
| Reserved | 1 | Variable | Reserved |

According to various example embodiments, the NAN availability attribute and the unaligned schedule attribute may configure a schedule for using a NAN operation and a non-NAN operation. The unaligned schedule attribute may be used to configure a schedule for use of a non-NAN operation. If the Channel Availability field included in the ULW Control field of the unaligned schedule attribute is set to "1", a NAN operation may be performed even within a schedule configured with the unaligned schedule attribute. For example, If NDL schedules (e.g., including an NDP schedule) are generated for each frequency band information, the electronic device 101, 102, 103, or 104 may generate an NDL schedule with only the NAN availability attribute, or an NDL schedule with the NAN availability attribute and the unaligned schedule attribute.

Figure 5:
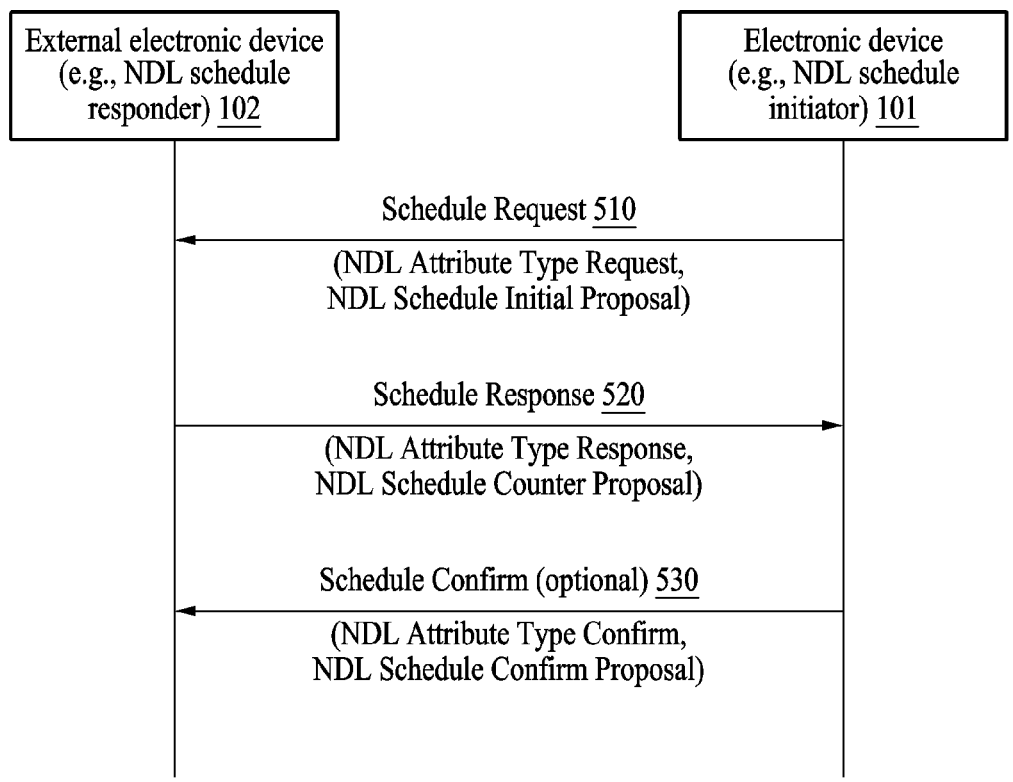
FIG. 5 is a signal flow diagram illustrating a NAN data link (NDL) scheduling operation according to various embodiments.

FIG. 5 is a signal flow diagram illustrating an example NDL scheduling operation according to various embodiments.

In FIG. 5, the NDL scheduling operation may include an operation of setting up a data link (e.g., an NDL) for a NAN operation between the electronic device 101 and the external electronic device 102, and an operation of updating the data link. In FIG. 5, it may be assumed that an electronic device 101 is an NDL schedule initiator and that an external electronic device 102 is an NDL schedule responder.

In operation 510, the electronic device 101 may transmit a schedule request to the external electronic device 102. In the schedule request, an NDL Attribute Type (e.g., an NDL Attribute Type subfield) may be set to "(Schedule) Request". The schedule request may include a schedule proposal (e.g., an NDL Schedule Initial Proposal). The schedule proposal may include one or more availability attributes and/or unaligned schedule attributes.

In operation 520, the external electronic device 102 may transmit a schedule response to the electronic device 101 in response to the schedule request. In the schedule response, an NDL Attribute Type (e.g., an NDL Attribute Type subfield) may be set to "(Schedule) Response". The schedule response may include one of "acceptance" (e.g., Accepted), "counter proposal" (or modification proposal) (e.g., Counter), or "rejection" (e.g., Rejected). The "acceptance" may indicate a case in which a schedule proposal is suitable for constructing an NDL schedule. The "rejection" may indicate a case in which the schedule proposal is invalid or in which it is impossible to use the schedule proposal due to a conflict with an NDP schedule proposed by the electronic device 102. The "counter proposal" may indicate a case of reconstituting the NDP schedule so as to be changed according to the standard through the schedule proposal. In the "counter proposal", the external electronic device 102 may analyze a schedule intended by the electronic device 101, modify the schedule according to the intention of the electronic device 101, and transmit a modification schedule proposal (e.g., an NDL Schedule Counter Proposal) to the electronic device 101 through the schedule response. The modification schedule proposal may include one or more availability attributes and/or unaligned schedule attributes.

In operation 530, the electronic device 101 may optionally transmit a schedule confirmation (e.g., schedule confirm) based on the schedule response. If the schedule response includes "acceptance" or "rejection", the electronic device 101 may not transmit the schedule confirmation to the external electronic device 102. If the schedule response includes "counter proposal" (e.g., if the schedule response includes a modified schedule proposal), the electronic device 101 may transmit the schedule confirmation to the external electronic device 102. The schedule confirmation may indicate acceptance. In the schedule confirmation, an NDL Attribute Type (e.g., an NDL Attribute Type subfield) may be set to "(Schedule) Confirm". The schedule confirmation may include an availability attribute included in the modification schedule proposal, an availability attribute identical to an unaligned schedule attribute, and/or an unaligned schedule attribute.

In operation 530, the electronic devices 101 and 102 may set an NDL according to an NDL schedule (e.g., a negotiated NDL schedule) and may communicate with each other.

According to various example embodiments, one of management frames such as beacons (e.g., synchronization beacons), SDFs, and NAFs may be used for the schedule request, the schedule response, and the schedule confirmation. An NDL Attribute Type (e.g., an NDL Attribute Type subfield) of a management frame may be set to "(Schedule) Request", "(Schedule) Response", or "(Schedule) Confirm" to be used for NDL scheduling.

Figure 6:
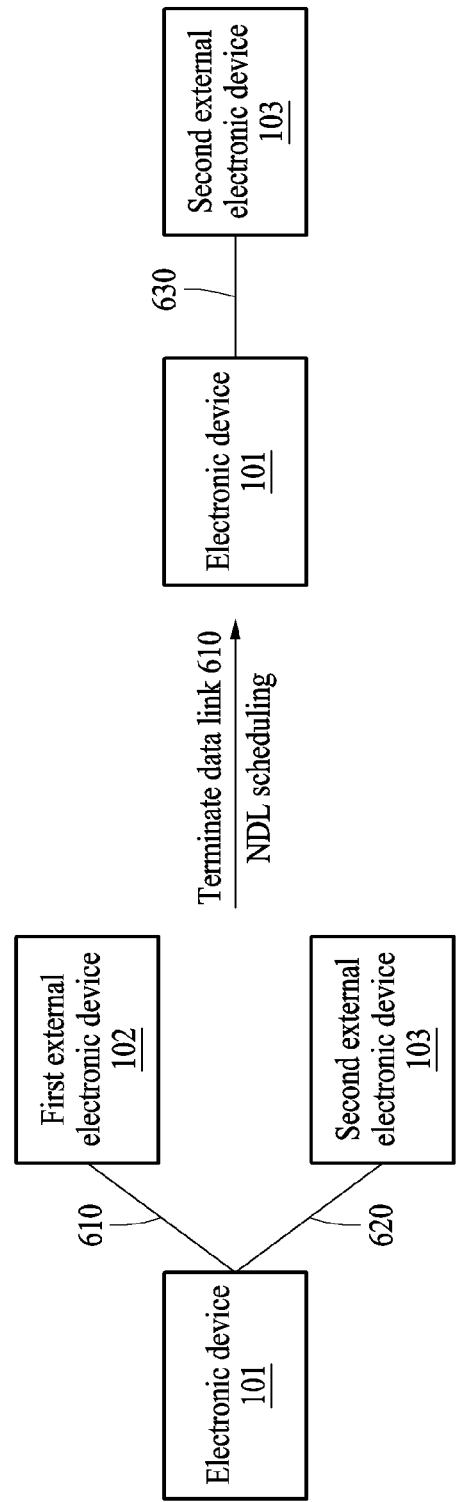
FIG. 6 is a diagram illustrating an example of an NDL scheduling method by a change in a frequency band according to various embodiments.

FIG. 6 is a diagram illustrating an example of an NDL scheduling method by a change in a frequency band according to various embodiments.

Referring to FIG. 6, according to various example embodiments, an electronic device 101 may perform NDL scheduling (e.g., updating, or rescheduling) based on a change in a frequency band due to a termination (e.g., a connection termination) of at least one data link formed in the electronic device 101. For example, the electronic device 101 may schedule a data link of an external electronic device 102 or 103 that maintains a connection to the electronic device 101, in response to a change in a frequency band due to a termination of at least one data link among a plurality of data links formed between the electronic device 101 and the external electronic device 102, 103. For convenience of description, an operation of the NDL scheduling method based on the change in the frequency band is described based on the electronic device 101. However, an operation of the electronic device 101 may be substantially identically applied to the external electronic devices 102 and 103, and operations of the external electronic devices 102 and 103 may be substantially identically applied to the electronic device 101. Although only two external electronic devices are illustrated in FIG. 6 for convenience of description, various example embodiments are not limited thereto, and substantially the same operations as those described above may be performed even though three or more external electronic devices are connected to the electronic device 101.

According to various example embodiments, the electronic devices 101 to 103 may be divided into three types (e.g., a first type, a second type, and a third type) according to frequency bands that may be supported (or used) and whether to support a real simultaneous dual band (RSDB). A device of the first type may support frequency bands of 2.4 GHz, 5 GHz, and 6 GHz, and the RSDB. The device of the first type may simultaneously use 2.4 GHz and 5 GHz and simultaneously use 2.4 GHz and 6 GHz, however, it may be difficult to simultaneously use 5 GHz and 6 GHz. A device of the second type may support frequency bands of 2.4 GHz and 5 GHz, and the RSDB. The device of the second type may simultaneously use 2.4 GHz and 5 GHz. A device of the third type may support frequency bands of 2.4 GHz and 5 GHz, and may not support the RSDB. Here, it may be difficult for the device of the third type to simultaneously use 2.4 GHz and 5 GHz, however, the device of the third type may alternately use 2.4 GHz and 5 GHz through time division.

According to various example embodiments, a data link using a frequency band (e.g., 2.4 GHz, 5 GHz, or 6 GHz) may be formed between the electronic devices 101 to 103. If NAN communication is performed, the electronic devices 101 to 103 may be excellent in performance for scheduling (e.g., forming) of a data link in a priority order of 6 GHz>5 GHz>2.4 GHz based on at least one of performance (e.g., NAN throughput in a NAN terminal) and congestion (e.g., real environment congestion) according to a frequency band.

According to various example embodiments, the electronic device 101 may set a schedule for a first data link 610 that uses a first frequency band (e.g., 2.4 GHz, 5 GHz, or 6 GHz) as a communication protocol (e.g., NAN) with the first external electronic device 102, and may set a schedule for a second data link 620 that uses a second frequency band (e.g., 2.4 GHz, 5 GHz, or 6 GHz) as a communication protocol (e.g., NAN) with the second external electronic device 103. A communication protocol may be a communication protocol that supports a NAN communication operation. The first frequency band and the second frequency band may be the same or different.

According to various example embodiments, the electronic device 101 may perform scheduling to change the second data link 620 to a third data link 630 that uses a third frequency band (e.g., 2.4 GHz, 5 GHz, or 6 GHz) if the third frequency band is available, in response to a termination of the first data link 610 (e.g., a termination of connection to the first external electronic device 102). The third data link 630 using the third frequency band may be substantially the same as the second data link 620 using the third frequency band. For example, the third data link 630 may be obtained by changing at least one of a channel (or channel information) and bandwidth information other than a frequency band (e.g., the third frequency band) in the second data link 620. The third frequency band may be different from the second frequency band, and may have a higher priority than that of the second frequency band based on the performance according to the frequency band. The third frequency band may also be the same as the first frequency band.

According to various example embodiments, the NDL scheduling according to the termination of the first data link 610 may be performed through exchanging of a schedule request, a schedule response, and/or a schedule confirmation between the electronic device 101 and the second external electronic device 103. In order to set a schedule for the third data link 630 that is a new data link, the schedule request and the schedule response may include a NAN availability attribute and/or unaligned schedule attribute based on information on an available frequency band (e.g., available frequency band information, and channel information and/or bandwidth information of the available frequency band). If the available frequency band is changed due to the termination of the first data link 610, the information on the available frequency band (e.g., available frequency band information, and channel information and/or bandwidth information of the available frequency band) may be added to the NAN availability attribute and/or the unaligned schedule attribute. The available frequency band information may be included in the List of Band Entries of the NAN availability attribute and/or unaligned schedule attribute, and the channel information and/or bandwidth information of the available frequency band may be included in a Channel Entry field of the NAN availability attribute and/or the unaligned schedule attribute.

According to various example embodiments, to use an available frequency band as the third frequency band used in the new third data link 630, available frequency bands may be selected in a priority order of 6 GHz>5 GHz>2.4 GHz from the NAN availability attribute and/or the unaligned schedule attribute included in the schedule request and schedule response. Accordingly, the electronic device 101 may efficiently configure multiple frequency bands by detecting a change in a data link with a neighboring device, and may efficiently use the multiple frequency bands.

Figure 7:
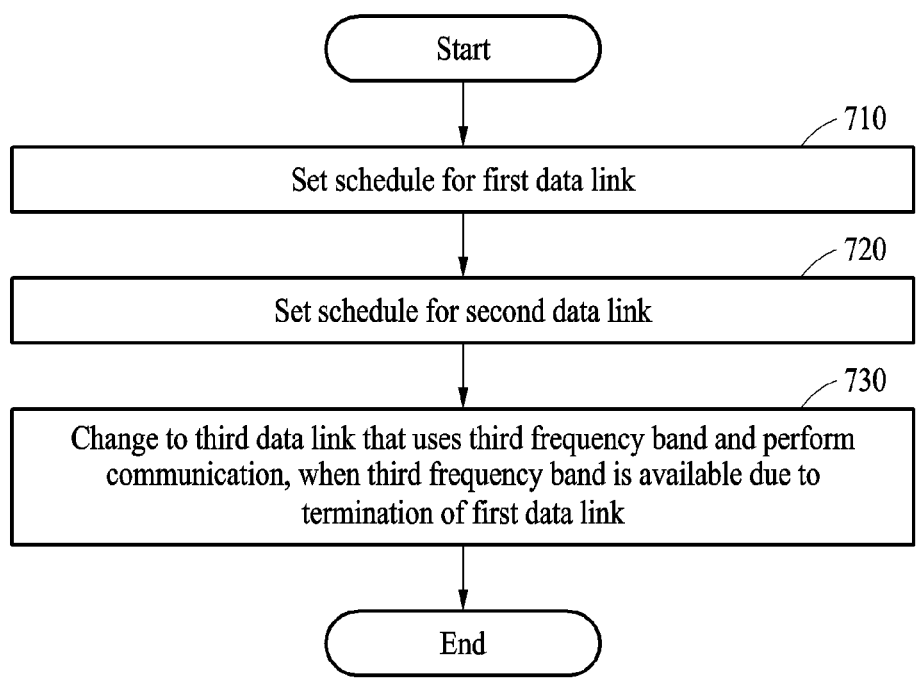
FIG. 7 is a flowchart illustrating an example operation of an electronic device to perform NDL scheduling by a change in a frequency band according to various embodiments.

FIG. 7 is a flowchart illustrating an example operation of an electronic device to perform NDL scheduling by a change in a frequency band according to various embodiments.

Referring to FIG. 7, according to various example embodiments, the electronic device 101 may support a first communication protocol and a second communication protocol. For example, the first communication protocol may support a communication operation (e.g., Wi-Fi) other than a NAN communication operation, and the second communication protocol may support the NAN communication operation. Operations 710 through 730 may be performed sequentially, but not be necessarily performed sequentially. For example, the order of operations 710 through 730 may be changed, and at least two of operations 710 through 730 may be performed in parallel.

In operation 710, the electronic device 101 may set a schedule for the first data link 610 that uses the first frequency band as the second communication protocol with the first external electronic device 102.

In operation 720, the electronic device 101 may set a schedule for the second data link 620 that uses the second frequency band as the second communication protocol with the second external electronic device 103.

In operation 730, the electronic device 101 may change the second data link 620 to the third data link 630 that uses the third frequency band and may perform communication with the second external electronic device 103, when the third frequency band is available due to the termination of the first data link 610. The third frequency band may be an available frequency band that has a higher priority than that of the second frequency band used in the second data link 620 among one or more available frequency bands that may be used by both the electronic device 101 and the second external electronic device 103.

Figure 8:
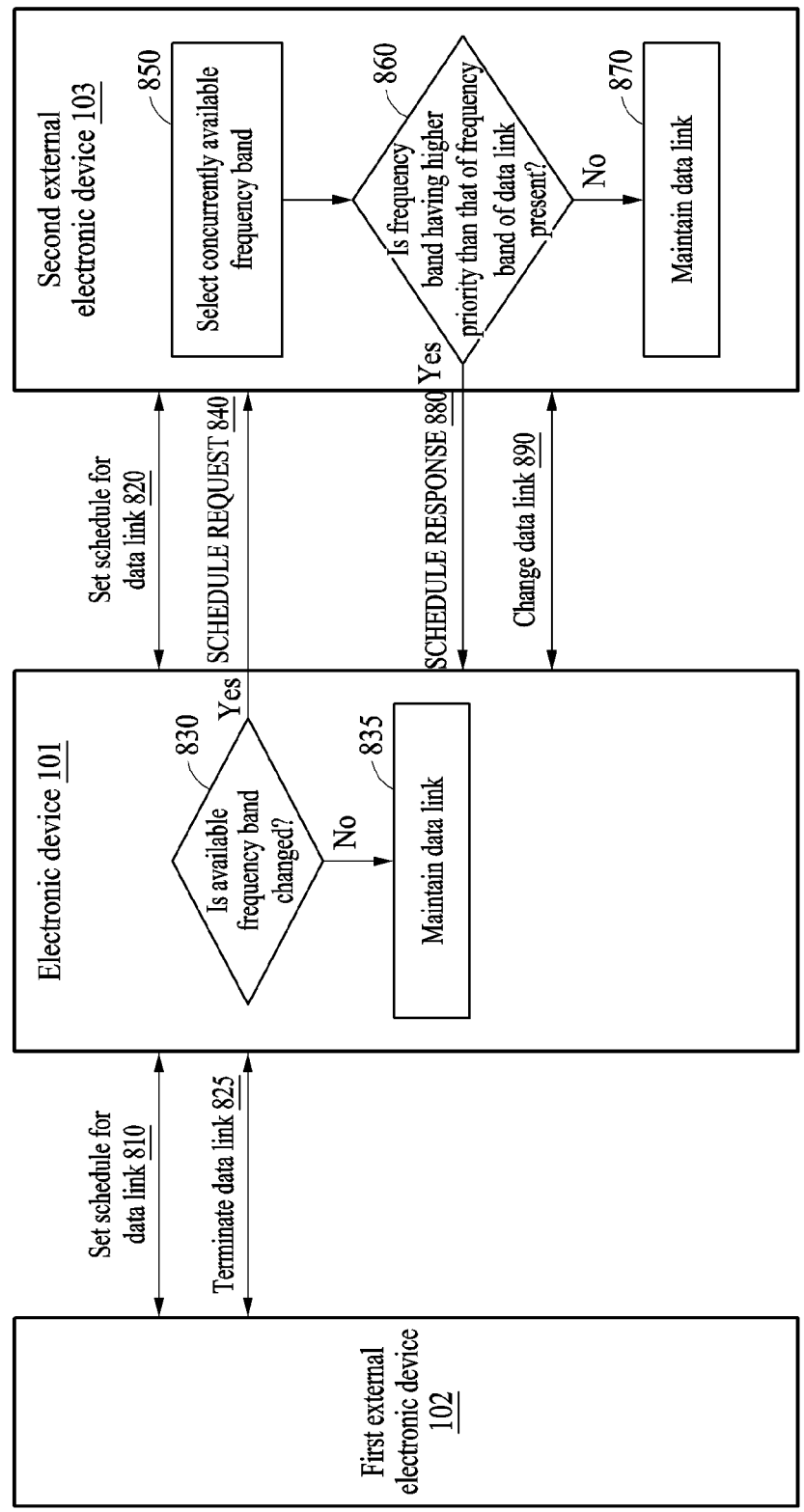
FIG. 8 is a diagram illustrating an example of an NDL scheduling operation performed based on the NDL scheduling method of FIG. 6 according to various embodiments.

FIG. 8 is a diagram illustrating an example of an NDL scheduling operation performed based on the NDL scheduling method of FIG. 6 according to various embodiments.

Referring to FIG. 8, operations 810 through 890 may be performed sequentially, but not be necessarily performed sequentially. For example, the order of operations 810 through 890 may be changed, and at least two of operations 810 through 890 may be performed in parallel.

In operation 810, the electronic device 101 may set a schedule for the first data link 610 that uses the first frequency band as a communication protocol (e.g., NAN) with the first external electronic device 102. The first data link 610 may be set between the electronic device 101 and the first external electronic device 102.

In operation 820, the electronic device 101 may set a schedule for the second data link 620 that uses the second frequency band as a communication protocol (e.g., NAN) with the second external electronic device 103. The second data link 620 may be set between the electronic device 101 and the second external electronic device 103.

In operation 825, the first data link 610 formed between the electronic device 101 and the first external electronic device 102 may be terminated.

In operation 830, the electronic device 101 may identify a change in an available frequency band of the electronic device 101, in response to the termination of the first data link 610 (e.g., a termination of connection to the first external electronic device 102).

In operation 835, when the available frequency band is not changed, the second data link 620 set between the electronic device 101 and the second external electronic device 103 may be maintained.

In operation 840, when the available frequency band is changed, the electronic device 101 may transmit a schedule request (e.g., SCHEDULE REQUEST) including information on an available frequency band (e.g., frequency bands that may be used by the electronic device 101 due to the termination of the first data link 610) of the electronic device 101 to the second external electronic device 103, to effectively set (or reset) a data link between the electronic device 101 and the second external electronic device 103.

In operation 850, the second external electronic device 103 may receive the schedule request, and may select at least one available frequency band that may be concurrently used by both the second external electronic device 103 and the electronic device 101, based on the information on the available frequency band of the electronic device 101 included in the schedule request.

In operation 860, the second external electronic device 103 may compare a priority of at least one available frequency band to a priority of the second frequency band of the second data link 620 and may determine whether a frequency band having a higher priority than that of the second frequency band is present.

In operation 870, when the available frequency band having the higher priority than that of the second frequency band is absent, the second data link 620 set between the electronic device 101 and the second external electronic device 103 may be maintained. Here, the second external electronic device 103 may or may not transmit a schedule response (e.g., SCHEDULE RESPONSE) including "rejection" (e.g., Rejected) to the electronic device 101.

In operation 880, when the available frequency band having the higher priority than that of the second frequency band is present, the second external electronic device 103 may transmit a schedule response (e.g., SCHEDULE RESPONSE) including information on the available frequency band (e.g., available frequency band information, and channel information and/or bandwidth information of the available frequency band) to the electronic device 101.

In operation 890, the electronic device 101 and the second external electronic device 103 may change the second data link 620 to the third data link 630 that uses an available frequency band (e.g., a third frequency band) and may perform communication (e.g., NAN communication).

Figure 9:
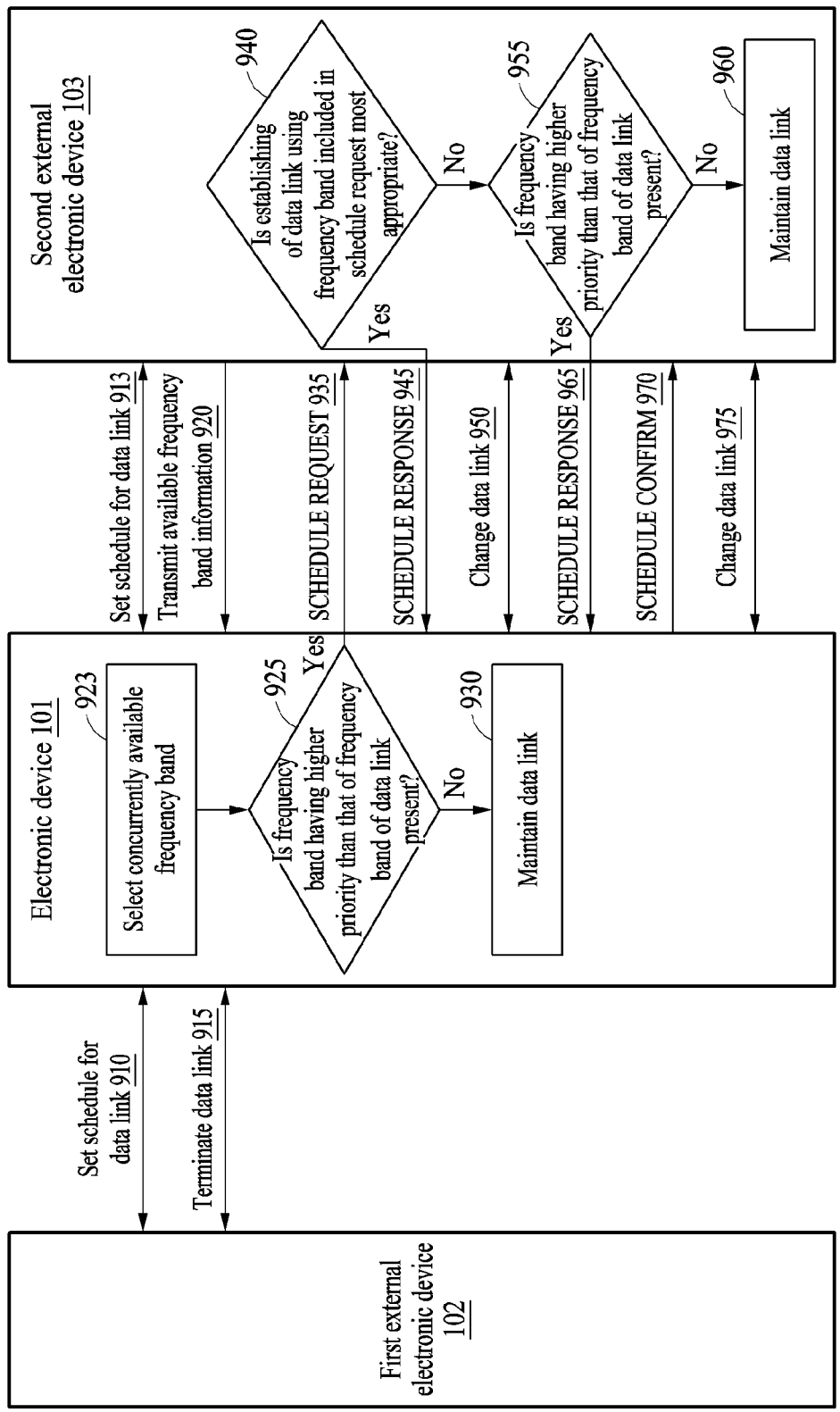
FIG. 9 is a diagram illustrating an example of an NDL scheduling operation performed based on the NDL scheduling method of FIG. 6 according to various embodiments.

FIG. 9 is a diagram illustrating an example of an NDL scheduling operation performed based on the NDL scheduling method of FIG. 6 according to various embodiments.

Referring to FIG. 9, operations 910 through 975 may be performed sequentially, but not be necessarily performed sequentially. For example, the order of operations 910 through 975 may be changed, and at least two of operations 910 through 975 may be performed in parallel.

In operation 910, the electronic device 101 may set a schedule for the first data link 610 that uses the first frequency band as a communication protocol (e.g., NAN) with the first external electronic device 102. The first data link 610 may be set between the electronic device 101 and the first external electronic device 102.

In operation 913, the electronic device 101 may set a schedule for the second data link 620 that uses the second frequency band as a communication protocol (e.g., NAN) with the second external electronic device 103. The second data link 620 may be set between the electronic device 101 and the second external electronic device 103.

In operation 915, the first data link 610 formed between the electronic device 101 and the first external electronic device 102 may be terminated.

In operation 920, the electronic device 101 may obtain information on an available frequency band (e.g., frequency bands that may be used by the second external electronic device 103 due to the termination of the first data link 610) of the second external electronic device 103 from the second external electronic device 103. The second external electronic device 103 may broadcast at least one of a beacon and a NAF to a neighboring device in real time. For example, the second external electronic device 103 may include information on an available frequency band in at least one of the beacon and the NAF and may transmit at least one of the beacon and the NAF including the information to the electronic device 101. The second external electronic device 103 may broadcast at least one of the beacon and the NAF in real time regardless of the termination of the first data link 610. The electronic device 101 may receive the beacon and/or NAF from the second external electronic device 103 at a point in time at which the first data link 610 is terminated.

In operation 923, the electronic device 101 may compare a frequency band (e.g., frequency bands that may be used by the electronic device 101 due to the termination of the first data link 610) that may be used by the electronic device 101 and a frequency band that may be used by the second external electronic device 103, based on the information on the available frequency band of the second external electronic device 103. The electronic device 101 may select at least one available frequency band that may be concurrently used by both the electronic device 101 and the second external electronic device 103.

In operation 925, the electronic device 101 may compare a priority of at least one available frequency band and a priority of the second frequency band of the second data link 620 and may determine whether a frequency band having a higher priority than that of the second frequency band is present.

In operation 930, when the available frequency band having the higher priority than that of the second frequency band is absent, the second data link 620 set between the electronic device 101 and the second external electronic device 103 may be maintained.

In operation 935, when an available frequency band (e.g., a first available frequency band) having a higher priority than that of the second frequency band is present, the electronic device 101 may transmit a schedule request (e.g., SCHEDULE REQUEST) including information on a first available frequency band (e.g., first available frequency band information, and channel information and/or bandwidth information of the first available frequency band) to the second external electronic device 103.

In operation 940, the second external electronic device 103 may receive the schedule request from the electronic device 101, and may determine whether setting of a new data link using the first available frequency band received from the electronic device 101 is most appropriate.

In operation 945, when the setting of the new data link using the first available frequency band received from the electronic device 101 is most appropriate, the second external electronic device 103 may transmit a schedule response (e.g., SCHEDULE RESPONSE) including the information on the first available frequency band (e.g., first available frequency band information, and channel information and/or bandwidth information of the first available frequency band) to the electronic device 101.

In operation 950, the electronic device 101 and the second external electronic device 103 may change the second data link 620 to the third data link 630 that uses the first available frequency band (e.g., a third frequency band) and may perform communication (e.g., NAN communication).

In operation 955, when the setting of the new data link using the first available frequency band received from the electronic device 101 is not most appropriate, the second external electronic device 103 may determine whether a second available frequency band having a higher priority (or a highest priority) than that of the second frequency band of the second data link 620 is present.

In operation 960, when the second available frequency band having the higher priority than that of the second frequency band of the second data link 620 is absent, the second data link 620 set between the electronic device 101 and the second external electronic device 103 may be maintained. Here, the second external electronic device 103 may or may not transmit a schedule response (e.g., SCHEDULE RESPONSE) including "rejection" (e.g., Rejected) to the electronic device 101.

In operation 965, when the second available frequency band having the higher priority than that of the second frequency band of the second data link 620 is present, the second external electronic device 103 may transmit a schedule response including a modification schedule proposal to set the third data link 630 using the second available frequency band to the electronic device 101.

In operation 970, the electronic device 101 may transmit a schedule confirmation (e.g., SCHEDULE CONFIRM) to the second external electronic device 103, in response to the schedule response. The schedule confirmation may include information on the second available frequency band (e.g., second available frequency band information, and channel information and/or bandwidth information of the second available frequency band), or "rejection" (e.g., Rejected).

In operation 975, when the schedule confirmation includes the information on the second available frequency band (e.g., second available frequency band information, and channel information and/or bandwidth information of the second available frequency band), the electronic device 101 and the second external electronic device 103 may change the second data link 620 to the third data link 630 that uses the second available frequency band (e.g., a third frequency band) and may perform communication (e.g., NAN communication). When the schedule confirmation includes "rejection" (e.g., Rejected), the second data link 620 set between the electronic device 101 and the second external electronic device 103 may be maintained.

Figure 10:
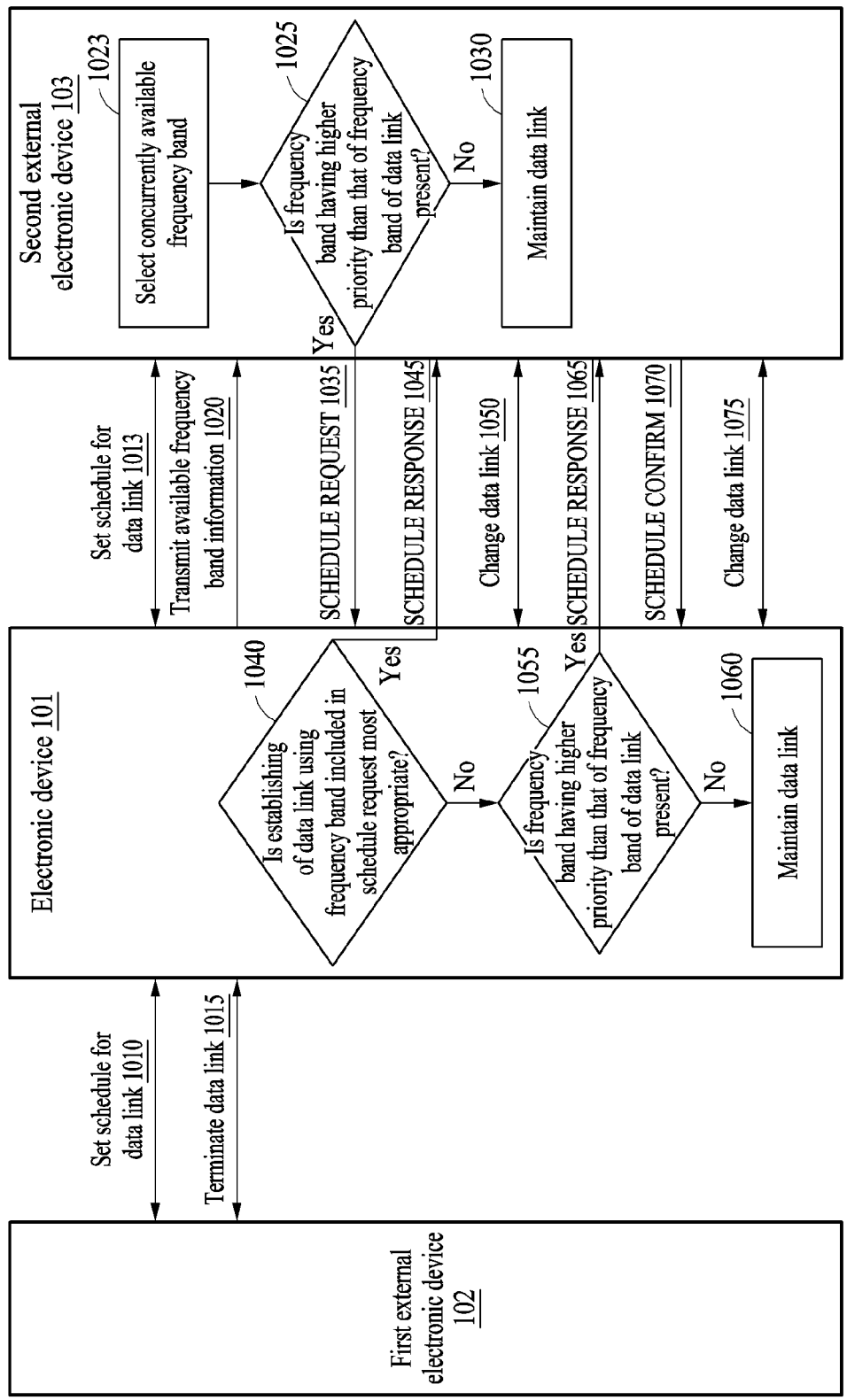
FIG. 10 is a diagram illustrating an example of an NDL scheduling operation performed based on the NDL scheduling method of FIG. 6 according to various embodiments.

FIG. 10 is a diagram illustrating an example of an NDL scheduling operation performed based on the NDL scheduling method of FIG. 6 according to various embodiments.

Referring to FIG. 10, operations 1010 through 1075 may be performed sequentially, but not be necessarily performed sequentially. For example, the order of operations 1010 through 1075 may be changed, and at least two of operations 1010 through 1075 may be performed in parallel.

In operation 1010, the electronic device 101 may set a schedule for the first data link 610 that uses the first frequency band as a communication protocol (e.g., NAN) with the first external electronic device 102. The first data link 610 may be set between the electronic device 101 and the first external electronic device 102.

In operation 1013, the electronic device 101 may set a schedule for the second data link 620 that uses the second frequency band as a communication protocol (e.g., NAN) with the second external electronic device 103. The second data link 620 may be set between the electronic device 101 and the second external electronic device 103.

In operation 1015, the first data link 610 formed between the electronic device 101 and the first external electronic device 102 may be terminated.

In operation 1020, the electronic device 101 may transmit information on an available frequency band (e.g., frequency bands that may be used by the electronic device 101 due to the termination of the first data link 610) of the electronic device 101 to the second external electronic device 103, in response to the termination of the first data link 610. The electronic device 101 may include the information on the available frequency band in at least one of a beacon and a NAF and may transmit at least one of the beacon and the NAF including the information to the second external electronic device 103.

In operation 1023, the second external electronic device 103 may compare a frequency band (e.g., frequency bands that may be used by the second external electronic device 103 due to the termination of the first data link 610) that may be used by the second external electronic device 103 and a frequency band that may be used by the electronic device 101, based on the information on the available frequency band of the electronic device 101. The second external electronic device 103 may select at least one available frequency band that may be concurrently used by both the second external electronic device 103 and the electronic device 101.

In operation 1025, the second external electronic device 103 may compare a priority of at least one available frequency band to a priority of the second frequency band of the second data link 620 and may determine whether an available frequency band having a higher priority than that of the second frequency band is present.

In operation 1030, when the available frequency band having the higher priority than that of the second frequency band is absent, the second data link 620 set between the electronic device 101 and the second external electronic device 103 may be maintained.

In operation 1035, when an available frequency band (e.g., a first available frequency band) having a higher priority than that of the second frequency band is present, the second external electronic device 103 may transmit a schedule request (e.g., SCHEDULE REQUEST) including information on a first available frequency band (e.g., first available frequency band information, and channel information and/or bandwidth information of the first available frequency band) to the electronic device 101.

In operation 1040, the electronic device 101 may receive the schedule request from the second external electronic device 103, and may determine whether setting of a new data link using the first available frequency band received from the second external electronic device 103 is most appropriate.

In operation 1045, when the setting of the new data link using the first available frequency band received from the second external electronic device 103 is most appropriate, the electronic device 101 may transmit a schedule response (e.g., SCHEDULE RESPONSE) including the information on the first available frequency band (e.g., first available frequency band information, and channel information and/or bandwidth information of the first available frequency band) to the second external electronic device 103.

In operation 1050, the electronic device 101 and the second external electronic device 103 may change the second data link 620 to the third data link 630 that uses the first available frequency band (e.g., a third frequency band) and may perform communication (e.g., NAN communication).

In operation 1055, when the setting of the new data link using the first available frequency band received from the second external electronic device 103 is not most appropriate, the electronic device 101 may determine whether a second available frequency band having a higher priority (or highest priority) than that of the second frequency band of the second data link 620 is present.

In operation 1060, when the second available frequency band having the higher priority than that of the second frequency band of the second data link 620 is absent, the second data link 620 set between the electronic device 101 and the second external electronic device 103 may be maintained. Here, the electronic device 101 may or may not transmit a schedule response (e.g., SCHEDULE RESPONSE) including "rejection" (e.g., Rejected) to the second external electronic device 103.

In operation 1065, when the second available frequency band having the higher priority than that of the second frequency band of the second data link 620 is present, the electronic device 101 may transmit a schedule response including a modification schedule proposal to set the third data link 630 using the second available frequency band to the second external electronic device 103.

In operation 1070, the second external electronic device 103 may transmit a schedule confirmation (e.g., SCHEDULE CONFIRM) to the electronic device 101, in response to the schedule response. The schedule confirmation may include information on the second available frequency band (e.g., second available frequency band information, and channel information and/or bandwidth information of the second available frequency band), or "rejection" (e.g., Rejected).

In operation 1075, when the schedule confirmation includes the information on the second available frequency band (e.g., second available frequency band information, and channel information and/or bandwidth information of the second available frequency band), the electronic device 101 and the second external electronic device 103 may change the second data link 620 to the third data link 630 that uses the second available frequency band (e.g., a third frequency band) and may perform communication (e.g., NAN communication). When the schedule confirmation includes "rejection" (e.g., Rejected), the second data link 620 set between the electronic device 101 and the second external electronic device 103 may be maintained.

Hereinafter, examples of scheduling operations of FIGS. 8, 9 and 10 will be described with reference to FIGS. 11A, 11B, 11C, 11D, 12A, 12B, 12C, 12D, 13A, 13B, 13C, 13D, 14A, 14B, 14C and 14D (which may be referred to as FIGS. 11A to 14D). Referring to FIGS. 11A to 14D, for convenience of description, priority levels based on performance (e.g., NAN throughput in a NAN terminal) according to frequency bands may be assumed to be in the order of 6 GHz (e.g., 1600 Mbps)>5 GHz (e.g., 900 Mbps)>2.4 GHz (e.g., 150 Mbps).

Figure 11A:
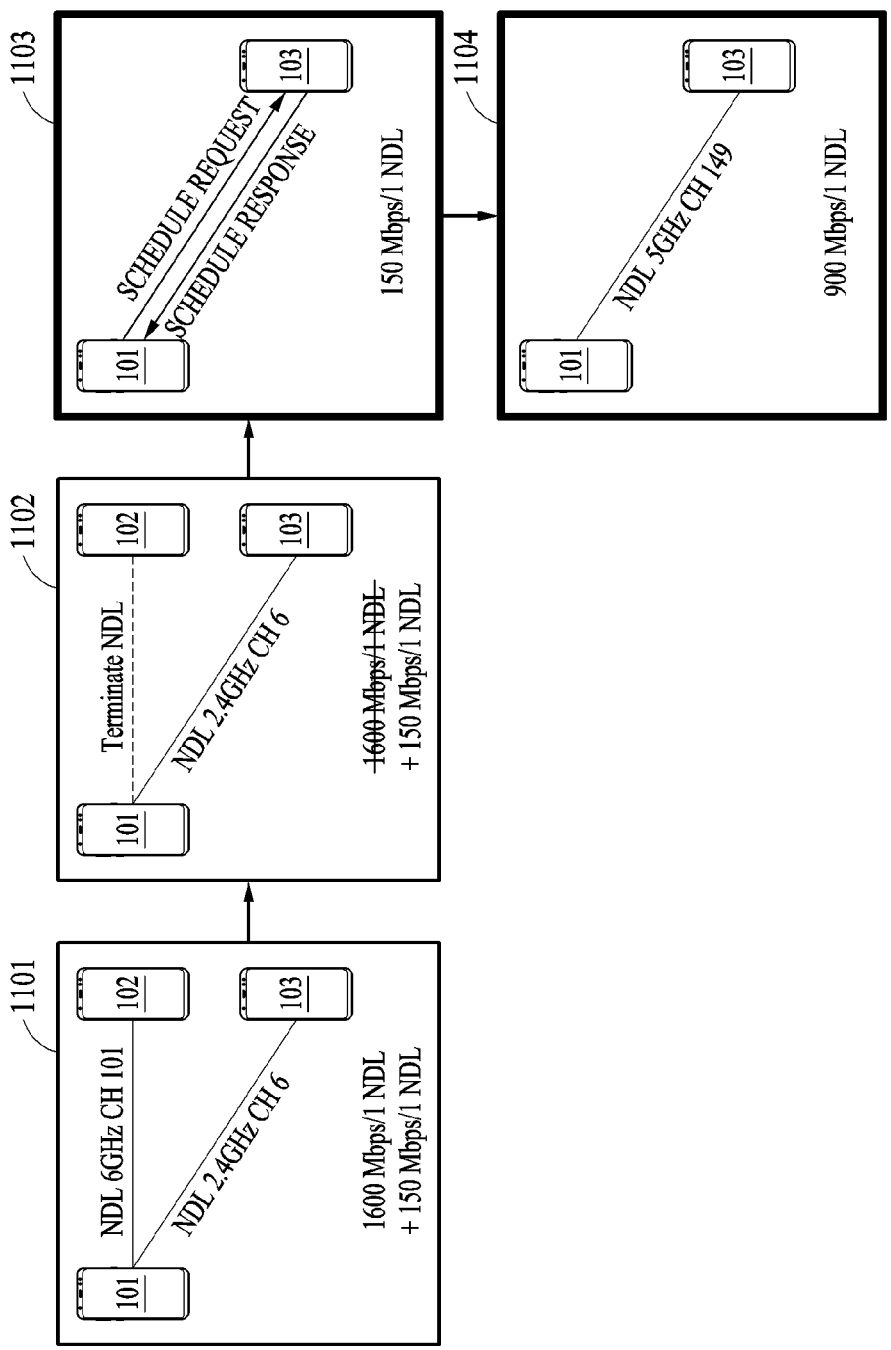
FIG. 11A is a diagram illustrating an example in which a scheduling operation of FIG. 8 is performed according to various embodiments.

FIG. 11A is a diagram illustrating an example in which a scheduling operation of FIG. 8 is performed according to various embodiments.

In FIG. 11A, it may be assumed that the electronic device 101 and the first external electronic device 102 are devices of the first type (e.g., devices for supporting frequency bands of 2.4 GHz, 5 GHz, and 6 GHz, and supporting an RSDB) and that the second external electronic device 103 is a device of the second type (e.g., a device for supporting frequency bands of 2.4 GHz and 5 GHz, and supporting an RSDB).

In operation 1101, a first data link (e.g., NDL 6 GHz CH 101) using a frequency band (e.g., 6 GHz) as a communication protocol (e.g., NAN) may be set between the electronic device 101 and the first external electronic device 102, and a second data link (e.g., NDL 2.4 GHz CH 6) using a frequency band (e.g., 2.4 GHz) as a communication protocol (e.g., NAN) may be set between the electronic device 101 and the second external electronic device 103.

When the first data link (e.g., NDL 6 GHz CH 101) between the electronic device 101 and the first external electronic device 102 is terminated, the electronic device 101 may determine that an available frequency band of the electronic device 101 is changed from 6 GHz+2.4 GHz to 6 GHz+5 GHz+2.4 GHz in operation 1102.

In operation 1103, the electronic device 101 may transmit a schedule request (e.g., SCHEDULE REQUEST) including available frequency band information (e.g., 6 GHz, 5 GHz, and 2.4 GHz) to the second external electronic device 103. A frequency band of the second data link (e.g., NDL 2.4 GHz CH 6) of the second external electronic device 103 may be 2.4 GHz, and the second external electronic device 103, which is the device of the second type, may use frequency bands of 5 GHz and 2.4 GHz. The second external electronic device 103 may select at least one available frequency band (e.g., 5 GHz, and 2.4 GHz) that may be used by both the electronic device 101 and the second external electronic device 103, based on the available frequency band information (e.g., 6 GHz, 5 GHz, and 2.4 GHz) included in the schedule request received from the electronic device 101. An available frequency band (e.g., 5 GHz) having a higher priority than 2.4 GHz that is the frequency band of the second data link (e.g., NDL 2.4 GHz CH 6) of the second external electronic device 103 may be used, and accordingly the second external electronic device 103 may select a channel (e.g., CH 149) that may be used by both the electronic device 101 and the second external electronic device 103 in the available frequency band (e.g., 5 GHz) and may transmit a schedule response (e.g., SCHEDULE RESPONSE) including the available frequency band (e.g., 5 GHz) and the channel (e.g., CH 149) (e.g., channel information and/or bandwidth information) of the available frequency band (e.g., 5 GHz) to the electronic device 101.

In operation 1104, the electronic device 101 and the second external electronic device 103 may change the second data link (e.g., NDL 2.4 GHz CH 6) to a third data link (e.g., NDL 5 GHz CH 149) that uses the channel (e.g., CH 149) of the available frequency band (e.g., 5 GHz), and may perform communication.

Figure 11B:
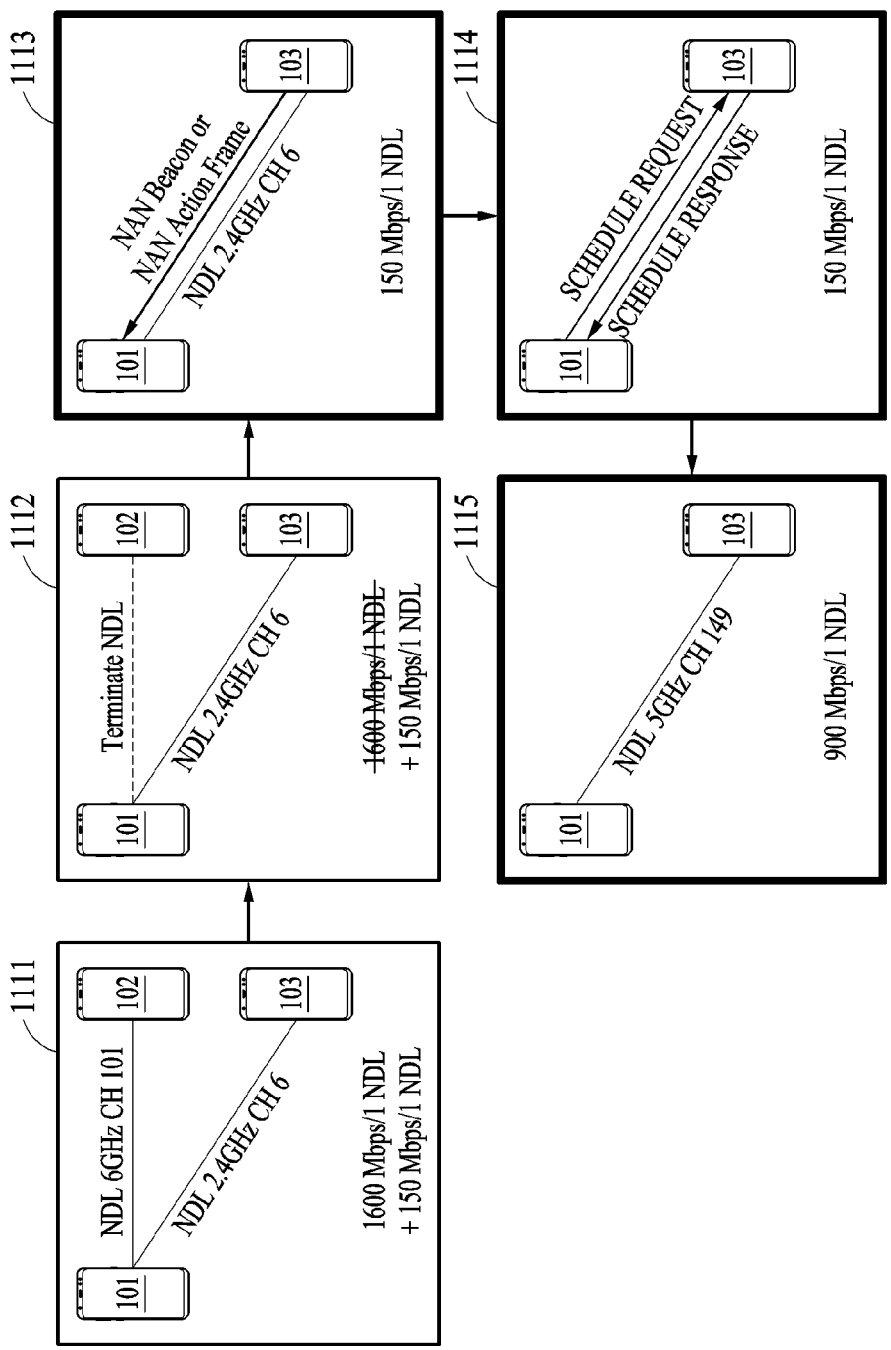
FIG. 11B is a diagram illustrating an example in which a scheduling operation of FIG. 9 is performed according to various embodiments.

FIG. 11B is a diagram illustrating an example in which a scheduling operation of FIG. 9 is performed according to various embodiments.

In FIG. 11B, it may be assumed that the electronic device 101 and the first external electronic device 102 are devices of the first type (e.g., devices for supporting frequency bands of 2.4 GHz, 5 GHz, and 6 GHz, and supporting an RSDB) and that the second external electronic device 103 is a device of the second type (e.g., a device for supporting frequency bands of 2.4 GHz and 5 GHz, and supporting an RSDB).

In operation 1111, a first data link (e.g., NDL 6 GHz CH 101) using a frequency band (e.g., 6 GHz) as a communication protocol (e.g., NAN) may be set between the electronic device 101 and the first external electronic device 102, and a second data link (e.g., NDL 2.4 GHz CH 6) using a frequency band (e.g., 2.4 GHz) as a communication protocol (e.g., NAN) may be set between the electronic device 101 and the second external electronic device 103.

In operation 1112, the first data link (e.g., NDL 6 GHz CH 101) between the electronic device 101 and the first external electronic device 102 may be terminated.

In operation 1113, the electronic device 101 may receive a beacon (e.g., a synchronization beacon) or NAF including available frequency band information (e.g., 5 GHz, and 2.4 GHz) of the second external electronic device 103 from the second external electronic device 103.

In operation 1114, the electronic device 101 may identify at least one available frequency band (e.g., 5 GHz, and 2.4 GHz) that may be used by both the electronic device 101 and the second external electronic device 103 among available frequency bands (e.g., 5 GHz, and 2.4 GHz) of the second external electronic device 103 and available frequency bands (e.g., 6 GHz, 5 GHz, and 2.4 GHz) of the electronic device 101. The electronic device 101 may compare the frequency band (e.g., 2.4 GHz) of the second data link (e.g., NDL 2.4 GHz CH 6) to an available frequency band (e.g., 5 GHz, and 2.4 GHz) that may be newly used between the electronic device 101 and the second external electronic device 103 according to priorities. An available frequency band (e.g., 5 GHz) having a higher priority than that of 2.4 GHz that is the frequency band of the second data link (e.g., NDL 2.4 GHz CH 6) may be used, and accordingly the electronic device 101 may transmit a schedule request (e.g., SCHEDULE REQUEST) including a new available frequency band (e.g., 5 GHz) and/or a channel (e.g., CH 149) (e.g., channel information and/or bandwidth information) of the available frequency band (e.g., 5 GHz) to the second external electronic device 103 in order to use the new available frequency band (e.g., 5 GHz). The second external electronic device 103 may identify the new available frequency band (e.g., 5 GHz) and the channel (e.g., CH 149) of the available frequency band (e.g., 5 GHz) included in the schedule request received from the electronic device 101, and may transmit a schedule response (e.g., SCHEDULE RESPONSE), which includes set information on the available frequency band (e.g., 5 GHz) and/or the channel (e.g., CH 149) (e.g., channel information and/or bandwidth information) to set a frequency band of a new data link, to the electronic device 101.

In operation 1115, the electronic device 101 and the second external electronic device 103 may change the second data link (e.g., NDL 2.4 GHz CH 6) to a third data link (e.g., NDL 5 GHz CH 149) that uses the channel (e.g., CH 149) of the available frequency band (e.g., 5 GHz), and may perform communication.

Figure 11C:
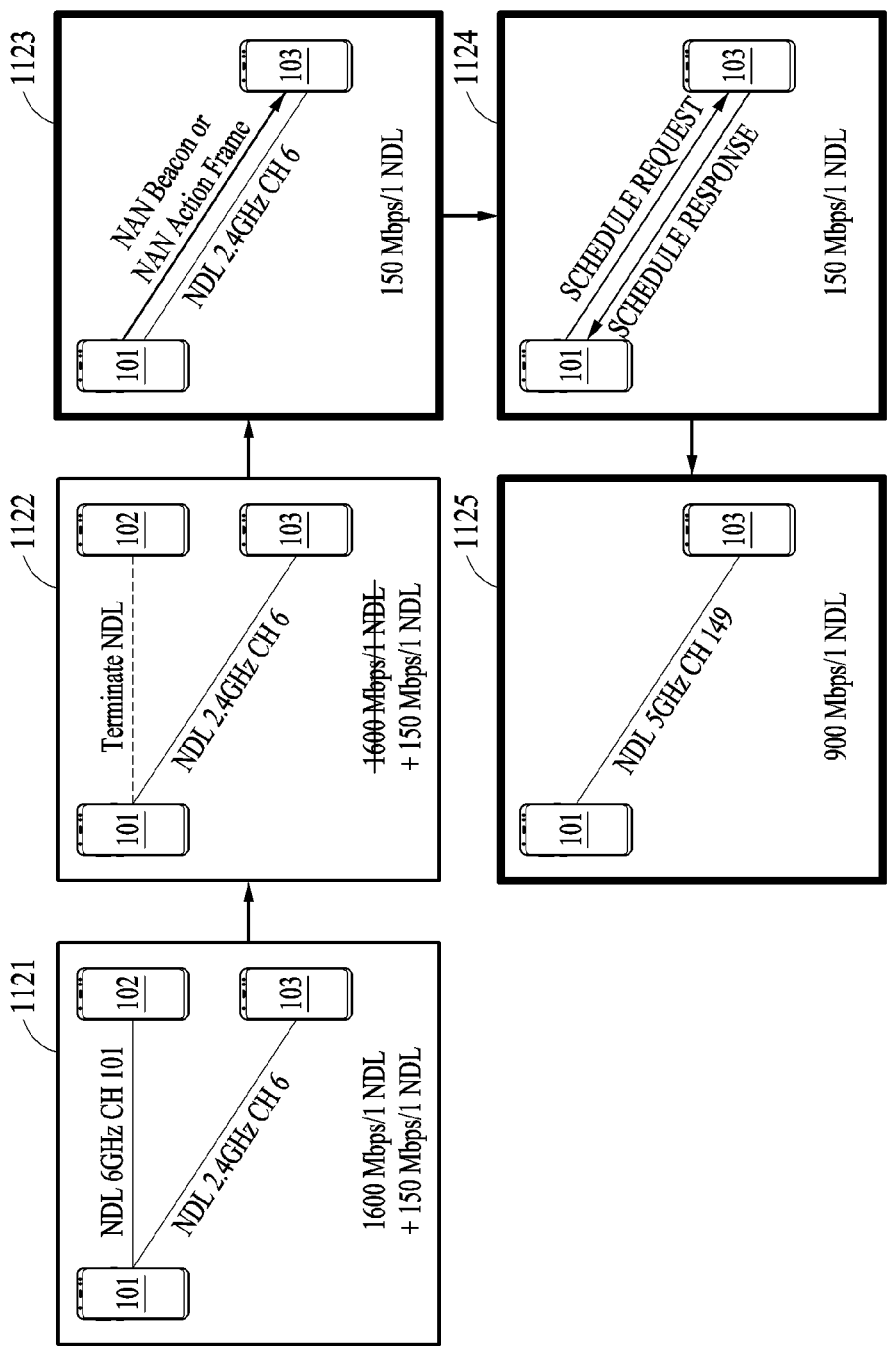
FIG. 11C is a diagram illustrating an example in which a scheduling operation of FIG. 10 is performed according to various embodiments.

FIG. 11C is a diagram illustrating an example in which a scheduling operation of FIG. 10 is performed according to various embodiments.

In FIG. 11C, it may be assumed that the electronic device 101 and the first external electronic device 102 are devices of the first type (e.g., devices for supporting frequency bands of 2.4 GHz, 5 GHz, and 6 GHz, and supporting an RSDB) and that the second external electronic device 103 is a device of the second type (e.g., a device for supporting frequency bands of 2.4 GHz and 5 GHz, and supporting an RSDB).

In operation 1121, a first data link (e.g., NDL 6 GHz CH 101) using a frequency band (e.g., 6 GHz) as a communication protocol (e.g., NAN) may be set between the electronic device 101 and the first external electronic device 102, and a second data link (e.g., NDL 2.4 GHz CH 6) using a frequency band (e.g., 2.4 GHz) as a communication protocol (e.g., NAN) may be set between the electronic device 101 and the second external electronic device 103.

In operation 1122, the first data link (e.g., NDL 6 GHz CH 101) between the electronic device 101 and the first external electronic device 102 may be terminated.

In operation 1123, the electronic device 101 may transmit a beacon (e.g., a synchronization beacon) or NAF including available frequency band information (e.g., 6 GHz, 5 GHz, and 2.4 GHz) of the electronic device 101 to the second external electronic device 103.

In operation 1124, the second external electronic device 103 may identify at least one available frequency band (e.g., 5 GHz, and 2.4 GHz) that may be used by both the electronic device 101 and the second external electronic device 103 among available frequency bands (e.g., 5 GHz, and 2.4 GHz) of the second external electronic device 103 and available frequency bands (e.g., 6 GHz, 5 GHz, and 2.4 GHz) of the electronic device 101. The second external electronic device 103 may compare the frequency band (e.g., 2.4 GHz) of the second data link (e.g., NDL 2.4 GHz CH 6) to an available frequency band (e.g., 5 GHz, and 2.4 GHz) that may be newly used between the electronic device 101 and the second external electronic device 103 according to priorities. An available frequency band (e.g., 5 GHz) having a higher priority than that of 2.4 GHz that is the frequency band of the second data link (e.g., NDL 2.4 GHz CH 6) may be used, and accordingly the second external electronic device 103 may transmit a schedule request (e.g., SCHEDULE REQUEST) including a new available frequency band (e.g., 5 GHz) and/or a channel (e.g., CH 149) (e.g., channel information and/or bandwidth information) of the available frequency band (e.g., 5 GHz) to the electronic device 101 in order to use the new available frequency band (e.g., 5 GHz). The electronic device 101 may identify the new available frequency band (e.g., 5 GHz) and/or the channel (e.g., CH 149) of the available frequency band (e.g., 5 GHz) included in the schedule request received from the second external electronic device 103, and may transmit a schedule response (e.g., SCHEDULE RESPONSE), which includes set information on the available frequency band (e.g., 5 GHz) and/or the channel (e.g., CH 149) (e.g., channel information and/or bandwidth information) to set a frequency band of a new data link, to the second external electronic device 103.

In operation 1125, the electronic device 101 and the second external electronic device 103 may change the second data link (e.g., NDL 2.4 GHz CH 6) to a third data link (e.g., NDL 5 GHz CH 149) that uses the channel (e.g., CH 149) of the available frequency band (e.g., 5 GHz), and may perform communication.

Figure 11D:
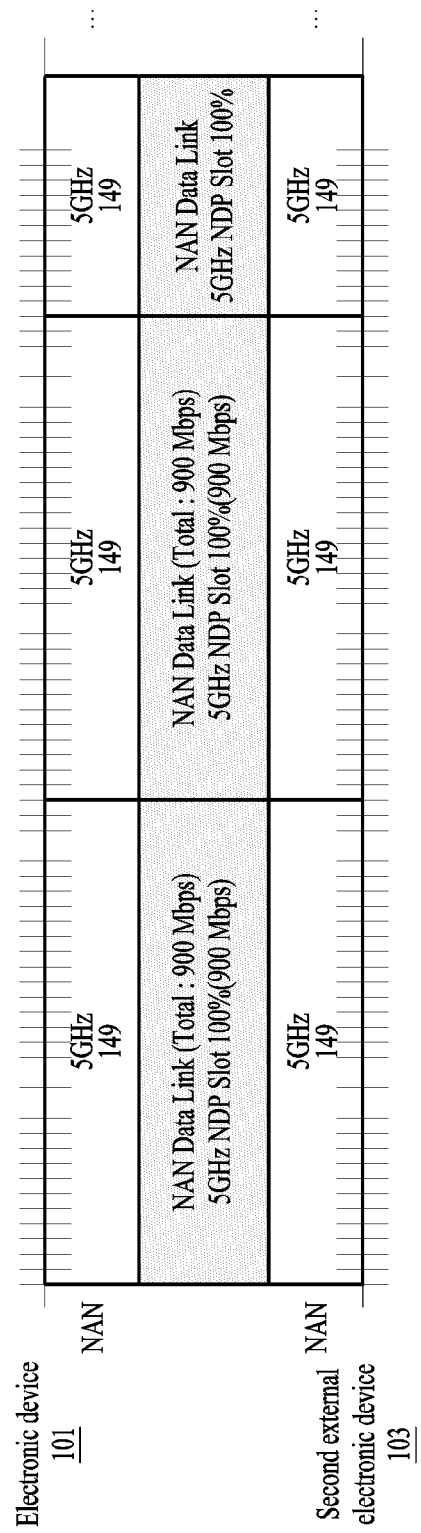
FIG. 11D is a diagram illustrating slots of newly set data links of FIGS. 11A, 11B and 11C according to various embodiments.

FIG. 11D is a diagram illustrating slots of newly set data links of FIGS. 11A, 11B and 11C according to various embodiments.

FIG. 11D illustrates a slot of a data link finally formed between the electronic device 101 and the second external electronic device 103 in FIGS. 11A to 11C.

Referring to FIG. 11D, the electronic device 101, which is a device of the first type, may support all of NAN 6 GHz, NAN 5 GHz, and NAN 2.4 GHz, and the second external electronic device 103, which is a device of the second type, may support NAN 5 GHz and NAN 2.4 GHz. Both the electronic device 101 and the second external electronic device 103 may support NAN 5 GHz and NAN 2.4 GHz. NAN 5 GHz may be superior in performance to NAN 2.4 GHz among frequency bands that may be supported by both the electronic device 101 and the second external electronic device 103, and accordingly NAN 5 GHz may have a higher priority than that of NAN 2.4 GHz. Thus, a new scheduling operation may be performed between the electronic device 101 and the second external electronic device 103 so that a data link may be formed between the electronic device 101 and the second external electronic device 103 using a NAN 5 GHz frequency band and may be used. As shown in FIG. 11D, the data link between the electronic device 101 and the second external electronic device 103 may be formed as NAN 5 GHz Band CH 149, and actually measured performance of NAN 5 GHz Band CH 149 may be about 900 Mbps.

Figure 12A:
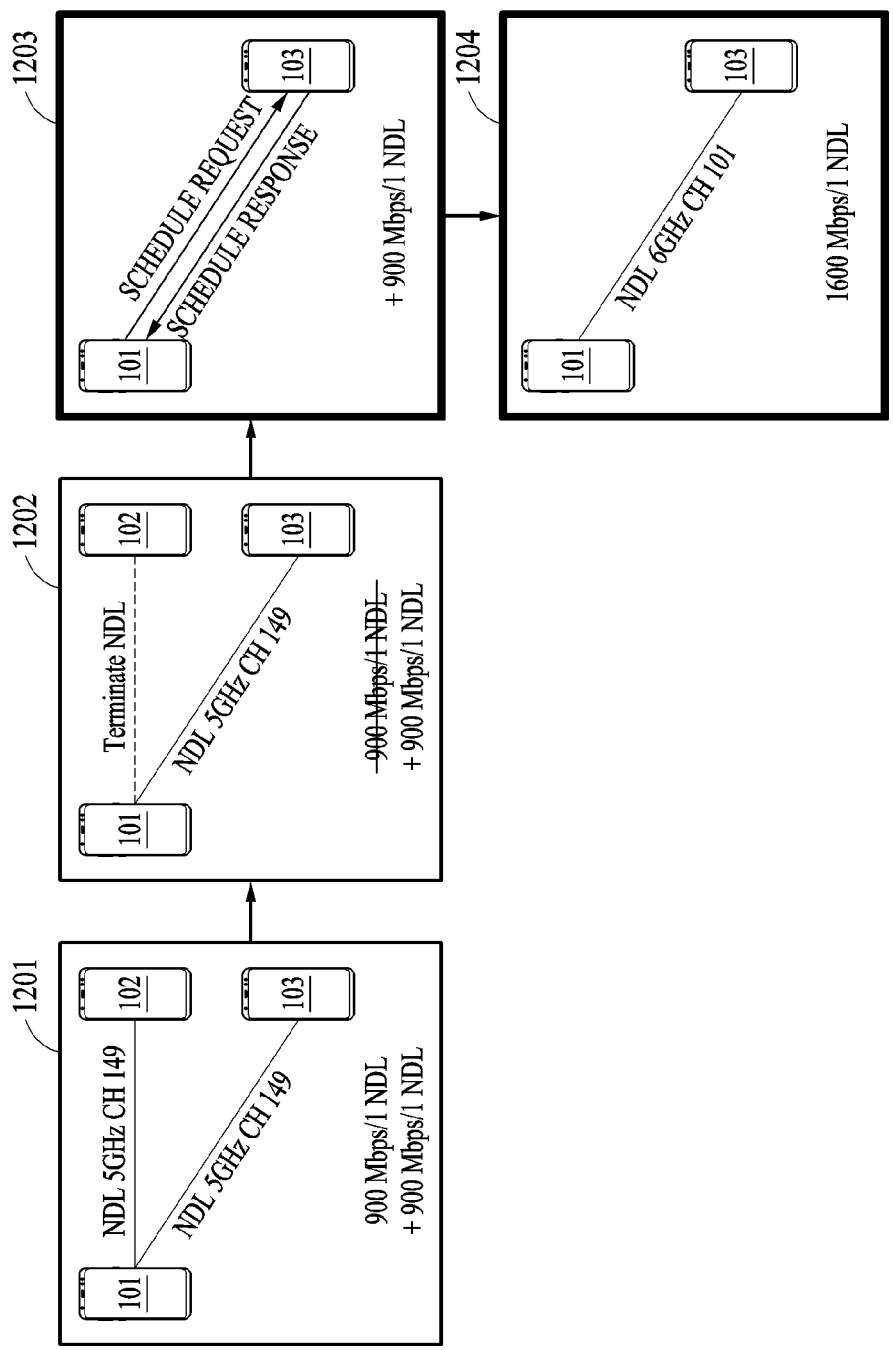
FIG. 12A is a diagram illustrating an example in which the scheduling operation of FIG. 8 is performed according to various embodiments.

FIG. 12A is a diagram illustrating an example in which the scheduling operation of FIG. 8 is performed according to various embodiments.

In FIG. 12A, it may be assumed that the electronic device 101 and the second external electronic device 103 are devices of the first type (e.g., devices for supporting frequency bands of 2.4 GHz, 5 GHz, and 6 GHz, and supporting an RSDB) and that the first external electronic device 102 is a device of the second type (e.g., a device for supporting frequency bands of 2.4 GHz and 5 GHz, and supporting an RSDB).

In operation 1201, a first data link (e.g., NDL 5 GHz CH 149) using a frequency band (e.g., 5 GHz) as a communication protocol (e.g., NAN) may be set between the electronic device 101 and the first external electronic device 102, and a second data link (e.g., NDL 5 GHz CH 149) using a frequency band (e.g., 5 GHz) as a communication protocol (e.g., NAN) may be set between the electronic device 101 and the second external electronic device 103.

When the first data link (e.g., NDL 5 GHz CH 149) between the electronic device 101 and the first external electronic device 102 is terminated, the electronic device 101 may determine that an available frequency band of the electronic device 101 is changed from 5 GHz+2.4 GHz to 6 GHz+5 GHz+2.4 GHz in operation 1202.

In operation 1203, the electronic device 101 may transmit a schedule request (e.g., SCHEDULE REQUEST) including available frequency band information (e.g., 6 GHz, 5 GHz, and 2.4 GHz) to the second external electronic device 103. A frequency band of the second data link (e.g., NDL 5 GHz CH 149) of the second external electronic device 103 may be 5 GHz, and the second external electronic device 103, which is the device of the first type, may use frequency bands of 6 GHz, 5 GHz, and 2.4 GHz. The second external electronic device 103 may select at least one available frequency band (e.g., 6 GHz, 5 GHz, and 2.4 GHz) that may be used by both the electronic device 101 and the second external electronic device 103, based on the available frequency band information (e.g., 6 GHz, 5 GHz, and 2.4 GHz) included in the schedule request received from the electronic device 101. An available frequency band (e.g., 6 GHz) having a higher priority than that of 5 GHz that is the frequency band of the second data link (e.g., NDL 5 GHz CH 149) of the second external electronic device 103 may be used, and accordingly the second external electronic device 103 may select a channel (e.g., CH 101) that may be used by both the electronic device 101 and the second external electronic device 103 in the available frequency band (e.g., 6 GHz) and may transmit a schedule response (e.g., SCHEDULE RESPONSE) including information on the available frequency band (e.g., 6 GHz) and the channel (e.g., CH 101) (e.g., channel information and/or bandwidth information) of the available frequency band (e.g., 6 GHz) to the electronic device 101.

In operation 1204, the electronic device 101 and the second external electronic device 103 may change the second data link (e.g., NDL 5 GHz CH 149) to a third data link (e.g., NDL 6 GHz CH 101) that uses the channel (e.g., CH 101) of the available frequency band (e.g., 6 GHz), and may perform communication.

Figure 12B:
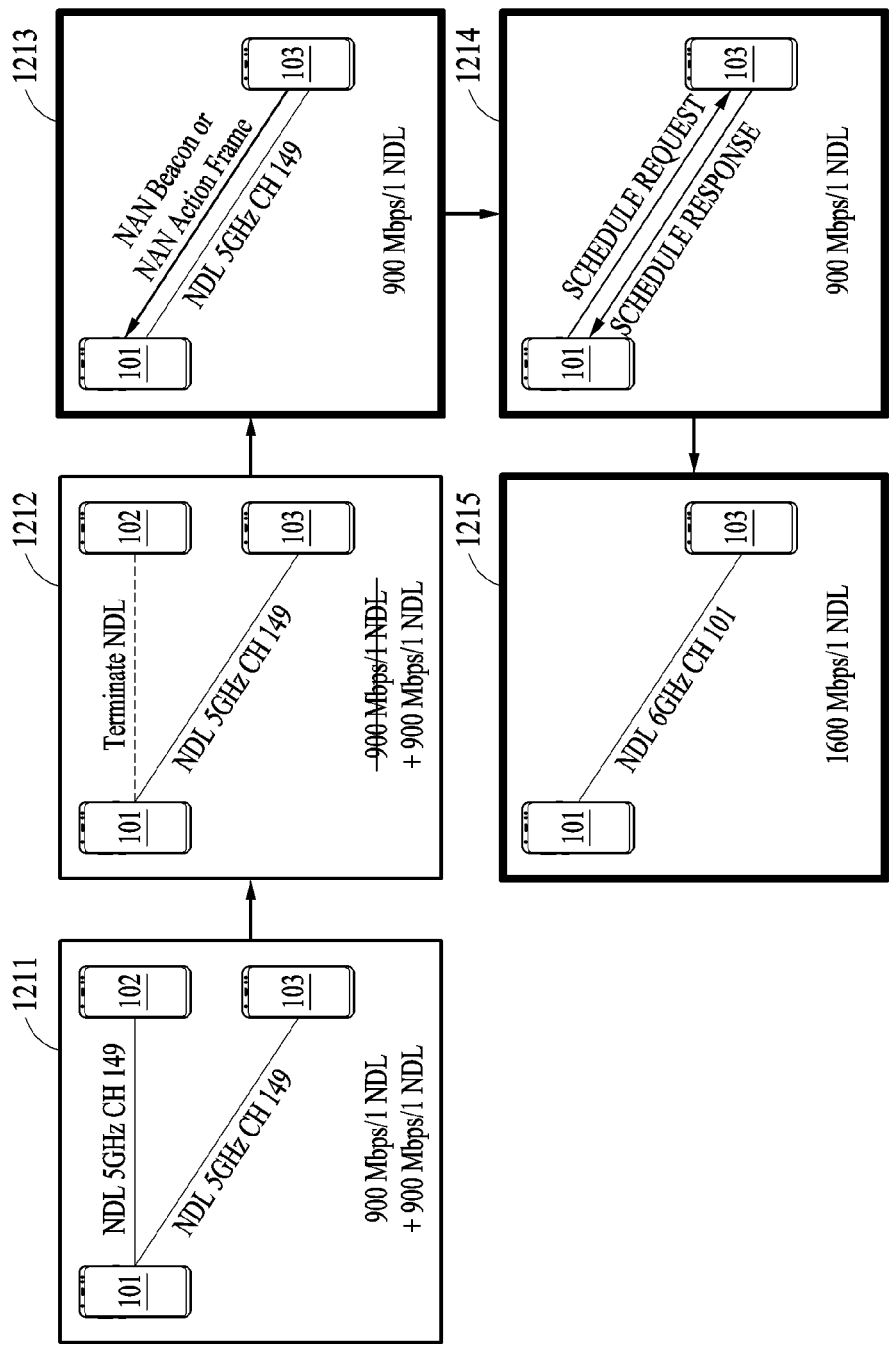
FIG. 12B is a diagram illustrating an example in which the scheduling operation of FIG. 9 is performed according to various embodiments.

FIG. 12B is a diagram illustrating an example in which the scheduling operation of FIG. 9 is performed according to various embodiments.

In FIG. 12B, it may be assumed that the electronic device 101 and the second external electronic device 103 are devices of the first type (e.g., devices for supporting frequency bands of 2.4 GHz, 5 GHz, and 6 GHz, and supporting an RSDB) and that the first external electronic device 102 is a device of the second type (e.g., a device for supporting frequency bands of 2.4 GHz and 5 GHz, and supporting an RSDB).

In operation 1211, a first data link (e.g., NDL 5 GHz CH 149) using a frequency band (e.g., 5 GHz) as a communication protocol (e.g., NAN) may be set between the electronic device 101 and the first external electronic device 102, and a second data link (e.g., NDL 5 GHz CH 149) using a frequency band (e.g., 5 GHz) as a communication protocol (e.g., NAN) may be set between the electronic device 101 and the second external electronic device 103.

In operation 1212, the first data link (e.g., NDL 5 GHz CH 149) between the electronic device 101 and the first external electronic device 102 may be terminated.

In operation 1213, the electronic device 101 may receive a beacon (e.g., a synchronization beacon) or NAF including available frequency band information (e.g., 6 GHz, 5 GHz, and 2.4 GHz) of the second external electronic device 103 from the second external electronic device 103.

In operation 1214, the electronic device 101 may identify at least one available frequency band (e.g., 6 GHz, 5 GHz, and 2.4 GHz) that may be used by both the electronic device 101 and the second external electronic device 103 among available frequency bands (e.g., 6 GHz, 5 GHz, and 2.4 GHz) of the second external electronic device 103 and available frequency bands (e.g., 6 GHz, 5 GHz, and 2.4 GHz) of the electronic device 101. The electronic device 101 may compare the frequency band (e.g., 5 GHz) of the second data link (e.g., NDL 5 GHz CH 149) to an available frequency band (e.g., 6 GHz, 5 GHz, and 2.4 GHz) that may be newly used between the electronic device 101 and the second external electronic device 103 according to priorities. An available frequency band (e.g., 6 GHz) having a higher priority than that of 5 GHz that is the frequency band of the second data link (e.g., NDL 5 GHz CH 149) may be used, and accordingly the electronic device 101 may transmit a schedule request (e.g., SCHEDULE REQUEST) including a new available frequency band (e.g., 6 GHz)

and/or a channel (e.g., CH 101) (e.g., channel information and/or bandwidth information) of the available frequency band (e.g., 6 GHz) to the second external electronic device 103 in order to use the new available frequency band (e.g., 6 GHz). The second external electronic device 103 may identify the new available frequency band (e.g., 6 GHz) and/or the channel (e.g., CH 101) of the available frequency band (e.g., 6 GHz) included in the schedule request received from the electronic device 101, and may transmit a schedule response (e.g., SCHEDULE RESPONSE), which includes set information on the available frequency band (e.g., 6 GHz) and/or the channel (e.g., CH 101) (e.g., channel information and/or bandwidth information) to set a frequency band of a new data link, to the electronic device 101.

In operation 1215, the electronic device 101 and the second external electronic device 103 may change the second data link (e.g., NDL 5 GHz CH 149) to a third data link (e.g., NDL 6 GHz CH 101) that uses the channel (e.g., CH 101) of the available frequency band (e.g., 6 GHz), and may perform communication.

Figure 12C:
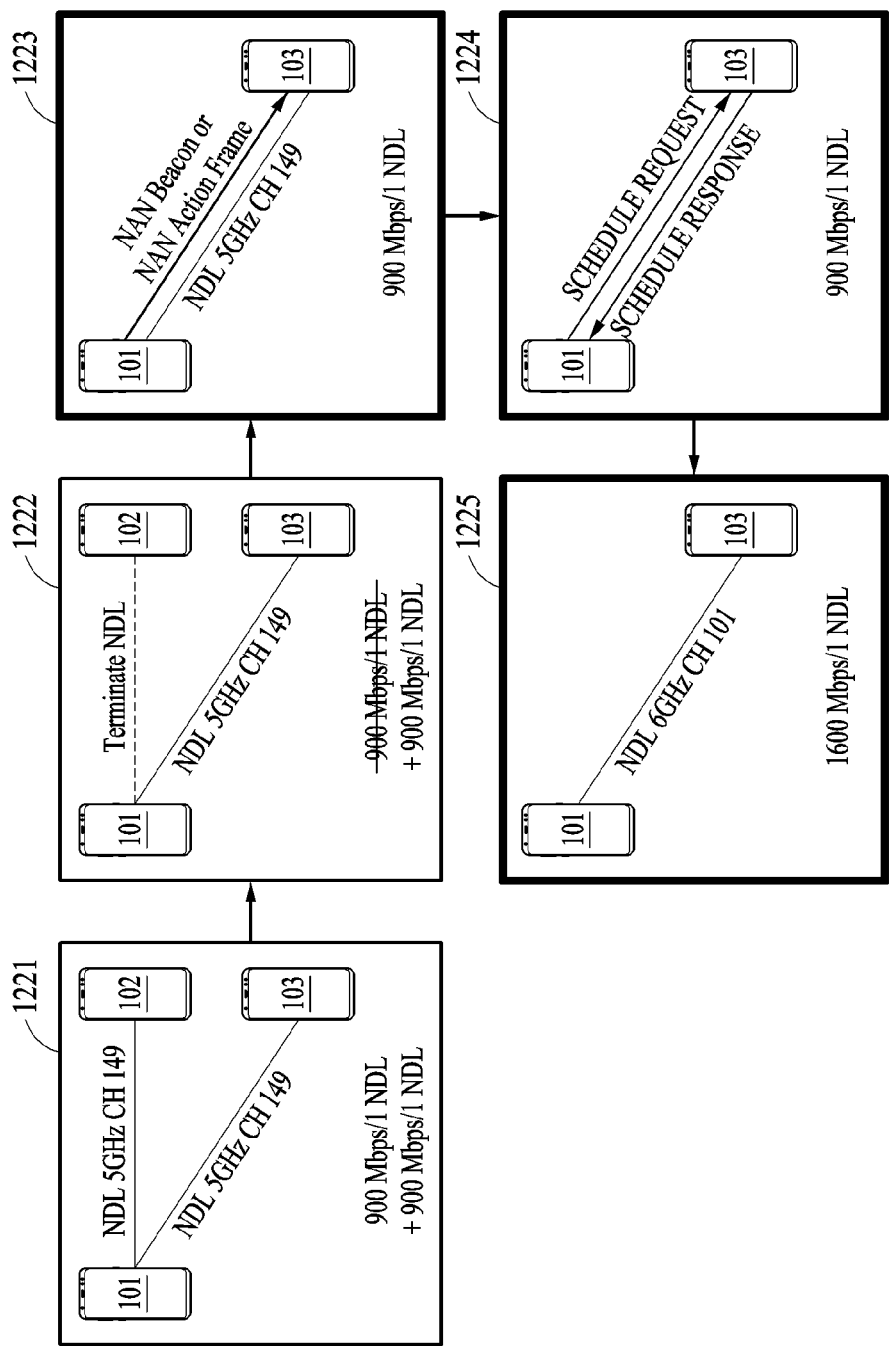
FIG. 12C is a diagram illustrating an example in which the scheduling operation of FIG. 10 is performed according to various embodiments.

FIG. 12C is a diagram illustrating an example in which the scheduling operation of FIG. 10 is performed according to various embodiments.

In FIG. 12C, it may be assumed that the electronic device 101 and the second external electronic device 103 are devices of the first type (e.g., devices for supporting frequency bands of 2.4 GHz, 5 GHz, and 6 GHz, and supporting an RSDB) and that the first external electronic device 102 is a device of the second type (e.g., a device for supporting frequency bands of 2.4 GHz and 5 GHz, and supporting an RSDB).

In operation 1221, a first data link (e.g., NDL 5 GHz CH 149) using a frequency band (e.g., 5 GHz) as a communication protocol (e.g., NAN) may be set between the electronic device 101 and the first external electronic device 102, and a second data link (e.g., NDL 5 GHz CH 149) using a frequency band (e.g., 5 GHz) as a communication protocol (e.g., NAN) may be set between the electronic device 101 and the second external electronic device 103.

In operation 1222, the first data link (e.g., NDL 5 GHz CH 149) between the electronic device 101 and the first external electronic device 102 may be terminated.

In operation 1223, the electronic device 101 may transmit a beacon (e.g., a synchronization beacon) or NAF including available frequency band information (e.g., 6 GHz, 5 GHz, and 2.4 GHz) of the electronic device 101 to the second external electronic device 103.

In operation 1224, the second external electronic device 103 may identify at least one available frequency band (e.g., 6 GHz, 5 GHz, and 2.4 GHz) that may be used by both the electronic device 101 and the second external electronic device 103 among available frequency bands (e.g., 6 GHz, 5 GHz, and 2.4 GHz) of the second external electronic device 103 and available frequency bands (e.g., 6 GHz, 5 GHz, and 2.4 GHz) of the electronic device 101. The second external electronic device 103 may compare the frequency band (e.g., 5 GHz) of the second data link (e.g., NDL 5 GHz CH 149) to an available frequency band (e.g., 6 GHz, 5 GHz, and 2.4 GHz) that may be newly used between the electronic device 101 and the second external electronic device 103 according to priorities. An available frequency band (e.g., 6 GHz) having a higher priority than that of 5 GHz that is the frequency band of the second data link (e.g., NDL 5 GHz CH 149) may be used, and accordingly the second external electronic device 103 may transmit a schedule request (e.g., SCHEDULE REQUEST) including a new available frequency band (e.g., 6 GHz) and/or a channel (e.g., CH 101) (e.g., channel information and/or bandwidth information) of the available frequency band (e.g., 6 GHz) to the electronic device 101 in order to use the new available frequency band (e.g., 6 GHz). The electronic device 101 may identify the new available frequency band (e.g., 6 GHz) and/or the channel (e.g., CH 101) of the available frequency band (e.g., 6 GHz) included in the schedule request received from the second external electronic device 103, and may transmit a schedule response (e.g., SCHEDULE RESPONSE), which includes set information on the available frequency band (e.g., 6 GHz) and/or the channel (e.g., CH 101) (e.g., channel information and/or bandwidth information) to set a frequency band of a new data link, to the second external electronic device 103.

In operation 1225, the electronic device 101 and the second external electronic device 103 may change the second data link (e.g., NDL 5 GHz CH 149) to a third data link (e.g., NDL 6 GHz CH 101) that uses the channel (e.g., CH 101) of the available frequency band (e.g., 6 GHz), and may perform communication.

Figure 12D:
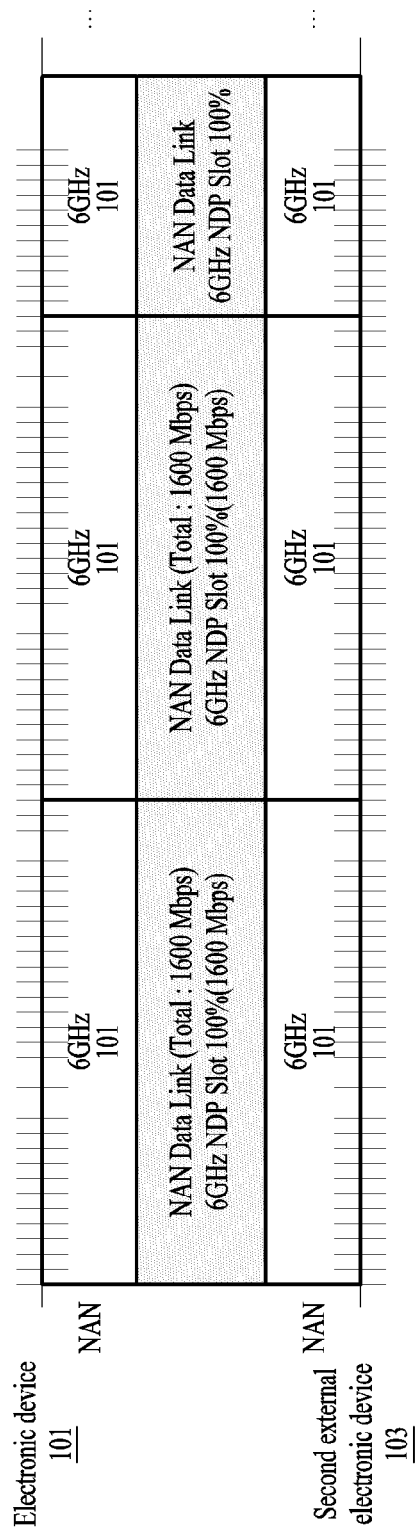
FIG. 12D is a diagram illustrating slots of newly set data links of FIGS. 12A, 12B and 12C according to various embodiments.

FIG. 12D is a diagram illustrating slots of newly set data links of FIGS. 12A, 12B and 12C according to various embodiments.

FIG. 12D illustrates a slot of a data link finally formed between the electronic device 101 and the second external electronic device 103 in FIGS. 12A to 12C.

Referring to FIG. 12D, the electronic device 101 and the second external electronic device 103, which are devices of the first type, may support all of NAN 6 GHz, NAN 5 GHz, and NAN 2.4 GHz. In other words, both the electronic device 101 and the second external electronic device 103 may support NAN 6 GHz, NAN 5 GHz, and NAN 2.4 GHz. Among frequency bands that may be supported by both the electronic device 101 and the second external electronic device 103, NAN 6 GHz may be superior in performance to NAN 5 GHz, and NAN 5 GHz may be superior in performance to NAN 2.4 GHz. Accordingly, NAN 6 GHz may have a highest priority. Thus, a new scheduling operation may be performed between the electronic device 101 and the second external electronic device 103 so that a data link may be formed between the electronic device 101 and the second external electronic device 103 using a NAN 6 GHz frequency band and may be used. As shown in FIG. 12D, the data link between the electronic device 101 and the second external electronic device 103 may be formed as the NAN 6 GHz Band CH 101, and actually measured performance of the NAN 6 GHz Band CH 101 may be about 1600 Mbps.

Figure 13A:
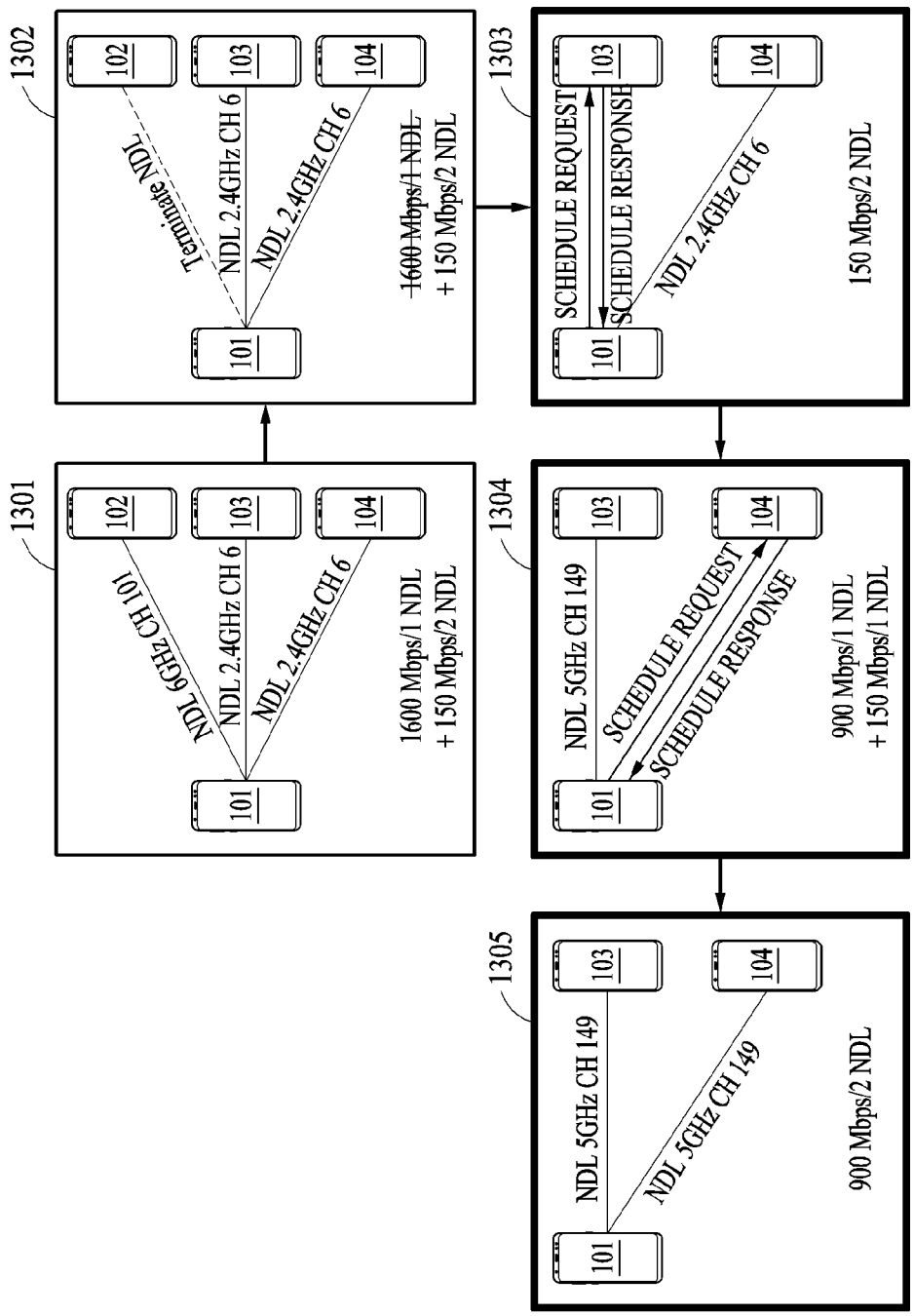
FIG. 13A is a diagram illustrating an example in which the scheduling operation of FIG. 8 is performed according to various embodiments.

FIG. 13A is a diagram illustrating an example in which the scheduling operation of FIG. 8 is performed according to various embodiments.

In FIG. 13A, it may be assumed that the electronic device 101 and the first external electronic device 102 are devices of the first type (e.g., devices for supporting frequency bands of 2.4 GHz, 5 GHz, and 6 GHz, and supporting an RSDB) and that the second external electronic device 103 and the third external electronic device 104 are devices of the second type (e.g., a device for supporting frequency bands of 2.4 GHz and 5 GHz, and supporting an RSDB).

In operation 1301, a first data link (e.g., NDL 6 GHz CH 101) using a frequency band (e.g., 6 GHz) as a communication protocol (e.g., NAN) may be set between the electronic device 101 and the first external electronic device 102, and a second data link (e.g., NDL 2.4 GHz CH 6) using a frequency band (e.g., 2.4 GHz) as a communication protocol (e.g., NAN) may be set between the electronic device 101 and the second external electronic device 103. A third data link (e.g., NDL 2.4 GHz CH 6) using a frequency band (e.g., 2.4 GHz) as a communication protocol (e.g., NAN) may be set between the electronic device 101 and the third external electronic device 104.

When the first data link (e.g., NDL 6 GHz CH 101) between the electronic device 101 and the first external electronic device 102 is terminated, the electronic device 101 may determine that an available frequency band of the electronic device 101 is changed from 6 GHz+2.4 GHz to 6 GHz+5 GHz+2.4 GHz in operation 1302.

In operation 1303, the electronic device 101 may transmit a schedule request (e.g., SCHEDULE REQUEST) including available frequency band information (e.g., 6 GHz, 5 GHz, and 2.4 GHz) to the second external electronic device 103. A frequency band of the second data link (e.g., NDL 2.4 GHz CH 6) of the second external electronic device 103 may be 2.4 GHz, and the second external electronic device 103, which is the device of the second type, may use frequency bands of 5 GHz and 2.4 GHz. The second external electronic device 103 may select at least one available frequency band (e.g., 5 GHz, and 2.4 GHz) that may be used by both the electronic device 101 and the second external electronic device 103, based on the available frequency band information (e.g., 6 GHz, 5 GHz, and 2.4 GHz) included in the schedule request received from the electronic device 101. An available frequency band (e.g., 5 GHz) having a higher priority than 2.4 GHz that is the frequency band of the second data link (e.g., NDL 2.4 GHz CH 6) of the second external electronic device 103 may be used, and accordingly the second external electronic device 103 may select a channel (e.g., CH 149) that may be used by both the electronic device 101 and the second external electronic device 103 in the available frequency band (e.g., 5 GHz) and may transmit a schedule response (e.g., SCHEDULE RESPONSE) including information on the available frequency band (e.g., 5 GHz) and the channel (e.g., CH 149) (e.g., channel information and/or bandwidth information) of the available frequency band (e.g., 5 GHz) to the electronic device 101.

In operation 1304, the electronic device 101 and the second external electronic device 103 may change the second data link (e.g., NDL 2.4 GHz CH 6) to a fourth data link (e.g., NDL 5 GHz CH 149) that uses the channel (e.g., CH 149) of the available frequency band (e.g., 5 GHz), and may perform communication.

In addition, a scheduling operation for changing a data link between the electronic device 101 and the third external electronic device 104 may be performed. A scheduling operation described with reference to operation 1303 may be substantially identically applied to a change of a data link between the electronic device 101 and the third external electronic device 104.

In operation 1304, the electronic device 101 may transmit a schedule request (e.g., SCHEDULE REQUEST) including available frequency band information (e.g., 6 GHz, 5 GHz, and 2.4 GHz) to the third external electronic device 104. The electronic device 101 may also transmit available frequency band information (e.g., 5 GHz, and 2.4 GHz) to the third external electronic device 104 based on the second external electronic device 103 and the fourth data link (e.g., NDL 5 GHz CH 149) that is newly set. A frequency band of the third data link (e.g., NDL 2.4 GHz CH 6) of the third external electronic device 104 may be 2.4 GHz, and the third external electronic device 104, which is the device of the second type, may use frequency bands of 5 GHz and 2.4 GHz. The third external electronic device 104 may select at least one available frequency band (e.g., 5 GHz, and 2.4 GHz) that may be used by both the electronic device 101 and the third external electronic device 104, based on the available frequency band information (e.g., 6 GHz, 5 GHz, and 2.4 GHz) included in the schedule request received from the electronic device 101. An available frequency band (e.g., 5 GHz) having a higher priority than 2.4 GHz that is the frequency band of the third data link (e.g., NDL 2.4 GHz CH 6) of the third external electronic device 104 may be used, and accordingly the third external electronic device 104 may select a channel (e.g., CH 149) that may be used by both the electronic device 101 and the third external electronic device 104 in the available frequency band (e.g., 5 GHz) and may transmit a schedule response (e.g., SCHEDULE RESPONSE) including information on the available frequency band (e.g., 5 GHz) and the channel (e.g., CH 149) (e.g., channel information and/or bandwidth information) of the available frequency band (e.g., 5 GHz) to the electronic device 101.

In operation 1305, the electronic device 101 and the third external electronic device 104 may change the third data link (e.g., NDL 2.4 GHz CH 6) to a fifth data link (e.g., NDL 5 GHz CH 149) that uses the channel (e.g., CH 149) of the available frequency band (e.g., 5 GHz), and may perform communication.

Figure 13B:
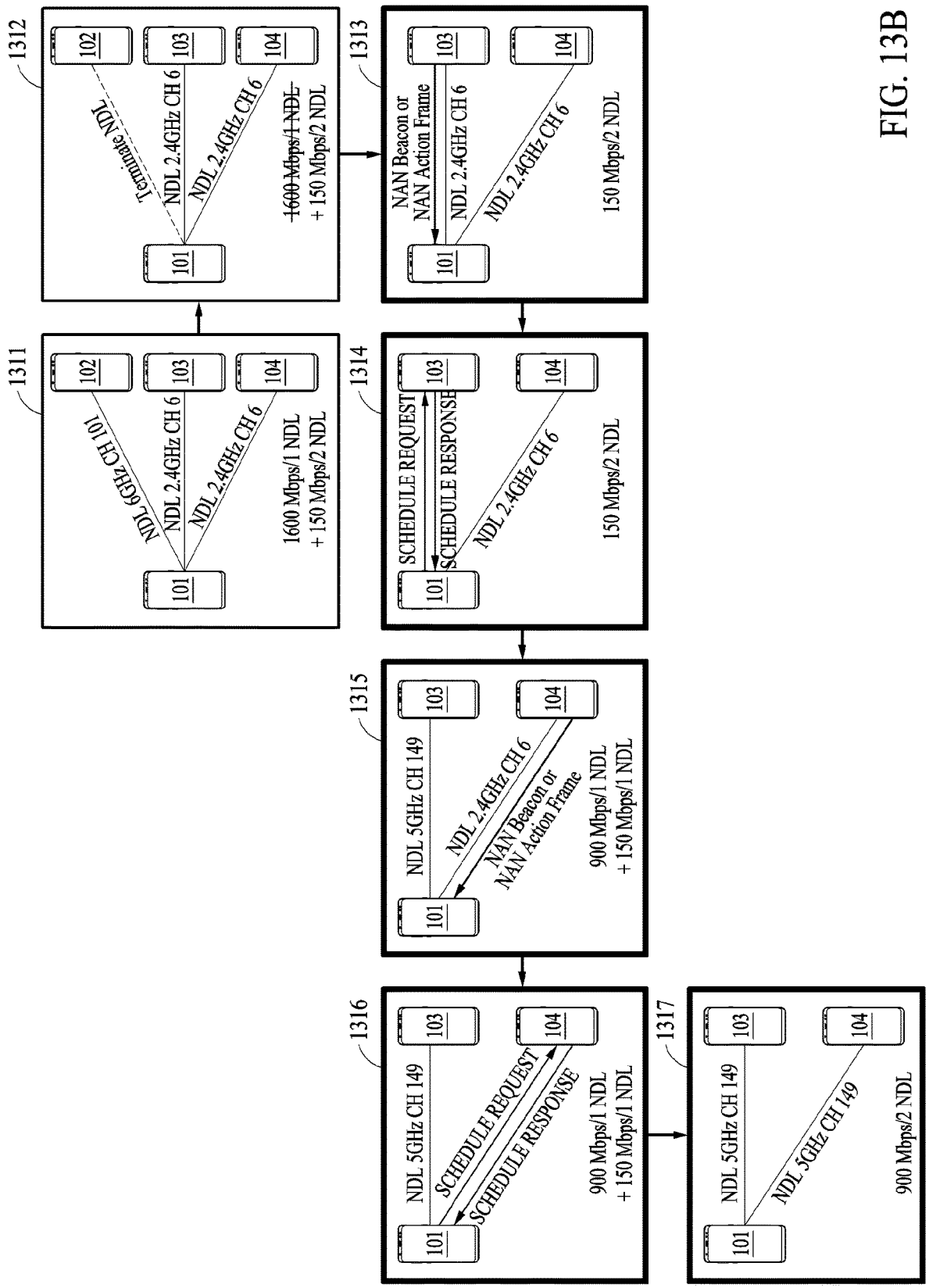
FIG. 13B is a diagram illustrating an example in which the scheduling operation of FIG. 9 is performed according to various embodiments.

FIG. 13B is a diagram illustrating an example in which the scheduling operation of FIG. 9 is performed according to various embodiments.

In FIG. 13B, it may be assumed that the electronic device 101 and the first external electronic device 102 are devices of the first type (e.g., devices for supporting frequency bands of 2.4 GHz, 5 GHz, and 6 GHz, and supporting an RSDB) and that the second external electronic device 103 and the third external electronic device 104 are devices of the second type (e.g., a device for supporting frequency bands of 2.4 GHz and 5 GHz, and supporting an RSDB).

In operation 1311, a first data link (e.g., NDL 6 GHz CH 101) using a frequency band (e.g., 6 GHz) as a communication protocol (e.g., NAN) may be set between the electronic device 101 and the first external electronic device 102, and a second data link (e.g., NDL 2.4 GHz CH 6) using a frequency band (e.g., 2.4 GHz) as a communication protocol (e.g., NAN) may be set between the electronic device 101 and the second external electronic device 103. A third data link (e.g., NDL 2.4 GHz CH 6) using a frequency band (e.g., 2.4 GHz) as a communication protocol (e.g., NAN) may be set between the electronic device 101 and the third external electronic device 104.

In operation 1312, the first data link (e.g., NDL 6 GHz CH 101) between the electronic device 101 and the first external electronic device 102 may be terminated.

In operation 1313, the electronic device 101 may receive a beacon (e.g., a synchronization beacon) or NAF including available frequency band information (e.g., 5 GHz, and 2.4 GHz) of the second external electronic device 103 from the second external electronic device 103.

In operation 1314, the electronic device 101 may identify at least one available frequency band (e.g., 5 GHz, and 2.4 GHz) that may be used by both the electronic device 101 and the second external electronic device 103 among available frequency bands (e.g., 5 GHz, and 2.4 GHz) of the second external electronic device 103 and available frequency bands (e.g., 6 GHz, 5 GHz, and 2.4 GHz) of the electronic device 101. The electronic device 101 may compare the frequency band (e.g., 2.4 GHz) of the second data link (e.g., NDL 2.4 GHz CH 6) to an available frequency band (e.g., 5 GHz, and 2.4 GHz) that may be newly used between the electronic device 101 and the second external electronic device 103 according to priorities. An available frequency band (e.g., 5 GHz) having a higher priority than that of 2.4 GHz that is the frequency band of the second data link (e.g., NDL 2.4 GHz CH 6) may be used, and accordingly the electronic device 101 may transmit a schedule request (e.g., SCHEDULE REQUEST) including a new available frequency band (e.g., 5 GHz) and/or a channel (e.g., CH 149) of the available frequency band (e.g., 5 GHz) to the second external electronic device 103 in order to use the new available frequency band (e.g., 5 GHz). The second external electronic device 103 may identify the new available frequency band (e.g., 5 GHz) and the channel (e.g., CH 149) of the available frequency band (e.g., 5 GHz) included in the schedule request received from the electronic device 101, and may transmit a schedule response (e.g., SCHEDULE RESPONSE), which includes set information on the available frequency band (e.g., 5 GHz) and/or the channel (e.g., CH 149) (e.g., channel information and/or bandwidth information) to set a frequency band of a new data link, to the electronic device 101.

In operation 1315, the electronic device 101 and the second external electronic device 103 may change the second data link (e.g., NDL 2.4 GHz CH 6) to a fourth data link (e.g., NDL 5 GHz CH 149) that uses the channel (e.g., CH 149) of the available frequency band (e.g., 5 GHz), and may perform communication.

In addition, a scheduling operation for changing a data link between the electronic device 101 and the third external electronic device 104 may be performed. A scheduling operation described with reference to operations 1313 and 1314 may be substantially identically applied to a change of a data link between the electronic device 101 and the third external electronic device 104.

In operation 1315, the electronic device 101 may receive a beacon (e.g., a synchronization beacon) or NAF including available frequency band information (e.g., 5 GHz, and 2.4 GHz) of the third external electronic device 104 from the third external electronic device 104.

In operation 1316, the electronic device 101 may identify at least one available frequency band (e.g., 5 GHz, and 2.4 GHz) that may be used by both the electronic device 101 and the third external electronic device 104 among available frequency bands (e.g., 5 GHz, and 2.4 GHz) of the third external electronic device 104 and available frequency bands (e.g., 6 GHz, 5 GHz, and 2.4 GHz) of the electronic device 101. The electronic device 101 may compare the frequency band (e.g., 2.4 GHz) of the third data link (e.g., NDL 2.4 GHz CH 6) to an available frequency band (e.g., 5 GHz, and 2.4 GHz) that may be newly used between the electronic device 101 and the third external electronic device 104 according to priorities. An available frequency band (e.g., 5 GHz) having a higher priority than that of 2.4 GHz that is the frequency band of the third data link (e.g., NDL 2.4 GHz CH 6) may be used, and accordingly the electronic device 101 may transmit a schedule request (e.g., SCHEDULE REQUEST) including a new available frequency band (e.g., 5 GHz) and/or a channel (e.g., CH 149) (e.g., channel information and/or bandwidth information) of the available frequency band (e.g., 5 GHz) to the third external electronic device 104 in order to use the new available frequency band (e.g., 5 GHz). The third external electronic device 104 may identify the new available frequency band (e.g., 5 GHz) and/or the channel (e.g., CH 149) of the available frequency band (e.g., 5 GHz) included in the schedule request received from the electronic device 101, and may transmit a schedule response (e.g., SCHEDULE RESPONSE), which includes set information on the available frequency band (e.g., 5 GHz) and/or the channel (e.g., CH 149) (e.g., channel information and/or bandwidth information) to set a frequency band of a new data link, to the electronic device 101.

In operation 1317, the electronic device 101 and the third external electronic device 104 may change the third data link (e.g., NDL 2.4 GHz CH 6) to a fifth data link (e.g., NDL 5 GHz CH 149) that uses the channel (e.g., CH 149) of the available frequency band (e.g., 5 GHz), and may perform communication.

Figure 13C:
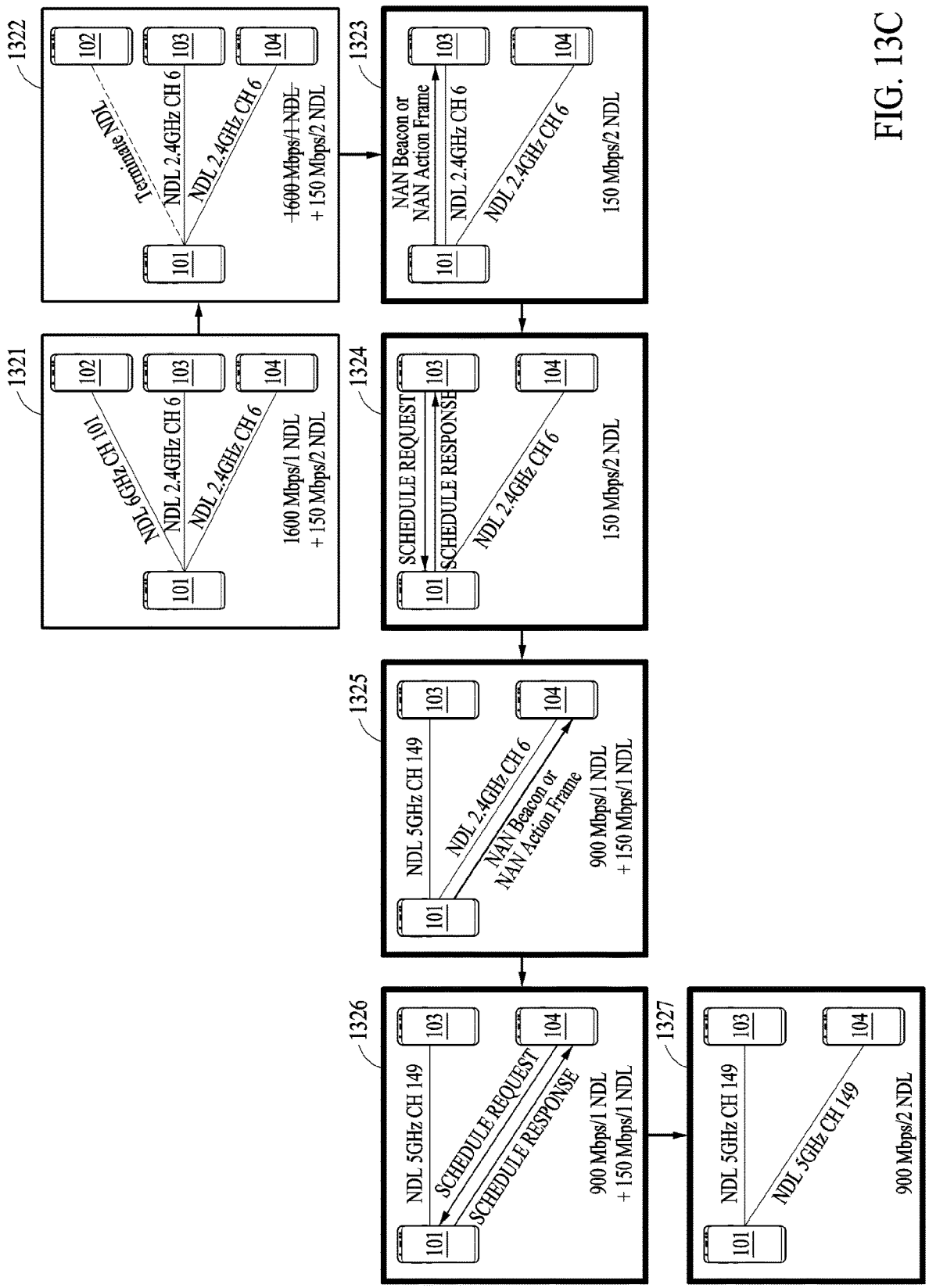
FIG. 13C is a diagram illustrating an example in which the scheduling operation of FIG. 10 is performed according to various embodiments.

FIG. 13C is a diagram illustrating an example in which the scheduling operation of FIG. 10 is performed according to various embodiments.

In FIG. 13C, it may be assumed that the electronic device 101 and the first external electronic device 102 are devices of the first type (e.g., devices for supporting frequency bands of 2.4 GHz, 5 GHz, and 6 GHz, and supporting an RSDB) and that the second external electronic device 103 and the third external electronic device 104 are devices of the second type (e.g., a device for supporting frequency bands of 2.4 GHz and 5 GHz, and supporting an RSDB).

In operation 1321, a first data link (e.g., NDL 6 GHz CH 101) using a frequency band (e.g., 6 GHz) as a communication protocol (e.g., NAN) may be set between the electronic device 101 and the first external electronic device 102, and a second data link (e.g., NDL 2.4 GHz CH 6) using a frequency band (e.g., 2.4 GHz) as a communication protocol (e.g., NAN) may be set between the electronic device 101 and the second external electronic device 103. A third data link (e.g., NDL 2.4 GHz CH 6) using a frequency band (e.g., 2.4 GHz) as a communication protocol (e.g., NAN) may be set between the electronic device 101 and the third external electronic device 104.

In operation 1322, the first data link (e.g., NDL 6 GHz CH 101) between the electronic device 101 and the first external electronic device 102 may be terminated.

In operation 1323, the electronic device 101 may transmit a beacon (e.g., a synchronization beacon) or NAF including available frequency band information (e.g., 6 GHz, 5 GHz, and 2.4 GHz) of the electronic device 101 to the second external electronic device 103.

In operation 1324, the second external electronic device 103 may identify at least one available frequency band (e.g., 5 GHz, and 2.4 GHz) that may be used by both the electronic device 101 and the second external electronic device 103 among available frequency bands (e.g., 5 GHz, and 2.4 GHz) of the second external electronic device 103 and available frequency bands (e.g., 6 GHz, 5 GHz, and 2.4 GHz) of the electronic device 101. The second external electronic device 103 may compare the frequency band (e.g., 2.4 GHz) of the second data link (e.g., NDL 2.4 GHz CH 6) to an available frequency band (e.g., 5 GHz, and 2.4 GHz) that may be newly used between the electronic device 101 and the second external electronic device 103 according to priorities. An available frequency band (e.g., 5 GHz) having a higher priority than that of 2.4 GHz that is the frequency band of the second data link (e.g., NDL 2.4 GHz CH 6) may be used, and accordingly the second external electronic device 103 may transmit a schedule request (e.g., SCHEDULE REQUEST) including a new available frequency band (e.g., 5 GHz) and/or a channel (e.g., CH 149) (e.g., channel information and/or bandwidth information) of the available frequency band (e.g., 5 GHz) to the electronic device 101 in order to use the new available frequency band (e.g., 5 GHz). The electronic device 101 may identify the new available frequency band (e.g., 5 GHz) and/or the channel (e.g., CH 149) of the available frequency band (e.g., 5 GHz) included in the schedule request received from the second external electronic device 103, and may transmit a schedule response (e.g., SCHEDULE RESPONSE), which includes set information on the available frequency band (e.g., 5 GHz) and/or the channel (e.g., CH 149) (e.g., channel information and/or bandwidth information) to set a frequency band of a new data link, to the second external electronic device 103.

In operation 1325, the electronic device 101 and the second external electronic device 103 may change the second data link (e.g., NDL 2.4 GHz CH 6) to a fourth data link (e.g., NDL 5 GHz CH 149) that uses the channel (e.g., CH 149) of the available frequency band (e.g., 5 GHz), and may perform communication.

In addition, a scheduling operation for changing a data link between the electronic device 101 and the third external electronic device 104 may be performed. A scheduling operation described with reference to operations 1323 and 1324 may be substantially identically applied to a change of a data link between the electronic device 101 and the third external electronic device 104.

In operation 1325, the electronic device 101 may transmit a beacon (e.g., a synchronization beacon) or NAF including available frequency band information (e.g., 6 GHz, 5 GHz, and 2.4 GHz) of the electronic device 101 to the third external electronic device 104. The electronic device 101 may also transmit available frequency band information (e.g., 5 GHz, and 2.4 GHz) to the third external electronic device 104 based on the second external electronic device 103 and the fourth data link (e.g., NDL 5 GHz CH 149) that is newly set.

In operation 1326, the third external electronic device 104 may identify at least one available frequency band (e.g., 5 GHz, and 2.4 GHz) that may be used by both the electronic device 101 and the third external electronic device 104 among available frequency bands (e.g., 5 GHz, and 2.4 GHz) of the third external electronic device 104 and available frequency bands (e.g., 6 GHz, 5 GHz, and 2.4 GHz) of the electronic device 101. The third external electronic device 104 may compare the frequency band (e.g., 2.4 GHz) of the third data link (e.g., NDL 2.4 GHz CH 6) to an available frequency band (e.g., 5 GHz, and 2.4 GHz) that may be newly used between the electronic device 101 and the third external electronic device 104 according to priorities. An available frequency band (e.g., 5 GHz) having a higher priority than that of 2.4 GHz that is the frequency band of the third data link (e.g., NDL 2.4 GHz CH 6) may be used, and accordingly the third external electronic device 104 may transmit a schedule request (e.g., SCHEDULE REQUEST) including a new available frequency band (e.g., 5 GHz) and/or a channel (e.g., CH 149) (e.g., channel information and/or bandwidth information) of the available frequency band (e.g., 5 GHz) to the electronic device 101 in order to use the new available frequency band (e.g., 5 GHz). The electronic device 101 may identify the new available frequency band (e.g., 5 GHz) and/or the channel (e.g., CH 149) of the available frequency band (e.g., 5 GHz) included in the schedule request received from the third external electronic device 104, and may transmit a schedule response (e.g., SCHEDULE RESPONSE), which includes set information on the available frequency band (e.g., 5 GHz) and/or the channel (e.g., CH 149) (e.g., channel information and/or bandwidth information) to set a frequency band of a new data link, to the third external electronic device 104.

In operation 1327, the electronic device 101 and the third external electronic device 104 may change the third data link (e.g., NDL 2.4 GHz CH 6) to a fifth data link (e.g., NDL 5 GHz CH 149) that uses the channel (e.g., CH 149) of the available frequency band (e.g., 5 GHz), and may perform communication.

Figure 13D:
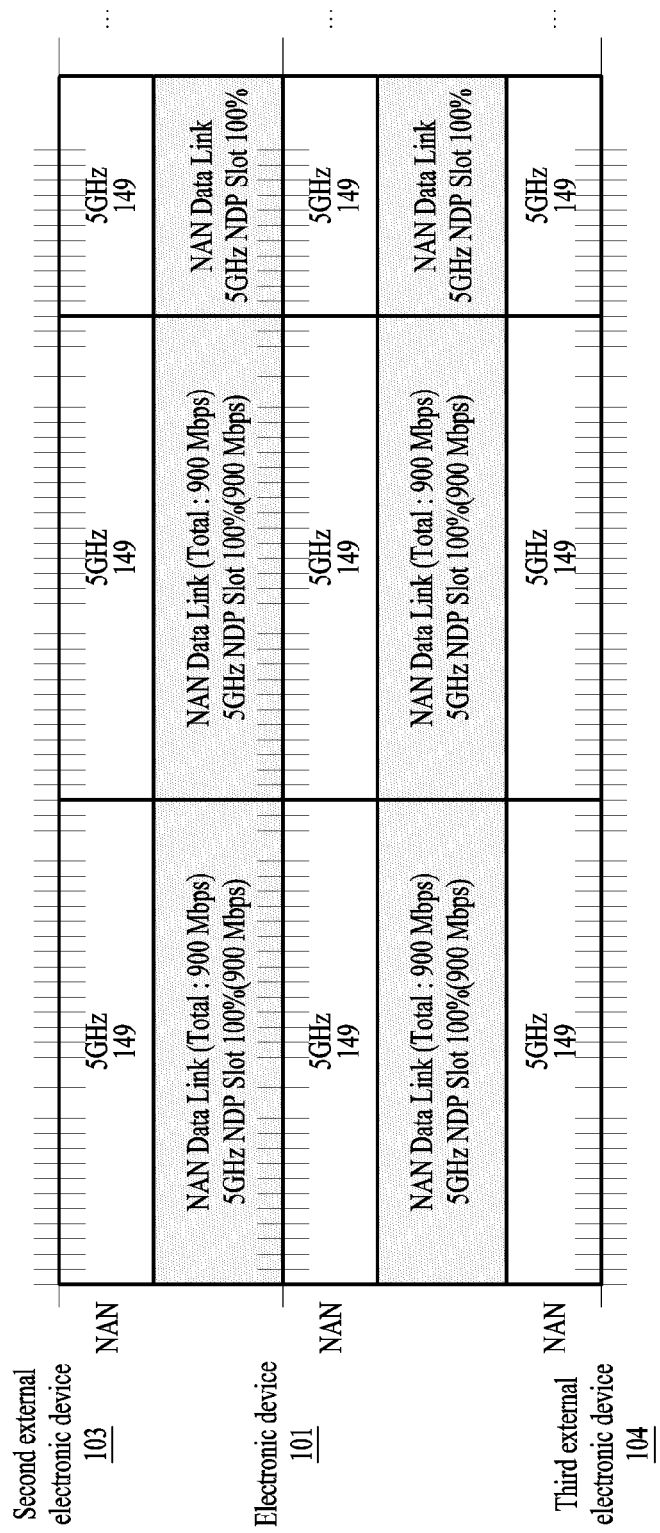
FIG. 13D is a diagram illustrating slots of newly set data links of FIGS. 13A, 13B and 13C according to various embodiments.

FIG. 13D is a diagram illustrating slots of newly set data links of FIGS. 13A, 13B and 13C according to various embodiments.

FIG. 13D illustrates slots of data links finally formed between the electronic device 101 and the second external electronic device 103 and between the electronic device 101 and the third external electronic device 104 in FIGS. 13A to 13C.

Referring to FIG. 13D, the electronic device 101, which is a device of the first type, may support all of NAN 6 GHz, NAN 5 GHz, and NAN 2.4 GHz, and the second external electronic device 103 and the third external electronic device 104, which are devices of the second type, may support NAN 5 GHz and NAN 2.4 GHz. The electronic device 101 and the second external electronic device 103 may support NAN 5 GHz and NAN 2.4 GHz, and the electronic device 101 and the third external electronic device 104 may support NAN 5 GHz and NAN 2.4 GHz. NAN 5 GHz may be superior in performance to NAN 2.4 GHz among frequency bands that may be supported by all (or both) of the electronic device 101, the second external electronic device 103, and the third external electronic device 104, and accordingly NAN 5 GHz may have a higher priority than that of NAN 2.4 GHz. Thus, a new scheduling operation may be performed between the electronic device 101 and the second external electronic device 103 so that a data link may be formed between the electronic device 101 and the second external electronic device 103 using a NAN 5 GHz frequency band and may be used. In addition, a new scheduling operation may be performed between the electronic device 101 and the third external electronic device 104 so that a data link may be formed between the electronic device 101 and the third external electronic device 104 using the NAN 5 GHz frequency band and may be used. As illustrated in FIG. 13D, the data link between the electronic device 101 and the second external electronic device 103 and the data link between the electronic device 101 and the third external electronic device 104 may be formed as NAN 5 GHz Band CH 149, and actually measured performance of the NAN 5 GHz Band CH 149 may be about 900 Mbps.

Figure 14A:
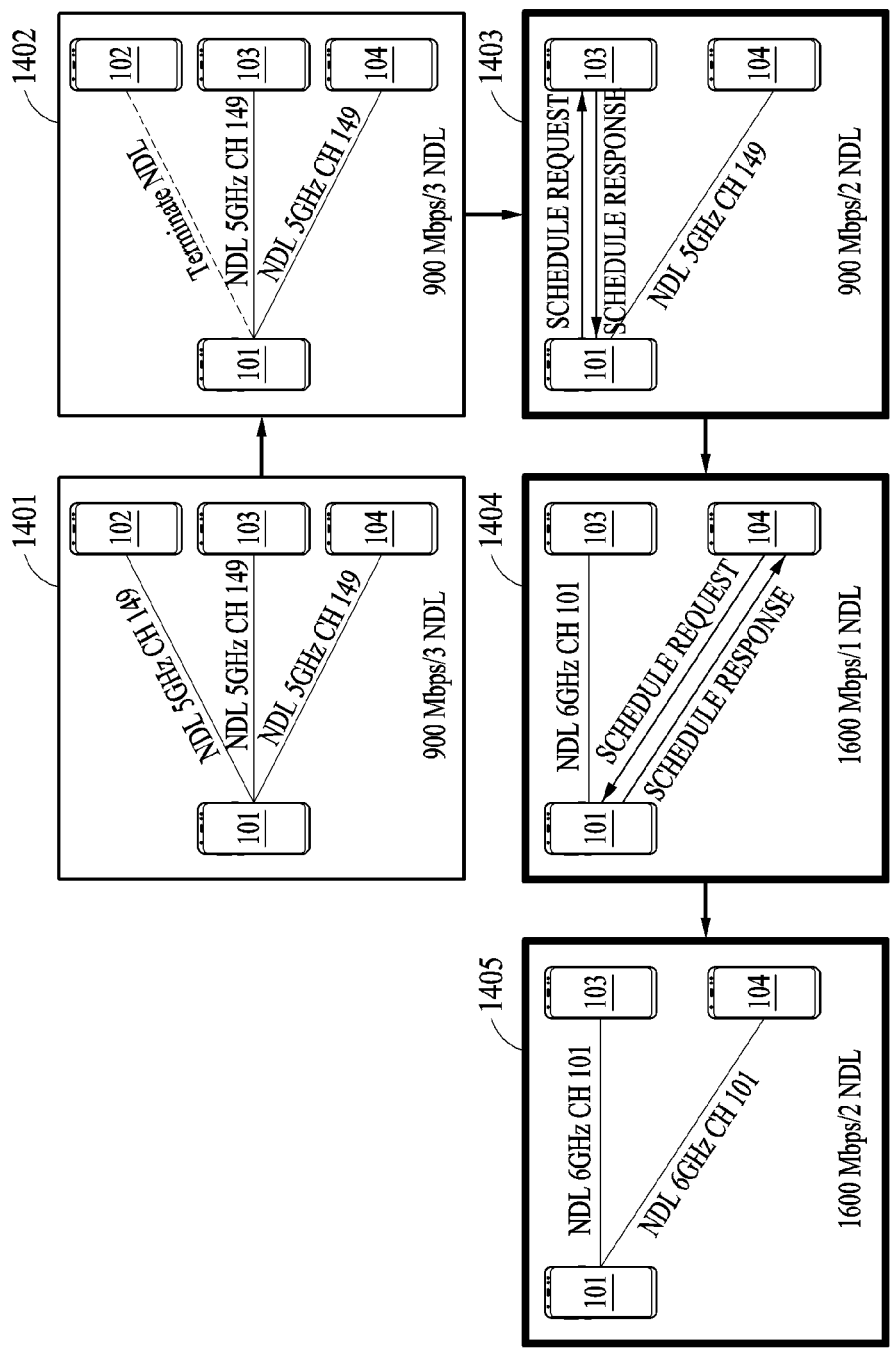
FIG. 14A is a diagram illustrating an example in which the scheduling operation of FIG. 8 is performed according to various embodiments.

FIG. 14A is a diagram illustrating an example in which the scheduling operation of FIG. 8 is performed according to various embodiments.

In FIG. 14A, it may be assumed that the electronic device 101, the second external electronic device 103, and the third external electronic device 104 are devices of the first type (e.g., devices for supporting frequency bands of 2.4 GHz, 5 GHz, and 6 GHz, and supporting an RSDB) and that the first external electronic device 102 is a device of the second type (e.g., a device for supporting frequency bands of 2.4 GHz and 5 GHz, and supporting an RSDB).

In operation 1401, a first data link (e.g., NDL 5 GHz CH 149) using a frequency band (e.g., 5 GHz) as a communication protocol (e.g., NAN) may be set between the electronic device 101 and the first external electronic device 102, and a second data link (e.g., NDL 5 GHz CH 149) using a frequency band (e.g., 5 GHz) as a communication protocol (e.g., NAN) may be set between the electronic device 101 and the second external electronic device 103. A third data link (e.g., NDL 5 GHz CH 149) using a frequency band (e.g., 5 GHz) as a communication protocol (e.g., NAN) may be set between the electronic device 101 and the second external electronic device 103.

When the first data link (e.g., NDL 5 GHz CH 149) between the electronic device 101 and the first external electronic device 102 is terminated, the electronic device 101 may determine that an available frequency band of the electronic device 101 is changed from 5 GHz+2.4 GHz to 6 GHz+5 GHz+2.4 GHz in operation 1402.

In operation 1403, the electronic device 101 may transmit a schedule request (e.g., SCHEDULE REQUEST) including available frequency band information (e.g., 6 GHz, 5 GHz, and 2.4 GHz) to the second external electronic device 103. A frequency band of the second data link (e.g., NDL 5 GHz CH 149) of the second external electronic device 103 may be 5 GHz, and the second external electronic device 103, which is the device of the first type, may use frequency bands of 6 GHz, 5 GHz, and 2.4 GHz. The second external electronic device 103 may select at least one available frequency band (e.g., 6 GHz, 5 GHz, and 2.4 GHz) that may be used by both the electronic device 101 and the second external electronic device 103, based on the available frequency band information (e.g., 6 GHz, 5 GHz, and 2.4 GHz) included in the schedule request received from the electronic device 101. An available frequency band (e.g., 6 GHz) having a higher priority than that of 5 GHz that is the frequency band of the second data link (e.g., NDL 5 GHz CH 149) of the second external electronic device 103 may be used, and accordingly the second external electronic device 103 may select a channel (e.g., CH 101) that may be used by both the electronic device 101 and the second external electronic device 103 in the available frequency band (e.g., 6 GHz) and may transmit a schedule response (e.g., SCHEDULE RESPONSE) including information on the available frequency band (e.g., 6 GHz) and the channel (e.g., CH 101) (e.g., channel information and/or bandwidth information) of the available frequency band (e.g., 6 GHz) to the electronic device 101.

In operation 1404, the electronic device 101 and the second external electronic device 103 may change the second data link (e.g., NDL 5 GHz CH 149) to a fourth data link (e.g., NDL 6 GHz CH 101) that uses the channel (e.g., CH 101) of the available frequency band (e.g., 6 GHz), and may perform communication.

In addition, a scheduling operation for changing a data link between the electronic device 101 and the third external electronic device 104 may be performed. A scheduling operation described with reference to operation 1403 may be substantially identically applied to a change of a data link between the electronic device 101 and the third external electronic device 104.

In operation 1404, the electronic device 101 may transmit a schedule request (e.g., SCHEDULE REQUEST) including available frequency band information (e.g., 6 GHz, 5 GHz, and 2.4 GHz) to the third external electronic device 104. A frequency band of the third data link (e.g., NDL 5 GHz CH 149) of the third external electronic device 104 may be 5 GHz, and the third external electronic device 104, which is the device of the first type, may use frequency bands of 6 GHz, 5 GHz, and 2.4 GHz. The third external electronic device 104 may select at least one available frequency band (e.g., 6 GHz, 5 GHz, and 2.4 GHz) that may be used by both the electronic device 101 and the third external electronic device 104, based on the available frequency band information (e.g., 6 GHz, 5 GHz, and 2.4 GHz) included in the schedule request received from the electronic device 101. An available frequency band (e.g., 6 GHz) having a higher priority than that of 5 GHz that is the frequency band of the third data link (e.g., NDL 5 GHz CH 149) of the third external electronic device 104 may be used, and accordingly the third external electronic device 104 may select a channel (e.g., CH 101) that may be used by both the electronic device 101 and the third external electronic device 104 in the available frequency band (e.g., 6 GHz) and may transmit a schedule response (e.g., SCHEDULE RESPONSE) including information on the available frequency band (e.g., 6 GHz) and the channel (e.g., CH 101) (e.g., channel information and/or bandwidth information) of the available frequency band (e.g., 6 GHz) to the electronic device 101.

In operation 1405, the electronic device 101 and the third external electronic device 104 may change the third data link (e.g., NDL 5 GHz CH 149) to a fifth data link (e.g., NDL 6 GHz CH 101) that uses the channel (e.g., CH 101) of the available frequency band (e.g., 6 GHz), and may perform communication.

Figure 14B:
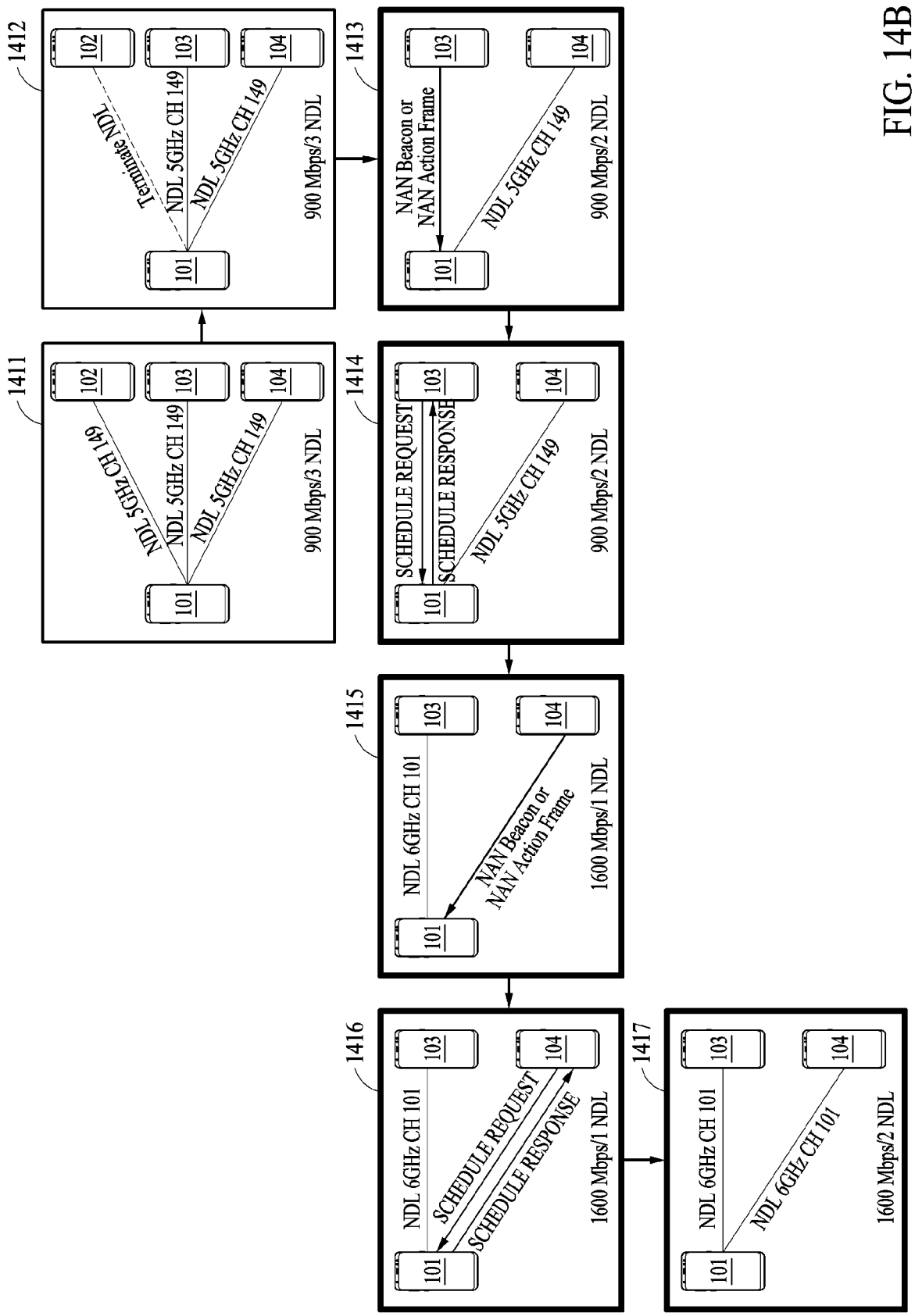
FIG. 14B is a diagram illustrating an example in which the scheduling operation of FIG. 9 is performed according to various embodiments.

FIG. 14B is a diagram illustrating an example in which the scheduling operation of FIG. 9 is performed according to various embodiments.

In FIG. 14B, it may be assumed that the electronic device 101, the second external electronic device 103, and the third external electronic device 104 are devices of the first type (e.g., devices for supporting frequency bands of 2.4 GHz, 5 GHz, and 6 GHz, and supporting an RSDB) and that the first external electronic device 102 is a device of the second type (e.g., a device for supporting frequency bands of 2.4 GHz and 5 GHz, and supporting an RSDB).

In operation 1411, a first data link (e.g., NDL 5 GHz CH 149) using a frequency band (e.g., 5 GHz) as a communication protocol (e.g., NAN) may be set between the electronic device 101 and the first external electronic device 102, and a second data link (e.g., NDL 5 GHz CH 149) using a frequency band (e.g., 5 GHz) as a communication protocol (e.g., NAN) may be set between the electronic device 101 and the second external electronic device 103. A third data link (e.g., NDL 5 GHz CH 149) using a frequency band (e.g., 5 GHz) as a communication protocol (e.g., NAN) may be set between the electronic device 101 and the second external electronic device 103.

In operation 1412, the first data link (e.g., NDL 5 GHz CH 149) between the electronic device 101 and the first external electronic device 102 may be terminated.

In operation 1413, the electronic device 101 may receive a beacon (e.g., a synchronization beacon) or NAF including available frequency band information (e.g., 6 GHz, 5 GHz, and 2.4 GHz) of the second external electronic device 103 from the second external electronic device 103.

In operation 1414, the electronic device 101 may identify at least one available frequency band (e.g., 6 GHz, 5 GHz, and 2.4 GHz) that may be used by both the electronic device 101 and the second external electronic device 103 among available frequency bands (e.g., 6 GHz, 5 GHz, and 2.4 GHz) of the second external electronic device 103 and available frequency bands (e.g., 6 GHz, 5 GHz, and 2.4 GHz) of the electronic device 101. The electronic device 101 may compare the frequency band (e.g., 5 GHz) of the second data link (e.g., NDL 5 GHz CH 149) to an available frequency band (e.g., 6 GHz, 5 GHz, and 2.4 GHz) that may be newly used between the electronic device 101 and the second external electronic device 103 according to priorities. An available frequency band (e.g., 6 GHz) having a higher priority than that of 5 GHz that is the frequency band of the second data link (e.g., NDL 5 GHz CH 149) may be used, and accordingly the electronic device 101 may transmit a schedule request (e.g., SCHEDULE REQUEST) including a new available frequency band (e.g., 6 GHz) and/or a channel (e.g., CH 101) (e.g., channel information and/or bandwidth information) of the available frequency band (e.g., 6 GHz) to the second external electronic device 103 in order to use the new available frequency band (e.g., 6 GHz). The second external electronic device 103 may identify the new available frequency band (e.g., 6 GHz)

and/or the channel (e.g., CH 101) of the available frequency band (e.g., 6 GHz) included in the schedule request received from the electronic device 101, and may transmit a schedule response (e.g., SCHEDULE RESPONSE), which includes set information on the available frequency band (e.g., 6 GHz) and/or the channel (e.g., CH 101) (e.g., channel information and/or bandwidth information) to set a frequency band of a new data link, to the electronic device 101.

In operation 1415, the electronic device 101 and the second external electronic device 103 may change the second data link (e.g., NDL 5 GHz CH 149) to a fourth data link (e.g., NDL 6 GHz CH 101) that uses the channel (e.g., CH 101) of the available frequency band (e.g., 6 GHz), and may perform communication.

In addition, a scheduling operation for changing a data link between the electronic device 101 and the third external electronic device 104 may be performed. A scheduling operation described with reference to operations 1413 and 1414 may be substantially identically applied to a change of a data link between the electronic device 101 and the third external electronic device 104.

In operation 1415, the electronic device 101 may receive a beacon (e.g., a synchronization beacon) or NAF including available frequency band information (e.g., 6 GHz, 5 GHz, and 2.4 GHz) of the third external electronic device 104 from the third external electronic device 104.

In operation 1416, the electronic device 101 may identify at least one available frequency band (e.g., 6 GHz, 5 GHz, and 2.4 GHz) that may be used by both the electronic device 101 and the third external electronic device 104 among available frequency bands (e.g., 6 GHz, 5 GHz, and 2.4 GHz) of the third external electronic device 104 and available frequency bands (e.g., 6 GHz, 5 GHz, and 2.4 GHz) of the electronic device 101. The electronic device 101 may compare the frequency band (e.g., 5 GHz) of the third data link (e.g., NDL 5 GHz CH 149) to an available frequency band (e.g., 6 GHz, 5 GHz, and 2.4 GHz) that may be newly used between the electronic device 101 and the third external electronic device 104 according to priorities. An available frequency band (e.g., 6 GHz) having a higher priority than that of 5 GHz that is the frequency band of the third data link (e.g., NDL 5 GHz CH 149) may be used, and accordingly the electronic device 101 may transmit a schedule request (e.g., SCHEDULE REQUEST) including a new available frequency band (e.g., 6 GHz) and/or a channel (e.g., CH 101) (e.g., channel information and/or bandwidth information) of the available frequency band (e.g., 6 GHz) to the third external electronic device 104 in order to use the new available frequency band (e.g., 6 GHz). The third external electronic device 104 may identify the new available frequency band (e.g., 6 GHz) and/or the channel (e.g., CH 101) of the available frequency band (e.g., 6 GHz) included in the schedule request received from the electronic device 101, and may transmit a schedule response (e.g., SCHEDULE RESPONSE), which includes set information on the available frequency band (e.g., 6 GHz) and/or the channel (e.g., CH 101) (e.g., channel information and/or bandwidth information) to set a frequency band of a new data link, to the electronic device 101.

In operation 1417, the electronic device 101 and the third external electronic device 104 may change the third data link (e.g., NDL 5 GHz CH 149) to a fifth data link (e.g., NDL 6 GHz CH 101) that uses the channel (e.g., CH 101) of the available frequency band (e.g., 6 GHz), and may perform communication.

Figure 14C:
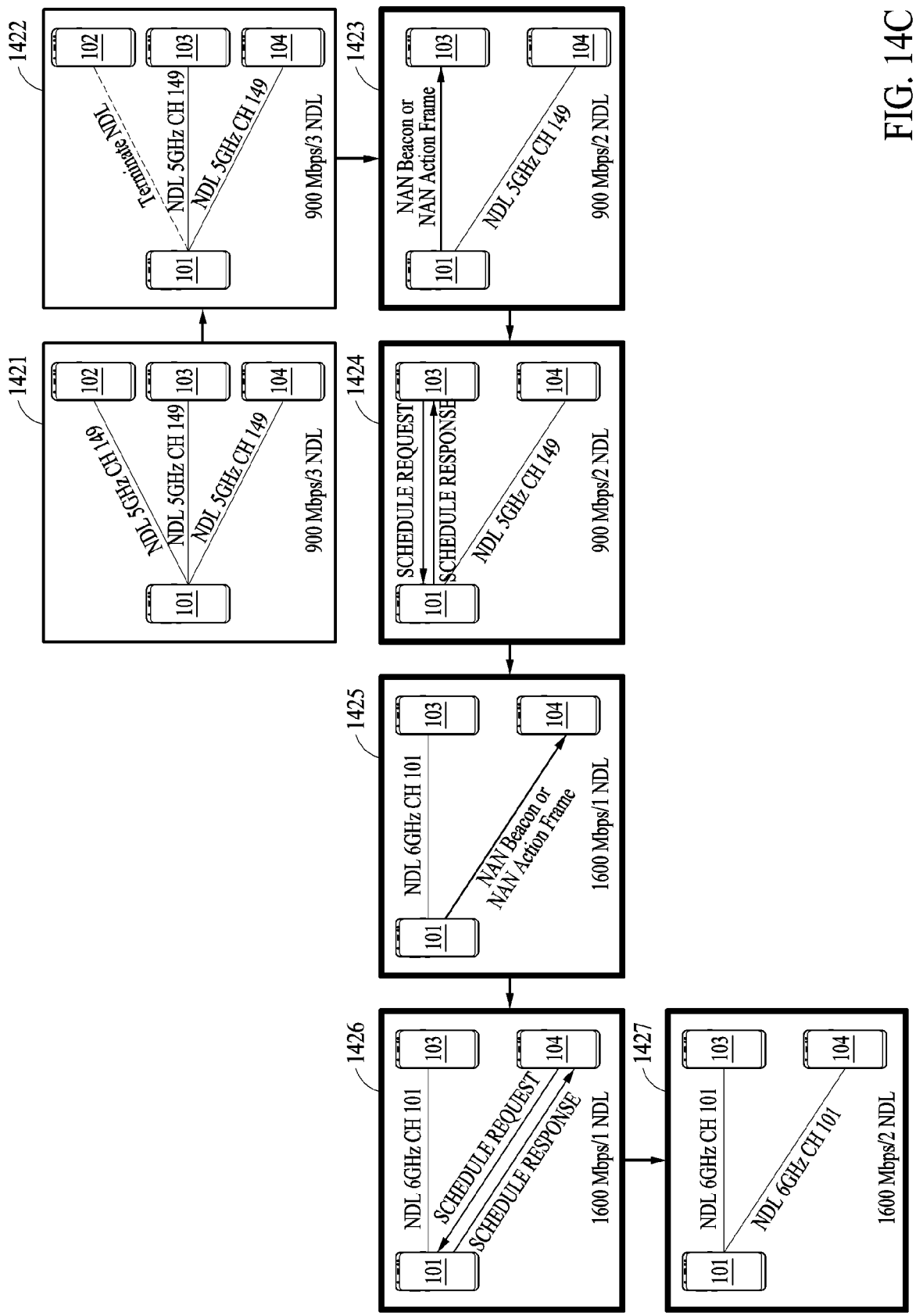
FIG. 14C is a diagram illustrating an example in which the scheduling operation of FIG. 10 is performed according to various embodiments.

FIG. 14C is a diagram illustrating an example in which the scheduling operation of FIG. 10 is performed according to various embodiments.

In FIG. 14C, it may be assumed that the electronic device 101, the second external electronic device 103, and the third external electronic device 104 are devices of the first type (e.g., devices for supporting frequency bands of 2.4 GHz, 5 GHz, and 6 GHz, and supporting an RSDB) and that the first external electronic device 102 is a device of the second type (e.g., a device for supporting frequency bands of 2.4 GHz and 5 GHz, and supporting an RSDB).

In operation 1421, a first data link (e.g., NDL 5 GHz CH 149) using a frequency band (e.g., 5 GHz) as a communication protocol (e.g., NAN) may be set between the electronic device 101 and the first external electronic device 102, and a second data link (e.g., NDL 5 GHz CH 149) using a frequency band (e.g., 5 GHz) as a communication protocol (e.g., NAN) may be set between the electronic device 101 and the second external electronic device 103. A third data link (e.g., NDL 5 GHz CH 149) using a frequency band (e.g., 5 GHz) as a communication protocol (e.g., NAN) may be set between the electronic device 101 and the second external electronic device 103.

In operation 1422, the first data link (e.g., NDL 5 GHz CH 149) between the electronic device 101 and the first external electronic device 102 may be terminated.

In operation 1423, the electronic device 101 may transmit a beacon (e.g., a synchronization beacon) or NAF including available frequency band information (e.g., 6 GHz, 5 GHz, and 2.4 GHz) of the electronic device 101 to the second external electronic device 103.

In operation 1424, the second external electronic device 103 may identify at least one available frequency band (e.g., 6 GHz, 5 GHz, and 2.4 GHz) that may be used by both the electronic device 101 and the second external electronic device 103 among available frequency bands (e.g., 6 GHz, 5 GHz, and 2.4 GHz) of the second external electronic device 103 and available frequency bands (e.g., 6 GHz, 5 GHz, and 2.4 GHz) of the electronic device 101. The second external electronic device 103 may compare the frequency band (e.g., 5 GHz) of the second data link (e.g., NDL 5 GHz CH 149) to an available frequency band (e.g., 6 GHz, 5 GHz, and 2.4 GHz) that may be newly used between the electronic device 101 and the second external electronic device 103 according to priorities. An available frequency band (e.g., 6 GHz) having a higher priority than that of 5 GHz that is the frequency band of the second data link (e.g., NDL 5 GHz CH 149) may be used, and accordingly the second external electronic device 103 may transmit a schedule request (e.g., SCHEDULE REQUEST) including a new available frequency band (e.g., 6 GHz) and/or a channel (e.g., CH 101) (e.g., channel information and/or bandwidth information) of the available frequency band (e.g., 6 GHz) to the electronic device 101 in order to use the new available frequency band (e.g., 6 GHz). The electronic device 101 may identify the new available frequency band (e.g., 6 GHz) and/or the channel (e.g., CH 101) of the available frequency band (e.g., 6 GHz) included in the schedule request received from the second external electronic device 103, and may transmit a schedule response (e.g., SCHEDULE RESPONSE), which includes set information on the available frequency band (e.g., 6 GHz) and/or the channel (e.g., CH 101) (e.g., channel information and/or bandwidth information) to set a frequency band of a new data link, to the second external electronic device 103.

In operation 1425, the electronic device 101 and the second external electronic device 103 may change the second data link (e.g., NDL 5 GHz CH 149) to a fourth data link (e.g., NDL 6 GHz CH 101) that uses the channel (e.g., CH 101) of the available frequency band (e.g., 6 GHz), and may perform communication.

In addition, a scheduling operation for changing a data link between the electronic device 101 and the third external electronic device 104 may be performed. A scheduling operation described with reference to operations 1423 and 1424 may be substantially identically applied to a change of a data link between the electronic device 101 and the third external electronic device 104.

In operation 1425, the electronic device 101 may transmit a beacon (e.g., a synchronization beacon) or NAF including available frequency band information (e.g., 6 GHz, 5 GHz, and 2.4 GHz) of the electronic device 101 to the third external electronic device 104.

In operation 1426, the third external electronic device 104 may identify at least one available frequency band (e.g., 6 GHz, 5 GHz, and 2.4 GHz) that may be used by both the electronic device 101 and the third external electronic device 104 among available frequency bands (e.g., 6 GHz, 5 GHz, and 2.4 GHz) of the third external electronic device 104 and available frequency bands (e.g., 6 GHz, 5 GHz, and 2.4 GHz) of the electronic device 101. The third external electronic device 104 may compare the frequency band (e.g., 5 GHz) of the second data link (e.g., NDL 5 GHz CH 149) to an available frequency band (e.g., 6 GHz, 5 GHz, and 2.4 GHz) that may be newly used between the electronic device 101 and the third external electronic device 104 according to priorities. An available frequency band (e.g., 6 GHz) having a higher priority than that of 5 GHz that is the frequency band of the third data link (e.g., NDL 5 GHz CH 149) may be used, and accordingly the third external electronic device 104 may transmit a schedule request (e.g., SCHEDULE REQUEST) including a new available frequency band (e.g., 6 GHz) and/or a channel (e.g., CH 101) (e.g., channel information and/or bandwidth information) of the available frequency band (e.g., 6 GHz) to the electronic device 101 in order to use the new available frequency band (e.g., 6 GHz). The electronic device 101 may identify the new available frequency band (e.g., 6 GHz) and/or the channel (e.g., CH 101) of the available frequency band (e.g., 6 GHz) included in the schedule request received from the third external electronic device 104, and may transmit a schedule response (e.g., SCHEDULE RESPONSE), which includes set information on the available frequency band (e.g., 6 GHz) and/or the channel (e.g., CH 101) (e.g., channel information and/or bandwidth information) to set a frequency band of a new data link, to the third external electronic device 104.

In operation 1427, the electronic device 101 and the third external electronic device 104 may change the third data link (e.g., NDL 5 GHz CH 149) to a fifth data link (e.g., NDL 6 GHz CH 101) that uses the channel (e.g., CH 101) of the available frequency band (e.g., 6 GHz), and may perform communication.

Figure 14D:
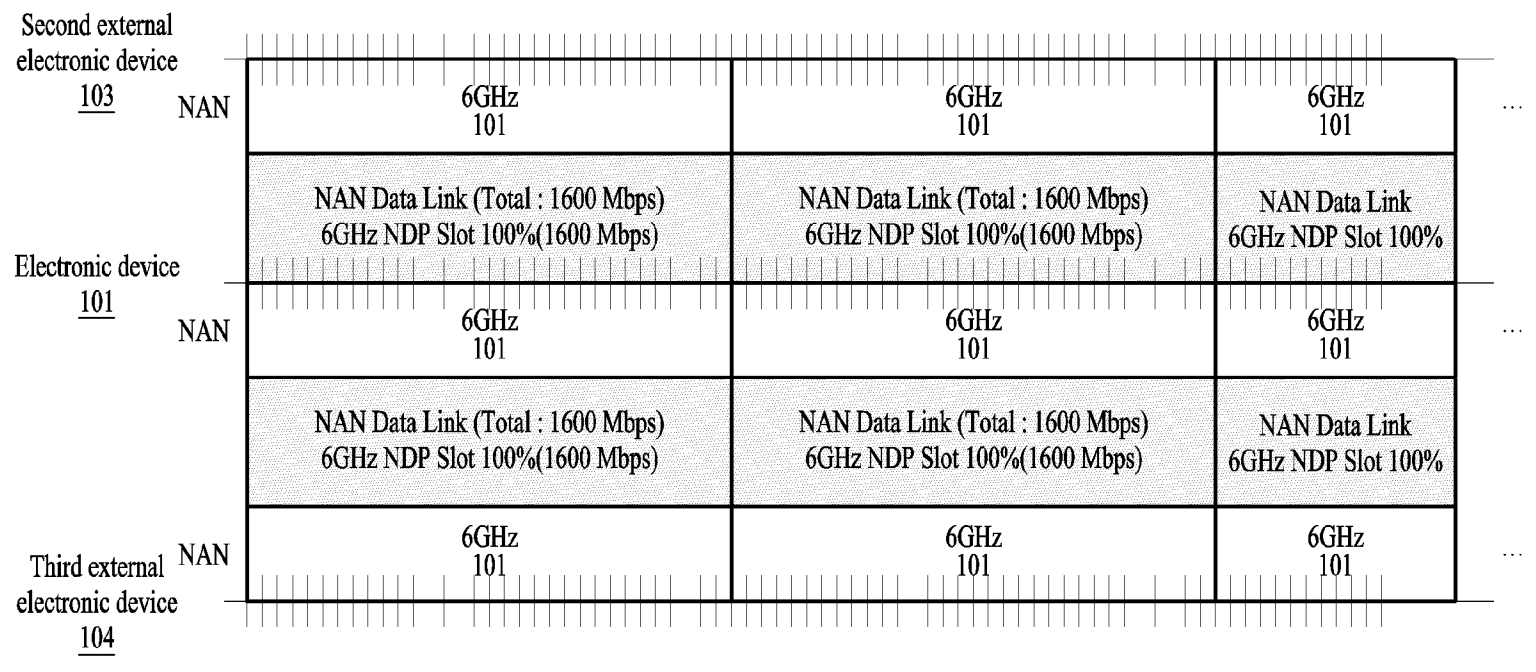

FIG. 14D is a diagram illustrating slots of newly set data links of FIGS. 14A, 14B and 14C according to various embodiments.

FIG. 14D illustrates slots of data links finally formed between the electronic device 101 and the second external electronic device 103 and between the electronic device 101 and the third external electronic device 104 in FIGS. 14A to 14C.

Referring to FIG. 14D, the electronic device 101, the second external electronic device 103, and the third external electronic device 104, which are devices of the first type, may support all of NAN 6 GHz, NAN 5 GHz, and NAN 2.4 GHz. In other words, the electronic device 101, the second external electronic device 103, and the third external electronic device 104 may support all (or both) of NAN 6 GHz, NAN 5 GHz, and NAN 2.4 GHz. Among frequency bands that may be supported by all (or both) of the electronic device 101, the second external electronic device 103, and the third external electronic device 104, NAN 6 GHz may be superior in performance to NAN 5 GHz, and NAN 5 GHz may be superior in performance to NAN 2.4 GHz. Accordingly, NAN 6 GHz may have a highest priority. Thus, a new scheduling operation may be performed between the electronic device 101 and the second external electronic device 103 so that a data link may be formed between the electronic device 101 and the second external electronic device 103 using a NAN 6 GHz frequency band and may be used. In addition, a new scheduling operation may be performed between the electronic device 101 and the third external electronic device 104 so that a data link may be formed between the electronic device 101 and the third external electronic device 104 using the NAN 6 GHz frequency band and may be used. As illustrated in FIG. 14D, the data link between the electronic device 101 and the second external electronic device 103 and the data link between the electronic device 101 and the third external electronic device 104 may be formed as NAN 6 GHz Band CH 101, and actually measured performance of the NAN 6 GHz Band CH 101 may be about 1600 Mbps.

Figure 15:
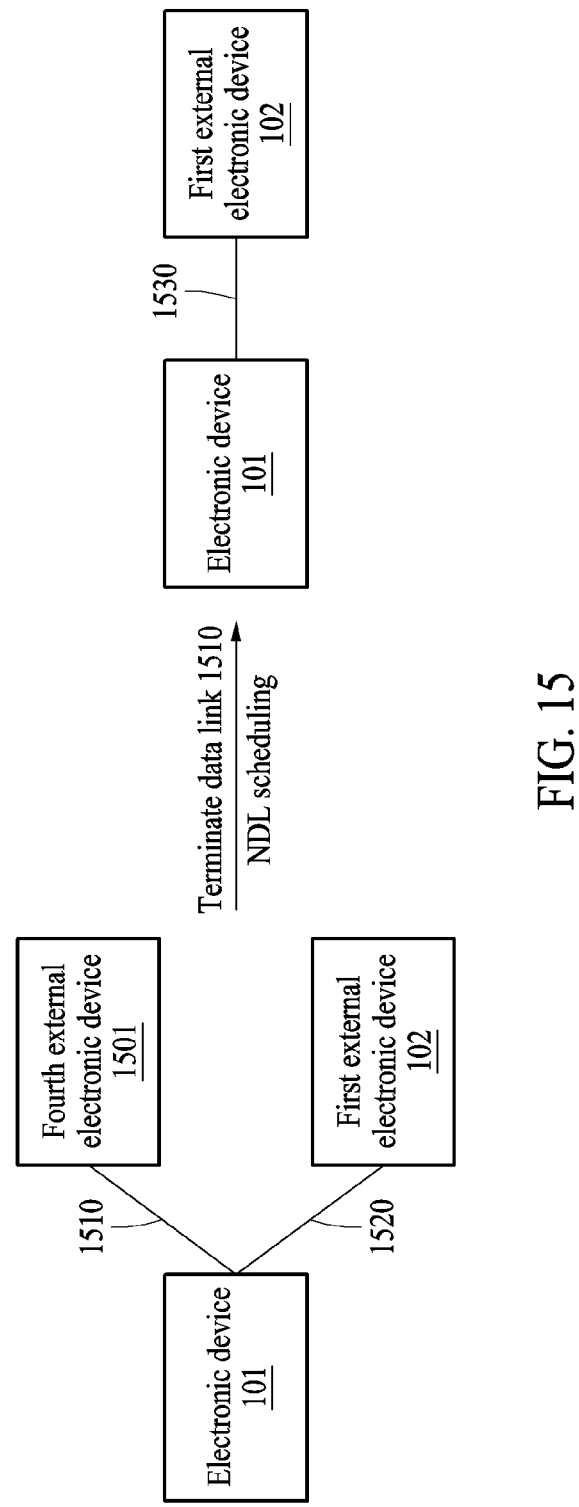
FIG. 15 is a diagram illustrating an example of an NDL scheduling method by a change in a frequency band according to various embodiments.

FIG. 15 is a diagram illustrating an example of an NDL scheduling method by a change in a frequency band according to various embodiments.

Referring to FIG. 15, according to various example embodiments, an electronic device 101 may perform NDL scheduling (e.g., updating, or rescheduling) based on a change in a frequency band due to a termination (e.g., a connection termination) of at least one data link formed in the electronic device 101. For example, the electronic device 101 may schedule a data link of a first external electronic device 102 that maintains a connection to the electronic device 101 in response to a change in a frequency band due to a termination of a data link of a fourth external electronic device 1501 (e.g., an access point (AP)). For convenience of description, an operation of the NDL scheduling method based on the change in the frequency band is described based on the electronic device 101. However, an operation of the electronic device 101 may be substantially identically applied to the external electronic device 102, and an operation of the external electronic device 102 may be substantially identically applied to the electronic device 101. Although only two external electronic devices (e.g., the fourth external electronic device 1501 and the first external electronic device 102) are illustrated in FIG. 15 for convenience of description, various example embodiments are not limited thereto, and substantially the same operations as those described above may be performed even though three or more external electronic devices are connected to the electronic device 101.

According to various example embodiments, the electronic device 101 and the fourth external electronic device 1501 may set a schedule for a first data link 1510 that uses a first frequency band (e.g., 2.4 GHz, 5 GHz, or 6 GHz) as a first communication protocol (e.g., Wi-Fi). The first communication protocol may be a protocol for supporting a non-NAN communication operation.

According to various example embodiments, the electronic device 101 connected to the fourth external electronic device 1501 may schedule a second data link 1520 with the first external electronic device 102 by combining one or more frequency bands. For example, the electronic device 101 may schedule the second data link 1520 with the first external electronic device 102 by combining two different frequency bands, and may communicate with the first external electronic device 102 by switching the two frequency bands through time division (e.g., 50%). In this example, the electronic device 101 and the first external electronic device 102 may perform data communication with an efficiency of up to about 50%. If the electronic device 101 connected to the fourth external electronic device 1501 that supports a frequency band (e.g., 5 GHz) is a device of the first type (e.g., a device for supporting frequency bands 2.4 GHz, 5 GHz, and 6 GHz, and supporting an RSDB), it may be difficult for the electronic device 101 to use 5 GHz and 6 GHz bands at the same time. However, through the time division, the electronic device 101 may use the 5 GHz band for non-NAN communication (e.g., Wi-Fi) with the fourth external electronic device 1501 for 50%, and may use the 6 GHz band for NAN communication with the first external electronic device 102 for 50%. This is because using of the frequency band of 6 GHz to perform NAN communication is superior in performance to using a frequency band of 5 GHz.

According to various example embodiments, the electronic device 101 and the first external electronic device 102 may set a schedule for a second data link 1520 that uses a second frequency band (e.g., 2.4 GHz, 5 GHz, or 6 GHz) as a second communication protocol (e.g., NAN). The second communication protocol may be a communication protocol for supporting a NAN communication operation. The first frequency band and the second frequency band may be different. According to various example embodiments, the electronic device 101 may perform scheduling to change the second data link 1520 to a third data link 1530 that uses a third frequency band (e.g., 2.4 GHz, 5 GHz, or 6 GHz) if the third frequency band is available, in response to a termination of the first data link 1510 (e.g., a termination of connection to the fourth external electronic device 1501). The third data link 1530 using the third frequency band may be substantially the same as the second data link 1520 using the third frequency band. For example, the third data link 1530 may be obtained by changing at least one of a channel (or channel information) and bandwidth information other than a frequency band (e.g., a third frequency band) in the second data link 1520. The third frequency band may be different from the second frequency band, and may have a higher priority than that the second frequency band based on at least one of performance and congestion according to the frequency band. The third frequency band may also be the same as the first frequency band. If the second data link 1520 using the second frequency band is formed between the electronic device 101 and the first external electronic device 102, an operation of performing NDL scheduling by a change in a frequency band may be substantially the same as the NDL scheduling operation described above with reference to FIGS. 7, 8 and 9.

According to various example embodiments, the electronic device 101 and the first external electronic device 102 may set a schedule for the second data link 1520 that uses both the first frequency band (e.g., 2.4 GHz, 5 GHz, or 6 GHz) and the second frequency band (e.g., 2.4 GHz, 5 GHz, or 6 GHz) as a second communication protocol (e.g., NAN). The second communication protocol may be a communication protocol for supporting a NAN communication operation. The first frequency band and the second frequency band may be different. The second data link 1520 may be configured with the first frequency band and the second frequency band. The electronic device 101 may communicate with the first external electronic device 102 using a channel of the first frequency band in a first interval, and may communicate with the first external electronic device 102 using a channel of the second frequency band in a second interval. For example, the first interval and the second interval may be different.

According to various example embodiments, if it is possible to change an interval (e.g., a used interval) of a frequency band (e.g., the first frequency band, and the second frequency band) used in the second data link 1520 in response to the termination of the first data link 1510 (e.g., a termination of connection to the fourth external electronic device 1501), the electronic device 101 may perform scheduling to change the second data link 1520 to the third data link 1530 that uses an interval of a frequency band having a lower priority between the first frequency band and the second frequency band as an interval of the third frequency band. The third frequency band may be the same as the first frequency band or the second frequency band. If the second data link 1520 using the first frequency band and the second frequency band is formed between the electronic device 101 and the first external electronic device 102, an operation of performing NDL scheduling by a change in a frequency band will be described in detail with reference to FIGS. 16 to 18. According to various example embodiments, NDL scheduling according to the termination of the first data link 1510 may be performed by exchanging a schedule request, a schedule response, and/or a schedule confirmation between the electronic device 101 and the first external electronic device 102. In order to set a schedule for the third data link 1530 that is a new data link, the schedule request and the schedule response may include a NAN availability attribute and/or unaligned schedule attribute based on information on an available frequency band (e.g., available frequency band information, information on an interval of an available frequency band, and channel information and/or bandwidth information of the available frequency band). If an interval of the available frequency band is changed due to the termination of the first data link 1510, the information on the available frequency band (e.g., available frequency band information, information on an interval of an available frequency band, and channel information and/or bandwidth information of the available frequency band) may be added to the NAN availability attribute and/or the unaligned schedule attribute. The available frequency band information may be included in the List of Band Entries of the NAN availability attribute and/or unaligned schedule attribute, and the channel information and/or bandwidth information of the available frequency band may be included in a Channel Entry field of the NAN availability attribute and/or the unaligned schedule attribute.

According to various example embodiments, an available frequency band to be used for the new third data link 1530 may be selected in a priority order of 6 GHz>5 GHz>2.4 GHz from the NAN availability attribute and/or the unaligned schedule attribute included in the schedule request and schedule response. Accordingly, the electronic device 101 may efficiently configure multiple frequency bands by detecting a change in a data link with a neighboring device, and may efficiently use the multiple frequency bands.

Figure 16:
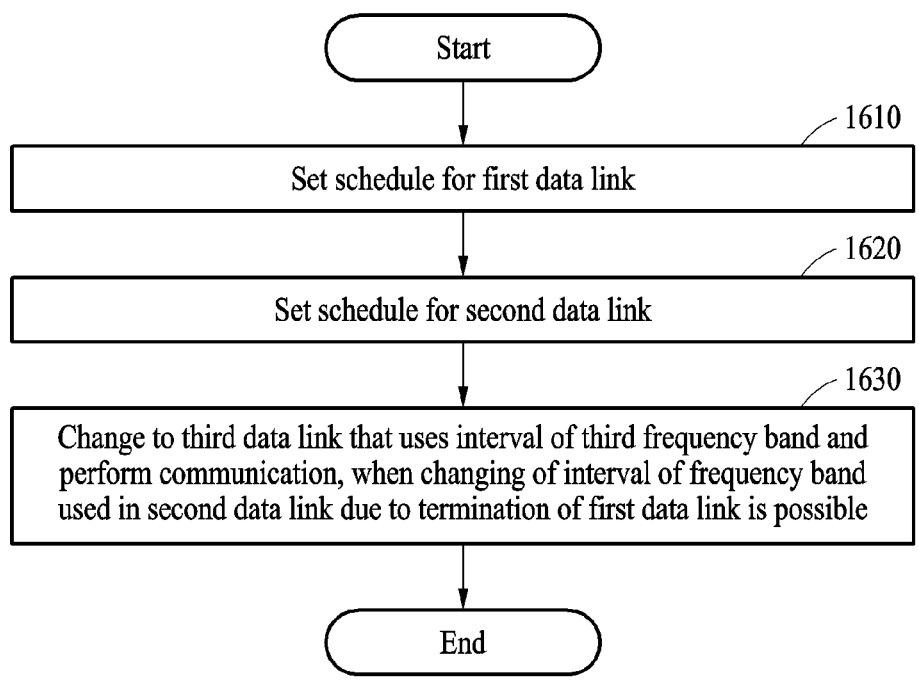
FIG. 16 is a flowchart illustrating an example operation of an electronic device to perform NDL scheduling by a change in a frequency band according to various embodiments.

FIG. 16 is a flowchart illustrating an example operation of an electronic device to perform NDL scheduling by a change in a frequency band according to various embodiments.

Referring to FIG. 16, according to various example embodiments, the electronic device 101 may support a first communication protocol (e.g., Wi-Fi) and a second communication protocol (e.g., NAN). For example, the first communication protocol may support a communication operation other than a NAN communication operation, and the second communication protocol may support the NAN communication operation. Operations 1610 through 1630 may be performed sequentially, but not be necessarily performed sequentially. For example, the order of operations 1610 through 1630 may be changed, and at least two of operations 1610 through 1630 may be performed in parallel.

In operation 1610, the electronic device 101 may set a schedule for the first data link 1510 that uses the first frequency band as the first communication protocol with the fourth external electronic device 1501.

In operation 1620, the electronic device 101 may set a schedule for the second data link 1520 that uses the first frequency band and the second frequency band as the second communication protocol with the first external electronic device 102.

If it is possible to change an interval of a frequency band (e.g., the first frequency band, and the second frequency band) used in the second data link 1520 in response to the termination of the first data link 1510, the electronic device 101 may change the second data link 1520 to the third data link 1530 that uses an interval of a frequency band having a lower priority between the first frequency band and the second frequency band as an interval of the third frequency band and may communicate with the first external electronic device 102 in operation 1630. The third frequency band may be an available frequency band having a higher priority than that of a frequency band (e.g., the first frequency band, and the second frequency band) used in the second data link 1520 among one or more available frequency bands that may be used by both the electronic device 101 and the first external electronic device 102.

Figure 17:
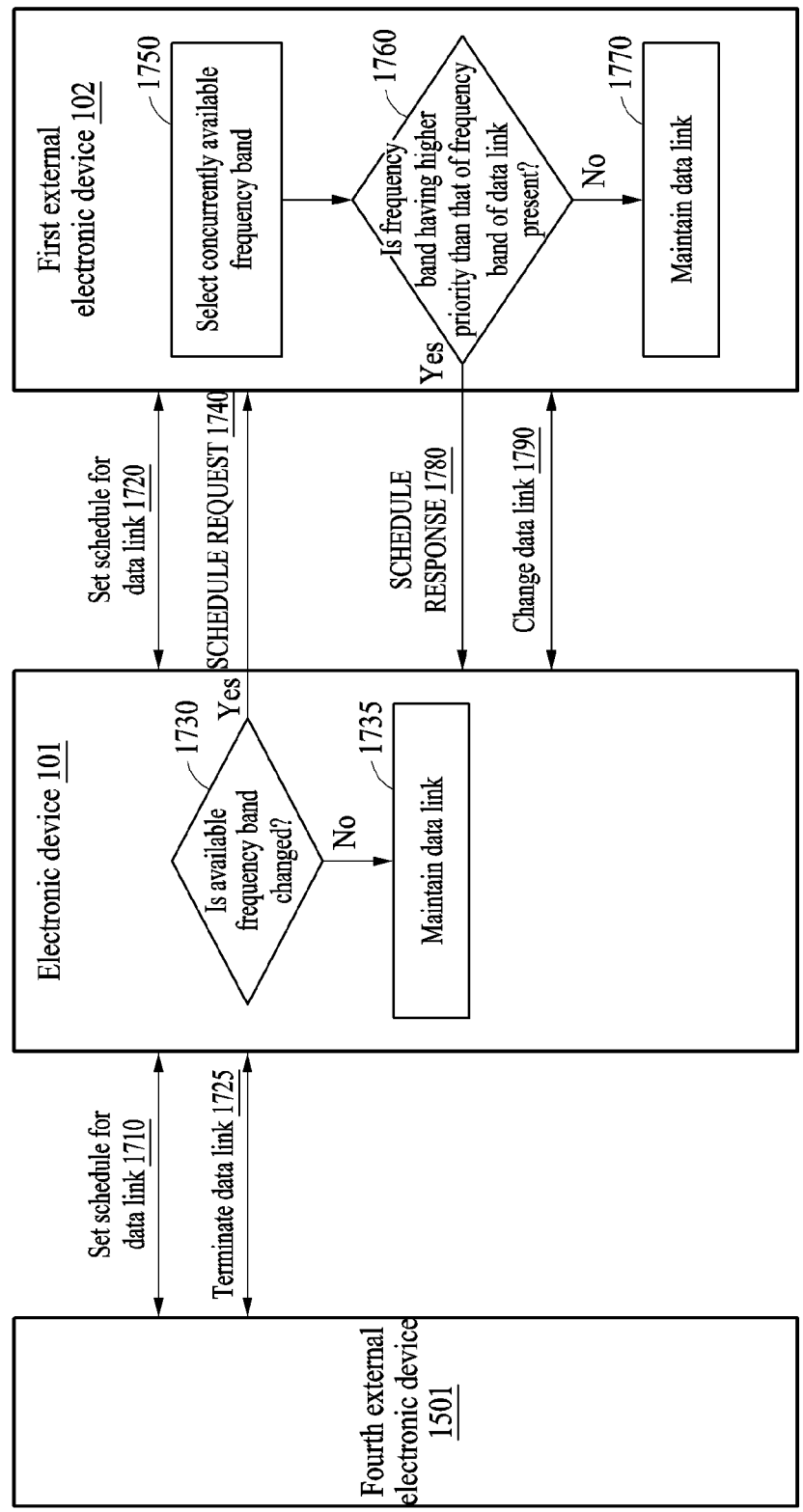
FIG. 17 is a diagram illustrating an example of an NDL scheduling operation performed based on the NDL scheduling method of FIG. 15 according to various embodiments.

FIG. 17 is a diagram illustrating an example of an NDL scheduling operation performed based on the NDL scheduling method of FIG. 15 according to various embodiments.

Referring to FIG. 17, operations 1710 through 1790 may be performed sequentially, but not be necessarily performed sequentially. For example, the order of operations 1710 through 1790 may be changed, and at least two of operations 1710 through 1790 may be performed in parallel.

In operation 1710, the electronic device 101 may set a schedule for the first data link 1510 that uses the first frequency band as the first communication protocol (e.g., Wi-Fi) with the fourth external electronic device 1501. The first data link 1510 may be set between the electronic device 101 and the fourth external electronic device 1501.

In operation 1720, the electronic device 101 may set a schedule for the second data link 1520 that uses both the first frequency band and the second frequency band as a communication protocol (e.g., NAN) with the first external electronic device 102. The second data link 1520 may be set between the electronic device 101 and the first external electronic device 102.

In operation 1725, the first data link 610 formed between the electronic device 101 and the first external electronic device 102 may be terminated.

In operation 1730, the electronic device 101 may identify a change in an interval of an available frequency band of the electronic device 101, in response to the termination of the first data link 1510 (e.g., a termination of connection to the fourth external electronic device 1501).

In operation 1735, when the interval of the available frequency band is not changed, the second data link 1520 set between the electronic device 101 and the first external electronic device 102 may be maintained.

In operation 1740, when the interval of the available frequency band is changed, the electronic device 101 may transmit a schedule request (e.g., SCHEDULE REQUEST) including information on an available frequency band (e.g., information on frequency bands that may be used by the electronic device 101 due to the termination of the first data link 1510 and information on intervals) of the electronic device 101 to the first external electronic device 102, to effectively set (or reset) a data link between the electronic device 101 and the first external electronic device 102.

In operation 1750, the first external electronic device 102 may receive the schedule request, and may select at least one available frequency band that may be concurrently used by both the electronic device 101 and the first external electronic device 102, based on the information on the available frequency band of the electronic device 101 included in the schedule request.

In operation 1760, the first external electronic device 102 may compare a priority of at least one available frequency band to a priority of a frequency band (e.g., the first frequency band and the second frequency band) used in the second data link 1520, and may determine whether a frequency band having a higher priority than that of the frequency band used in the second data link 1520 is present.

In operation 1770, when an available frequency band having a higher priority than that of the frequency band used in the second data link 1520 is absent, the second data link 1520 set between the electronic device 101 and the first external electronic device 102 may be maintained. Here, the first external electronic device 102 may or may not transmit a schedule response (e.g., SCHEDULE RESPONSE) including "rejection" (e.g., Rejected) to the electronic device 101.

In operation 1780, when the available frequency band having the higher priority than that of the frequency band used in the second data link 1520 is present, the first external electronic device 102 may transmit a schedule response including information on the available frequency band (e.g., available frequency band information, and channel information and/or bandwidth information of the available frequency band) to the electronic device 101. The schedule response may also include information on an interval in which the available frequency band is used.

In operation 1790, the electronic device 101 and the first external electronic device 102 may change the second data link 1520 to the third data link 1530 that uses an interval of an available frequency band and may perform communication (e.g., NAN communication).

Figure 18:
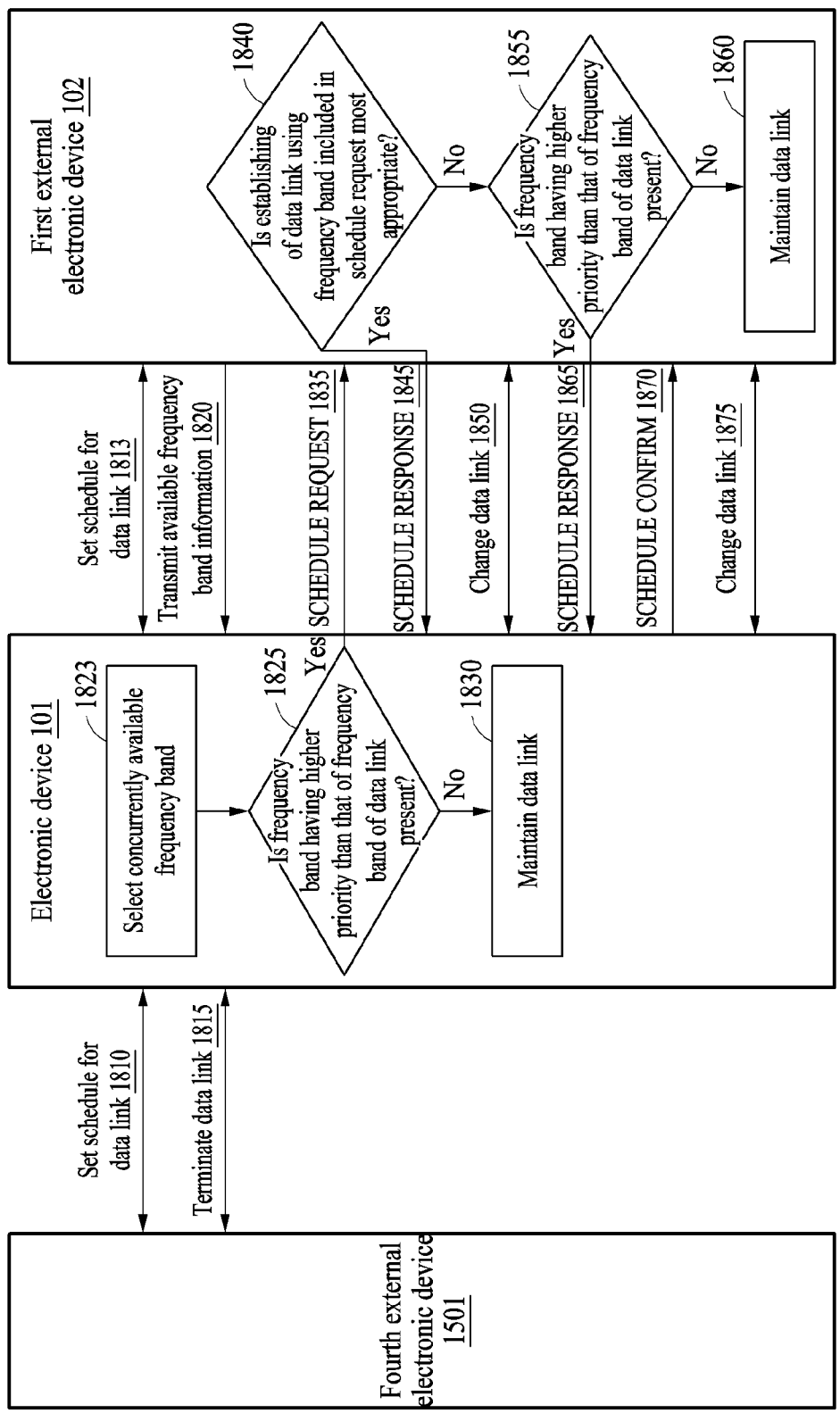
FIG. 18 is a diagram illustrating an example of an NDL scheduling operation performed based on the NDL scheduling method of FIG. 15 according to various embodiments.

FIG. 18 is a diagram illustrating an example of an NDL scheduling operation performed based on the NDL scheduling method of FIG. 15 according to various embodiments.

Referring to FIG. 18, in operation 1810, the electronic device 101 may set a schedule for the first data link 1510 that uses the first frequency band as the first communication protocol (e.g., Wi-Fi) with the fourth external electronic device 1501. The first data link 1510 may be set between the electronic device 101 and the fourth external electronic device 1501.

In operation 1813, the electronic device 101 may set a schedule for the second data link 1520 that uses both the first frequency band and the second frequency band as a communication protocol (e.g., NAN) with the first external electronic device 102. The second data link 1520 may be set between the electronic device 101 and the first external electronic device 102.

In operation 1815, the first data link 1510 formed between the electronic device 101 and the fourth external electronic device 1501 may be terminated.

In operation 1820, the electronic device 101 may obtain information on an available frequency band (e.g., information on frequency bands that may be used by the first external electronic device 102 due to the termination of the first data link 1510, and/or information on intervals) of the first external electronic device 102 from the first external electronic device 102. The first external electronic device 102 may broadcast at least one of a beacon and a NAF to a neighboring device in real time. For example, the first external electronic device 102 may include information on an available frequency band in at least one of the beacon and the NAF and may transmit at least one of the beacon and the NAF including the information to the electronic device 101. The first external electronic device 102 may broadcast at least one of the beacon and the NAF in real time regardless of the termination of the first data link 1510. The electronic device 101 may receive the beacon and/or NAF from the first external electronic device 102 at a point in time at which the first data link 1510 is terminated.

In operation 1823, the electronic device 101 may compare a frequency band (e.g., frequency bands that may be used by the electronic device 101 due to the termination of the first data link 1510) that may be used by the electronic device 101 and a frequency band that may be used by the first external electronic device 102, based on the information on the available frequency band of the first external electronic device 102. The electronic device 101 may select at least one available frequency band that may be concurrently used by both the electronic device 101 and the first external electronic device 102.

In operation 1825, the electronic device 101 may compare a priority of at least one available frequency band to a priority of a frequency band (e.g., the first frequency band and the second frequency band) used in the second data link 1520, and may determine whether an available frequency band having a higher priority than that of the frequency band used in the second data link 1520 is present.

In operation 1830, when the available frequency band having the higher priority than that of the frequency band used in the second data link 1520 is absent, the second data link 1520 set between the electronic device 101 and the first external electronic device 102 may be maintained.

In operation 1835, when the available frequency band (e.g., a first available frequency band) having the higher priority than that of the frequency band used in the second data link 1520 is present, the electronic device 101 may transmit a schedule request (e.g., SCHEDULE REQUEST) including information on a first available frequency band (e.g., first available frequency band information, and channel information and/or bandwidth information of the first available frequency band) to the first external electronic device 102.

In operation 1840, the first external electronic device 102 may receive the schedule request from the electronic device 101, and may determine whether setting of a new data link using the first available frequency band received from the electronic device 101 is most appropriate.

In operation 1845, when the setting of the new data link using the first available frequency band received from the electronic device 101 is most appropriate, the first external electronic device 102 may transmit a schedule response (e.g., SCHEDULE RESPONSE) including the information on the first available frequency band (e.g., first available frequency band information, and channel information and/or bandwidth information of the first available frequency band) to the electronic device 101. The schedule response may also include information on an interval in which the first available frequency band is used.

In operation 1850, the electronic device 101 and the first external electronic device 102 may change the second data link 1520 to the third data link 1530 that includes an interval in which the first available frequency band is used, and may perform communication (e.g., NAN communication).

In operation 1855, when the setting of the new data link using the first available frequency band received from the electronic device 101 is not most appropriate, the first external electronic device 102 may determine whether a second available frequency band having a higher priority (or highest priority) than that of the frequency band used in the second data link 1520 is present.

In operation 1860, when the second available frequency band having the higher priority than that of the frequency band used in the second data link 1520 is absent, the second data link 1520 set between the electronic device 101 and the first external electronic device 102 may be maintained. Here, the first external electronic device 102 may or may not transmit a schedule response (e.g., SCHEDULE RESPONSE) including "rejection" (e.g., Rejected) to the electronic device 101.

In operation 1865, when the second available frequency band having the higher priority than that of the frequency band used in the second data link 1520 is present, the first external electronic device 102 may transmit a schedule response including a modification schedule proposal to set the third data link 1530 using an interval of the second available frequency band to the electronic device 101. The schedule response may include information on the second available frequency band (e.g., second available frequency band information, and channel information and/or bandwidth information of the second available frequency band). The schedule response may also include information on an interval in which the second available frequency band is used.

In operation 1870, the electronic device 101 may transmit a schedule confirmation (e.g., SCHEDULE CONFIRM) to the first external electronic device 102, in response to the schedule response. The schedule confirmation may include information on the second available frequency band (e.g., second available frequency band information, and channel information and/or bandwidth information of the second available frequency band), or "rejection" (e.g., Rejected).

In operation 1875, when the schedule confirmation includes the information on the second available frequency band (e.g., second available frequency band information, and channel information and/or bandwidth information of the second available frequency band), the electronic device 101 and the first external electronic device 102 may change the second data link 1520 to the third data link 1530 that uses the interval of the second available frequency band and may perform communication (e.g., NAN communication). When the schedule confirmation includes "rejection" (e.g., Rejected), the second data link 1520 set between the electronic device 101 and the first external electronic device 102 may be maintained.

Figure 19:
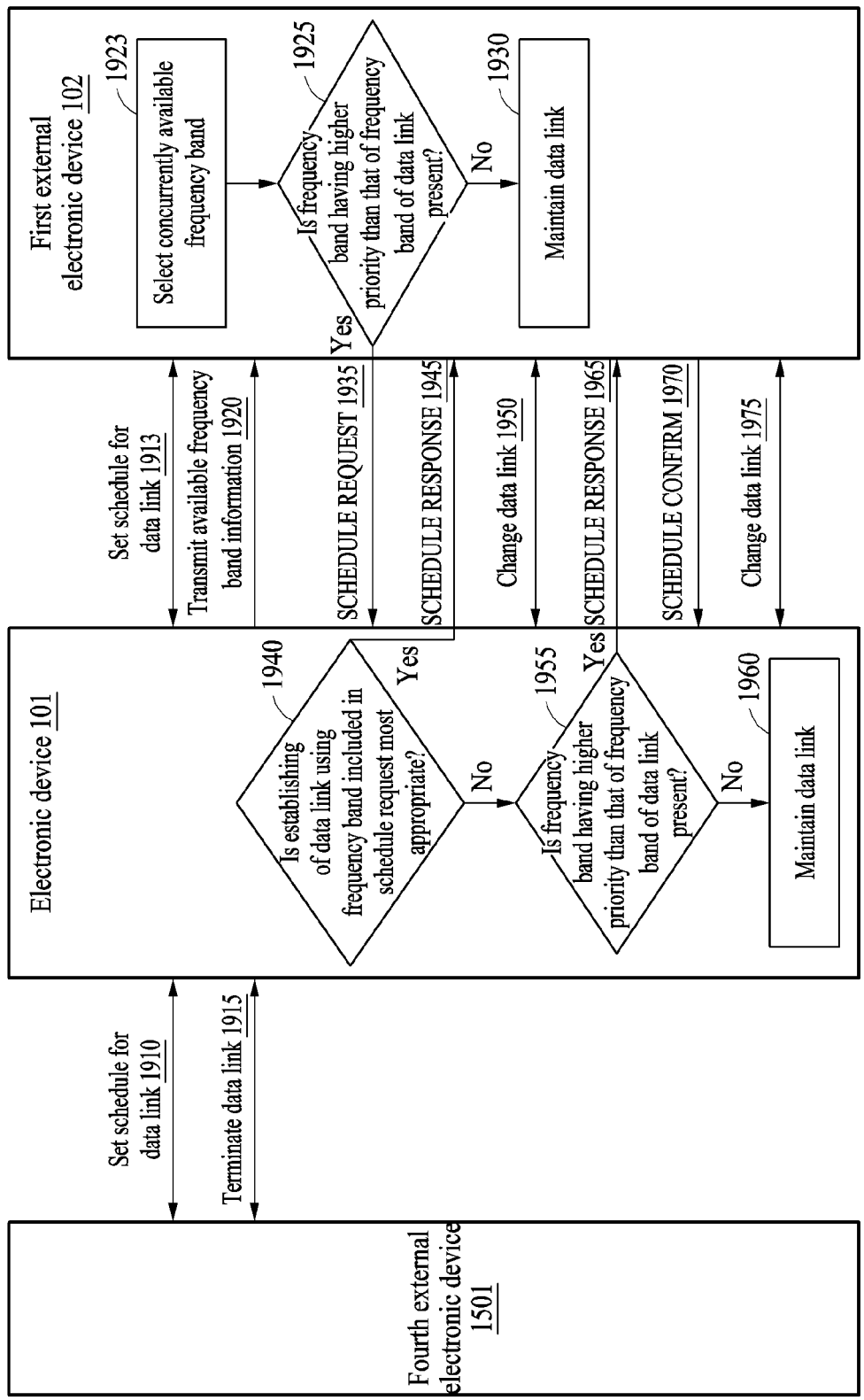
FIG. 19 is a diagram illustrating an example of an NDL scheduling operation performed based on the NDL scheduling method of FIG. 15 according to various embodiments.

FIG. 19 is a diagram illustrating an example of an NDL scheduling operation performed based on the NDL scheduling method of FIG. 15 according to various embodiments.

Referring to FIG. 19, operations 1910 through 1975 may be performed sequentially, but not be necessarily performed sequentially. For example, the order of operations 1910 through 1975 may be changed, and at least two of operations 1910 through 1975 may be performed in parallel.

In operation 1910, the electronic device 101 may set a schedule for the first data link 1510 that uses the first frequency band as the first communication protocol (e.g., Wi-Fi) with the fourth external electronic device 1501. The first data link 1510 may be set between the electronic device 101 and the fourth external electronic device 1501.

In operation 1913, the electronic device 101 may set a schedule for the second data link 1520 that uses both the first frequency band and the second frequency band as the second communication protocol (e.g., NAN) with the first external electronic device 102. The second data link 1520 may be set between the electronic device 101 and the first external electronic device 102.

In operation 1915, the first data link 1510 formed between the electronic device 101 and the fourth external electronic device 1501 may be terminated.

In operation 1920, the electronic device 101 may transmit information on an available frequency band (e.g., information on frequency bands that may be used by the electronic device 101 due to the termination of the first data link 1510, and/or information on intervals) of the electronic device 101 to the first external electronic device 102, in response to the termination of the first data link 1510. The electronic device 101 may include the information on the available frequency band in at least one of a beacon and a NAF and may transmit at least one of the beacon and the NAF including the information to the first external electronic device 102.

In operation 1923, the first external electronic device 102 may compare a frequency band (e.g., frequency bands that may be used by the first external electronic device 102 due to the termination of the first data link 1510) that may be used by the first external electronic device 102 and a frequency band that may be used by the electronic device 101, based on the information on the available frequency band of the electronic device 101. The first external electronic device 102 may select at least one available frequency band that may be concurrently used by both the electronic device 101 and the first external electronic device 102.

In operation 1925, the first external electronic device 102 may compare a priority of at least one available frequency band to a priority of a frequency band (e.g., the first frequency band, and the second frequency band) used in the second data link 1520, and may determine whether an available frequency band having a higher priority than that of the frequency band used in the second data link 1520 is present.

In operation 1930, when the available frequency band having the higher priority than that of the frequency band used in the second data link 1520 is absent, the second data link 1520 set between the electronic device 101 and the first external electronic device 102 may be maintained.

In operation 1935, when the available frequency band (e.g., a first available frequency band) having the higher priority than that of the frequency band used in the second data link 1520 is present, the first external electronic device 102 may transmit a schedule request (e.g., SCHEDULE REQUEST) including information on a first available frequency band (e.g., first available frequency band information, and channel information and/or bandwidth information of the first available frequency band) to the electronic device 101. The schedule request may also include information on an interval in which the first available frequency band is used.

In operation 1940, the electronic device 101 may receive the schedule request from the first external electronic device 102, and may determine whether setting of a new data link using the first available frequency band received from the first external electronic device 102 is most appropriate.

In operation 1945, when the setting of the new data link using the first available frequency band received from the first external electronic device 102 is most appropriate, the electronic device 101 may transmit a schedule response (e.g., SCHEDULE RESPONSE) including the information on the first available frequency band (e.g., first available frequency band information, and channel information and/or bandwidth information of the first available frequency band) to the first external electronic device 102.

In operation 1950, the electronic device 101 and the first external electronic device 102 may change the second data link 1520 to the third data link 1530 that uses an interval of the first available frequency band and may perform communication (e.g., NAN communication).

In operation 1955, when the setting of the new data link using the first available frequency band received from the first external electronic device 102 is not most appropriate, the electronic device 101 may determine whether a second available frequency band having a higher priority than that of the frequency band used in the second data link 1520 is present.

In operation 1960, when the second available frequency band having the higher priority than that of the frequency band used in the second data link 1520 is absent, the second data link 1520 set between the electronic device 101 and the first external electronic device 102 may be maintained. Here, the electronic device 101 may or may not transmit a schedule response (e.g., SCHEDULE RESPONSE) including "rejection" (e.g., Rejected) to the first external electronic device 102.

In operation 1965, when the second available frequency band having the higher priority than that of the frequency band used in the second data link 1520 is present, the electronic device 101 may transmit a schedule response including a modification schedule proposal to set the third data link 1530 using an interval of the second available frequency band to the first external electronic device 102. The schedule response may include information on the second available frequency band (e.g., second available frequency band information, and channel information and/or bandwidth information of the second available frequency band). The schedule response may also include information on an interval in which the second available frequency band is used.

In operation 1970, the first external electronic device 102 may transmit a schedule confirmation (e.g., SCHEDULE CONFIRM) to the electronic device 101, in response to the schedule response. The schedule confirmation may include information on the second available frequency band (e.g., second available frequency band information, and channel information and/or bandwidth information of the second available frequency band), or "rejection" (e.g., Rejected).

In operation 1975, when the schedule confirmation includes the information on the second available frequency band (e.g., second available frequency band information, and channel information and/or bandwidth information of the second available frequency band), the electronic device 101 and the first external electronic device 102 may change the second data link 1520 to the third data link 1530 that uses the interval of the second available frequency band and may perform communication (e.g., NAN communication). When the schedule confirmation includes "rejection" (e.g., Rejected), the second data link 1520 set between the electronic device 101 and the first external electronic device 102 may be maintained.

Hereinafter, examples of the scheduling operations of FIGS. 17, 18 and 19 will be described with reference to FIGS. 20A, 20B, 20C, 20D, 21A, 21B, 21C, 21D, 22A, 22B, 22C and 22D (which may be referred to as FIGS. 20A to 22D). Referring to FIGS. 20A to 22D, for convenience of description, priority levels based on performance (e.g., NAN throughput in a NAN terminal) according to frequency bands may be assumed to be in the order of 6 GHz (e.g., 1600 Mbps)>5 GHz (e.g., 900 Mbps)>2.4 GHz (e.g., 150 Mbps).

Figure 20A:
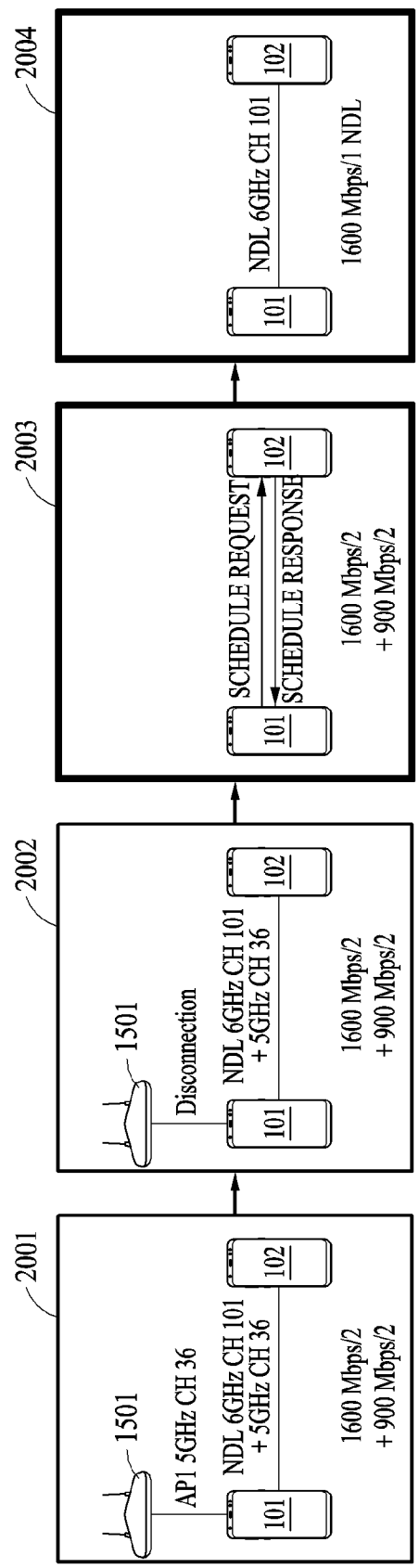
FIG. 20A is a diagram illustrating an example in which a scheduling operation of FIG. 17 is performed according to various embodiments.

FIG. 20A is a diagram illustrating an example in which a scheduling operation of FIG. 17 is performed according to various embodiments.

In FIG. 20A, it may be assumed that the electronic device 101 and the first external electronic device 102 are devices of the first type (e.g., devices for supporting frequency bands of 2.4 GHz, 5 GHz, and 6 GHz, and supporting an RSDB).

In operation 2001, a first data link (e.g., AP1 5 GHz CH 36) using a frequency band (e.g., 5 GHz) as a first communication protocol (e.g., Wi-Fi) may be set between the electronic device 101 and the fourth external electronic device 1501, and a second data link (e.g., NDL 6 GHz CH 101+5 GHz CH 36) using both frequency bands of 6 GHz and 5 GHz as a second communication protocol (e.g., NAN) may be set between the electronic device 101 and the first external electronic device 102. For example, the second data link may be set to 50% use of 6 GHz CH 101+50% use of 5 GHz CH 36.

When the first data link (e.g., AP1 5 GHz CH 36) between the electronic device 101 and the fourth external electronic device 1501 is terminated, the electronic device 101 may determine that an available frequency band of the electronic device 101 is changed from 6 GHz 50%+5 GHz 50%+2.4 GHz 100% to 6 GHz 100%+5 GHz 100%+2.4 GHz 100% in operation 2002. An interval of the available frequency band of the electronic device 101 may be changed from 50% use of 6 GHz CH 101+50% use of 5 GHz CH 36 to 100% use of 6 GHz, 100% use of 5 GHz, or 100% use of 2.4 GHz.

In operation 2003, the electronic device 101 may transmit a schedule request (e.g., SCHEDULE REQUEST) including available frequency band information (e.g., 6 GHz, 5 GHz, and 2.4 GHz) to the first external electronic device 102. The first external electronic device 102 may use 6 GHz CH 101 for 50% and 5 GHz CH 36 for 50% in the second data link (e.g., NDL 6 GHz CH 101+5 GHz CH 36). The first external electronic device 102, which is the device of the first type, may use frequency bands of 6 GHz, 5 GHz, and 2.4 GHz. The first external electronic device 102 may select at least one available frequency band (e.g., 6 GHz, 5 GHz, and 2.4 GHz) that may be used by both the electronic device 101 and the first external electronic device 102, based on the available frequency band information (e.g., 6 GHz, 5 GHz, and 2.4 GHz) included in the schedule request received from the electronic device 101. An available frequency band (e.g., 6 GHz) having a relatively high priority may be used in an interval of a frequency band (e.g., 5 GHz) of the second data link (e.g., NDL 6 GHz CH 101+5 GHz CH 36), and accordingly the first external electronic device 102 may select a channel (e.g., CH 101) that may be used by both the electronic device 101 and the first external electronic device 102 in the available frequency band (e.g., 6 GHz), and may transmit a schedule response (e.g., SCHEDULE RESPONSE) including information on the available frequency band (e.g., 6 GHz) and the channel (e.g., CH 101) (e.g., channel information and/or bandwidth information) of the available frequency band (e.g., 6 GHz) to the electronic device 101. The schedule response may include information on an interval in which the available frequency band (e.g., 6 GHz) is used.

In operation 2004, the electronic device 101 and the first external electronic device 102 may change an existing interval corresponding to 5 GHz CH 36 in the second data link (e.g., NDL 6 GHz CH 101+5 GHz CH 36) to an interval corresponding to the available frequency band (e.g., 6 GHz) and the channel (e.g., CH 101) of the available frequency band (e.g., 6 GHz), and may perform communication via a new third data link (e.g., NDL 6 GHz CH 101).

Figure 20B:
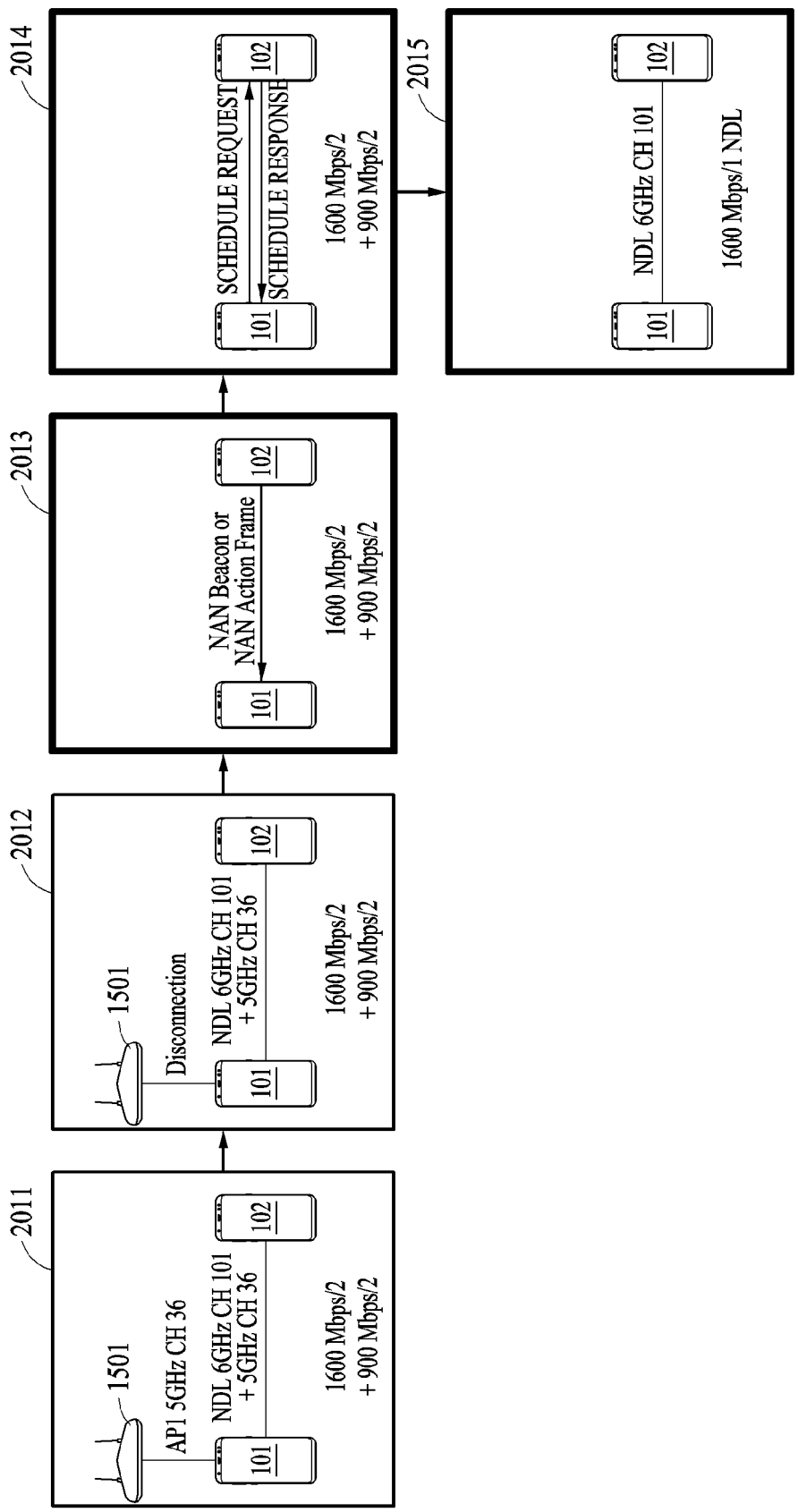
FIG. 20B is a diagram illustrating an example in which a scheduling operation of FIG. 18 is performed according to various embodiments.

FIG. 20B is a diagram illustrating an example in which a scheduling operation of FIG. 18 is performed according to various embodiments.

In FIG. 20B, it may be assumed that the electronic device 101 and the first external electronic device 102 are devices of the first type (e.g., devices for supporting frequency bands of 2.4 GHz, 5 GHz, and 6 GHz, and supporting an RSDB).

In operation 2011, a first data link (e.g., AP1 5 GHz CH 36) using a frequency band (e.g., 5 GHz) as a first communication protocol (e.g., Wi-Fi) may be set between the electronic device 101 and the fourth external electronic device 1501, and a second data link (e.g., NDL 6 GHz CH 101+5 GHz CH 36) using both frequency bands of 6 GHz and 5 GHz as a second communication protocol (e.g., NAN) may be set between the electronic device 101 and the first external electronic device 102. For example, the second data link may be set to 50% use of 6 GHz CH 101+50% use of 5 GHz CH 36.

In operation 2012, the first data link (e.g., AP1 5 GHz CH 36) between the electronic device 101 and the fourth external electronic device 1501 may be terminated.

In operation 2013, the electronic device 101 may receive a beacon (e.g., a synchronization beacon) or NAF including available frequency band information (e.g., 6 GHz, 5 GHz, and 2.4 GHz) of the first external electronic device 102 from the first external electronic device 102.

In operation 2014, due to a termination of the first data link (e.g., AP1 5 GHz CH 36), an interval of an available frequency band of the electronic device 101 may be changed from 50% use of 6 GHz CH 101+50% use of 5 GHz CH 36 to 100% use of 6 GHz, 100% use of 5 GHz, or 100% use of 2.4 GHz. The electronic device 101 may identify at least one available frequency band (e.g., 6 GHz, 5 GHz, and 2.4 GHz) that may be used by both the electronic device 101 and the first external electronic device 102 among available frequency bands (e.g., 6 GHz, 5 GHz, and 2.4 GHz) of the first external electronic device 102 and available frequency bands (e.g., 6 GHz, 5 GHz, and 2.4 GHz) of the electronic device 101. The electronic device 101 may compare a frequency band (e.g., 6 GHz, and 5 GHz) used in the second data link (e.g., NDL 6 GHz CH 101+5 GHz CH 36) to an available frequency band (e.g., 6 GHz, 5 GHz, and 2.4 GHz) that may be newly used between the electronic device 101 and the first external electronic device 102 according to priorities. An available frequency band (e.g., 6 GHz) having a relatively high priority may be used in an interval of a frequency band (e.g., 5 GHz) of the second data link (e.g., NDL 6 GHz CH 101+5 GHz CH 36), and accordingly the electronic device 101 may transmit a schedule request (e.g., SCHEDULE REQUEST), which includes a new available frequency band (e.g., 6 GHz), a channel (e.g., CH 101) (e.g., channel information and/or bandwidth information) of the available frequency band (e.g., 6 GHz), and/or information (e.g., available interval information) on an interval of the available frequency band (e.g., 6 GHz), to the first external electronic device 102 in order to use the new available frequency band (e.g., 6 GHz) in a corresponding interval. The first external electronic device 102 may identify the new available frequency band (e.g., 6 GHz) and/or the channel (e.g., CH 101) of the available frequency band (e.g., 6 GHz) included in the schedule request received from the electronic device 101, and may transmit a schedule response (e.g., SCHEDULE RESPONSE), which includes set information on the available frequency band (e.g., 6 GHz) and/or the channel (e.g., CH 101) (e.g., channel information and/or bandwidth information) to set a frequency band of a new data link, to the electronic device 101. The schedule response may include information on an interval in which an available frequency band (e.g., 6 GHz) is used.

In operation 2015, the electronic device 101 and the first external electronic device 102 may change an existing interval corresponding to 5 GHz CH 36 in the second data link (e.g., NDL 6 GHz CH 101+5 GHz CH 36) to an interval corresponding to the available frequency band (e.g., 6 GHz) and the channel (e.g., CH 101) of the available frequency band (e.g., 6 GHz), and may perform communication via a new third data link (e.g., NDL 6 GHz CH 101).

Figure 20C:
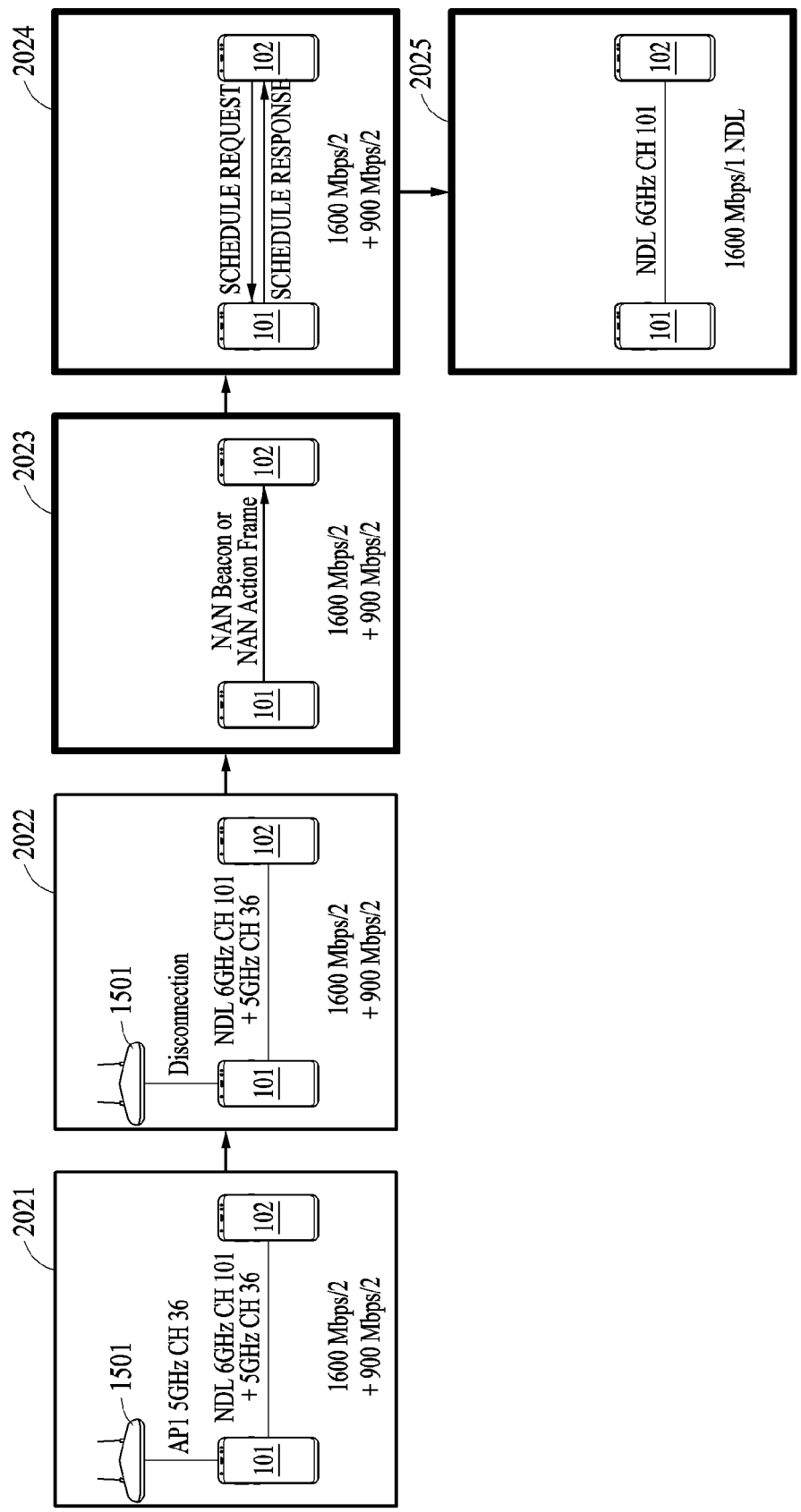
FIG. 20C is a diagram illustrating an example in which a scheduling operation of FIG. 19 is performed according to various embodiments.

FIG. 20C is a diagram illustrating an example in which a scheduling operation of FIG. 19 is performed according to various embodiments.

In FIG. 20C, it may be assumed that the electronic device 101 and the first external electronic device 102 are devices of the first type (e.g., devices for supporting frequency bands of 2.4 GHz, 5 GHz, and 6 GHz, and supporting an RSDB).

In operation 2021, a first data link (e.g., AP1 5 GHz CH 36) using a frequency band (e.g., 5 GHz) as a first communication protocol (e.g., Wi-Fi) may be set between the electronic device 101 and the fourth external electronic device 1501, and a second data link (e.g., NDL 6 GHz CH 101+5 GHz CH 36) using both frequency bands of 6 GHz and 5 GHz as a second communication protocol (e.g., NAN) may be set between the electronic device 101 and the first external electronic device 102.

In operation 2022, the first data link (e.g., AP1 5 GHz CH 36) between the electronic device 101 and the fourth external electronic device 1501 may be terminated.

In operation 2023, due to a termination of the first data link (e.g., AP1 5 GHz CH 36), an interval of an available frequency band of the electronic device 101 may be changed from 50% use of 6 GHz CH 101+50% use of 5 GHz CH 36 to 100% use of 6 GHz, 100% use of 5 GHz, or 100% use of 2.4 GHz. The electronic device 101 may transmit a beacon (e.g., a synchronization beacon) or NAF including available frequency band information (e.g., 6 GHz, 5 GHz, and 2.4 GHz) of the electronic device 101 to the first external electronic device 102.

In operation 2024, the first external electronic device 102 may identify at least one available frequency band (e.g., 6 GHz, 5 GHz, and 2.4 GHz) that may be used by both the electronic device 101 and the first external electronic device 102 among available frequency bands (e.g., 6 GHz, 5 GHz, and 2.4 GHz) of the first external electronic device 102 and available frequency bands (e.g., 6 GHz, 5 GHz, and 2.4 GHz) of the electronic device 101. The first external electronic device 102 renews the frequency band (6 GHz, 5 GHz) used in the second data link (e.g., NDL 6 GHz CH 101+5 GHz CH 36) between the electronic device 101 and the first external electronic device 102. Available frequency bands (6 GHz, 5 GHz, 2.4 GHz) and priority can be compared. An available frequency band (e.g., 6 GHz) having a relatively high priority may be used in an interval of a frequency band (e.g., 5 GHz) of the second data link (e.g., NDL 6 GHz CH 101+5 GHz CH 36), and accordingly the first external electronic device 102 may transmit a schedule request (e.g., SCHEDULE REQUEST), which includes a new available frequency band (e.g., 6 GHz), a channel (e.g., CH 101) (e.g., channel information and/or bandwidth information) of the available frequency band (e.g., 6 GHz), and/or information (e.g., available interval information) on an interval of the available frequency band (e.g., 6 GHz), to the electronic device 101 in order to use the new available frequency band (e.g., 6 GHz) in a corresponding interval. The electronic device 101 may identify the new available frequency band (e.g., 6 GHz) and/or the channel (e.g., CH 101) of the available frequency band (e.g., 6 GHz) included in the schedule request received from the first external electronic device 102, and may transmit a schedule response (e.g., SCHEDULE RESPONSE), which includes set information on the available frequency band (e.g., 6 GHz) and/or the channel (e.g., CH 101) (e.g., channel information and/or bandwidth information) to set a frequency band of a new data link, to the first external electronic device 102. The schedule response may include information on an interval in which an available frequency band (e.g., 6 GHz) is used.

In operation 2025, the electronic device 101 and the first external electronic device 102 may change an existing interval corresponding to 5 GHz CH 36 in the second data link (e.g., NDL 6 GHz CH 101+5 GHz CH 36) to an interval corresponding to the available frequency band (e.g., 6 GHz) and the channel (e.g., CH 101) of the available frequency band (e.g., 6 GHz), and may perform communication via a new third data link (e.g., NDL 6 GHz CH 101).

Figure 20D:
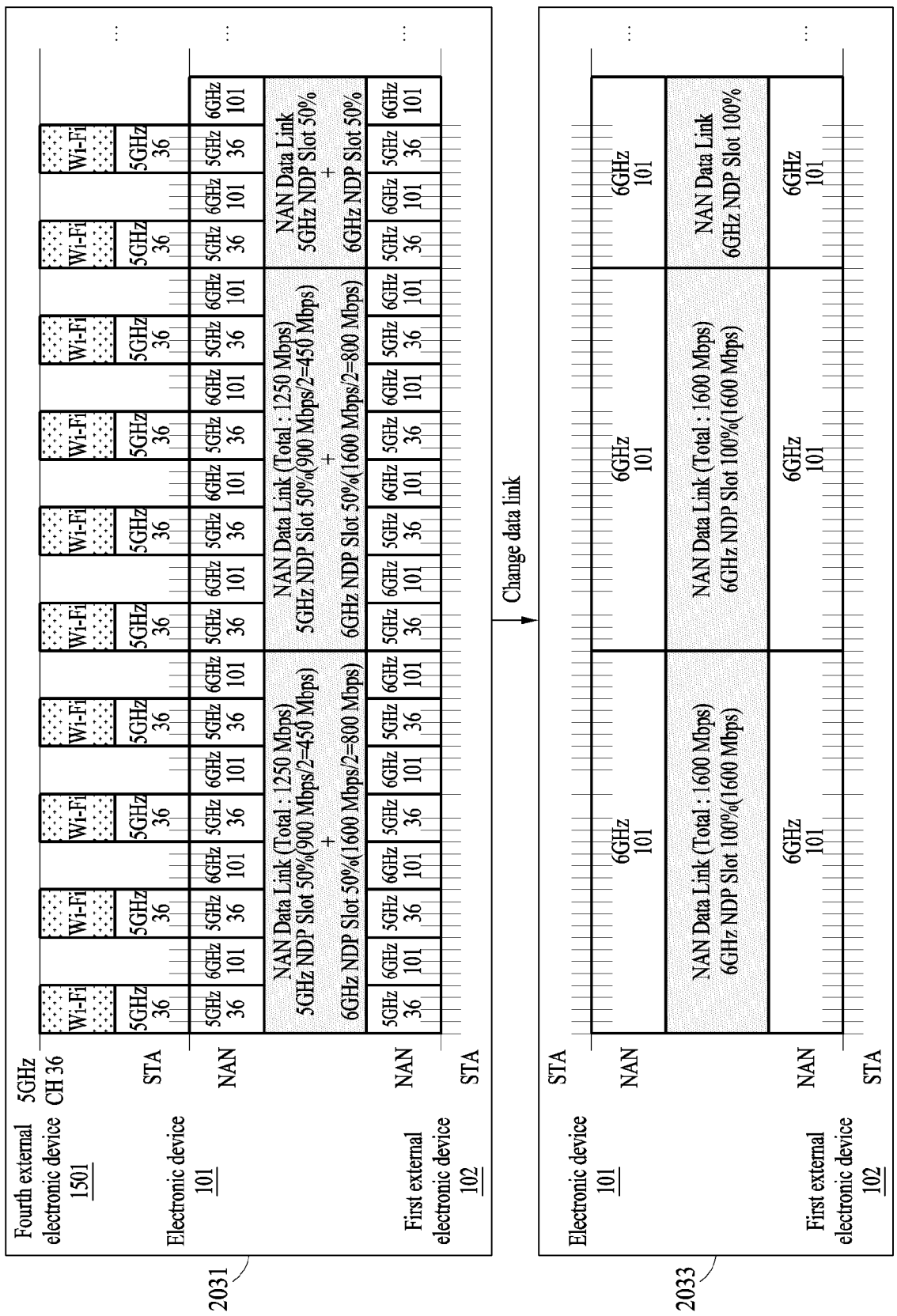
FIG. 20D is a diagram illustrating slot configurations of data links of FIGS. 20A, 20B and 20C according to various embodiments.

FIG. 20D is a diagram illustrating slot configurations of data links of FIGS. 20A, 20B and 20C according to various embodiments.

FIG. 20D illustrates a slot configuration of a data link through an NDL scheduling operation. A first slot configuration 2031 may be a slot configuration of a data link formed when the electronic device 101 and the fourth external electronic device 1501 are connected and when the electronic device 101 and the first external electronic device 102 are connected. A second slot configuration 2033 may be a slot configuration of a data link formed when a schedule for a new data link is set between the electronic device 101 and the first external electronic device 102 due to a termination of the connection to the fourth external electronic device 1501.

Referring to the first slot configuration 2031 of FIG. 20D, when the electronic device 101 is connected to the fourth external electronic device 1501, the electronic device 101 may perform communication (e.g., NAN communication) based on 5 GHz CH 36 using a second communication protocol concurrently in a slot (or interval) in which communication (e.g., Wi-Fi communication) is performed based on 5 GHz CH 36 using a first communication protocol, and may perform communication (e.g., NAN communication) based on 6 GHz CH 101 using the second communication protocol in a slot (or interval) in which the first communication protocol is not used. The second data link (e.g., NDL 6 GHz CH 101+5 GHz CH 36) may include 6 GHz CH 101 for 50% and 5 GHz CH 36 for 50%. The maximum performance of the second data link (e.g., NDL 6 GHz CH 101+5 GHz CH 36) may be a sum (e.g., 1250 Mbps) of performance (e.g., 800 Mbps) of NDL 6 GHz CH 101 and performance (e.g., 450 Mbps) of 5 GHz CH 36.

Referring to the second slot configuration 2033 of FIG. 20D, due to the termination of the first data link (e.g., AP1 5 GHz CH 36), an interval of an available frequency band of the electronic device 101 may be changed from 50% use of 6 GHz CH 101+50% use of 5 GHz CH 36 to 100% use of 6 GHz, 100% use of 5 GHz, or 100% use of 2.4 GHz. The electronic device 101 and the first external electronic device 102 may support all (or both) of NAN 6 GHz, NAN 5 GHz, and NAN 2.4 GHz. NAN 6 GHz may be superior in performance to NAN 5 GHz and NAN 2.4 GHz among frequency bands that may be supported by both the electronic device 101 and the first external electronic device 102, and accordingly NAN 5 GHz may have a higher priority than that of NAN 6 GHz. A new scheduling operation may be performed between the electronic device 101 and the first external electronic device 102 so that the existing interval corresponding to 5 GHz CH 36 in the second data link (e.g., NDL 6 GHz CH 101+5 GHz CH 36) between the electronic device 101 and the first external electronic device 102 may be changed to a NAN 6 GHz frequency band and that the NAN 6 GHz frequency band may be used. The data link between the electronic device 101 and the first external electronic device 102 may be changed to 100% use of 6 GHz CH 101, and actually measured performance of the changed data link may be about 1600 Mbps.

Figure 21A:
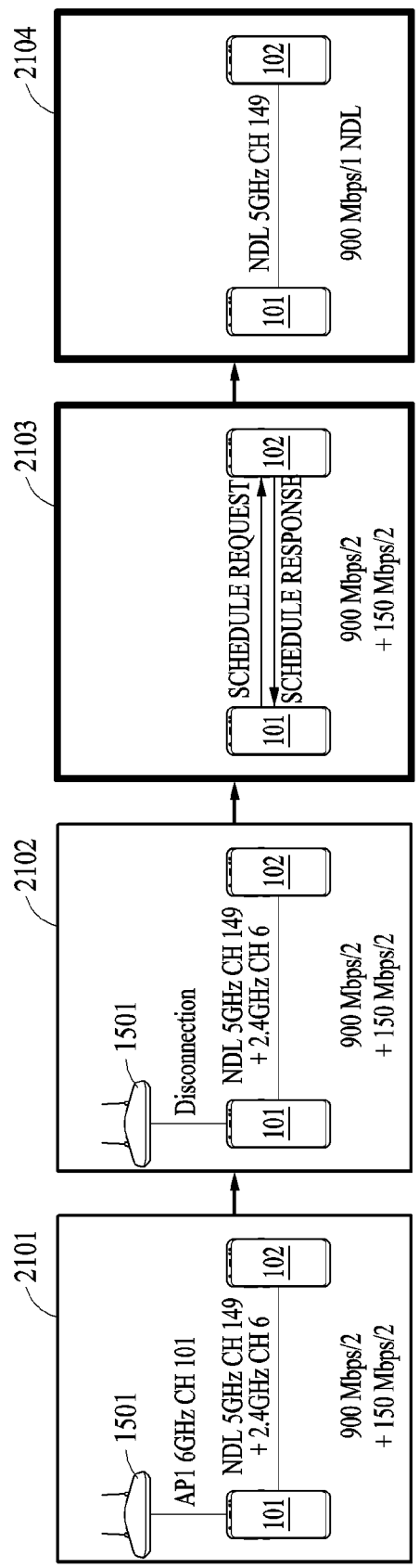
FIG. 21A is a diagram illustrating an example in which the scheduling operation of FIG. 18 is performed.

FIG. 21A is a diagram illustrating an example in which the scheduling operation of FIG. 18 is performed according to various embodiments.

In FIG. 21A, it may be assumed that the electronic device 101 is a device of the first type (e.g., a device for supporting frequency bands of 2.4 GHz, 5 GHz, and 6 GHz, and supporting an RSDB) and that the first external electronic device 102 is a device of the second type (e.g., a device for supporting frequency bands of 2.4 GHz and 5 GHz, and supporting an RSDB).

In operation 2101, a first data link (e.g., AP1 6 GHz CH 101) using a frequency band (e.g., 6 GHz) as a first communication protocol (e.g., Wi-Fi) may be set between the electronic device 101 and the fourth external electronic device 1501, and a second data link (e.g., NDL 5 GHz CH 149+2.4 GHz CH 6) using both frequency bands of 5 GHz and 2.4 GHz as a second communication protocol (e.g., NAN) may be set between the electronic device 101 and the first external electronic device 102.

When the first data link (e.g., AP1 6 GHz CH 101) between the electronic device 101 and the fourth external electronic device 1501 is terminated, the electronic device 101 may determine that an available frequency band of the electronic device 101 is changed from 6 GHz 50%+5 GHz 50%+2.4 GHz 50% to 6 GHz 100%+5 GHz 100%+2.4 GHz 100% in operation 2102. An interval of the available frequency band of the electronic device 101 may be changed from 50% use of 5 GHz CH 149+50% use of 2.4 GHz CH 6 to 100% use of 6 GHz, 100% use of 5 GHz, or 100% use of 2.4 GHz.

In operation 2103, the electronic device 101 may transmit a schedule request (e.g., SCHEDULE REQUEST) including available frequency band information (e.g., 6 GHz, 5 GHz, and 2.4 GHz) to the first external electronic device 102. The first external electronic device 102 may use 5 GHz CH 149 for 50% and 2.4 GHz CH 6 for 50% in the second data link (e.g., NDL 5 GHz CH 149+2.4 GHz CH 6). The first external electronic device 102, which is the device of the second type, may use frequency bands of 5 GHz, and 2.4 GHz. The first external electronic device 102 may select at least one available frequency band (e.g., 5 GHz, and 2.4 GHz) that may be used by both the electronic device 101 and the first external electronic device 102, based on the available frequency band information (e.g., 6 GHz, 5 GHz, and 2.4 GHz) included in the schedule request received from the electronic device 101. An available frequency band (e.g., 5 GHz) having a relatively high priority may be used in an interval of a frequency band (e.g., 2.4 GHz) of the second data link (e.g., NDL 5 GHz CH 149+2.4 GHz CH 6), and accordingly the first external electronic device 102 may select a channel (e.g., CH 149) that may be used by both the electronic device 101 and the first external electronic device 102 in the available frequency band (e.g., 5 GHz), and may transmit a schedule response (e.g., SCHEDULE RESPONSE) including information on the available frequency band (e.g., 5 GHz) and the channel (e.g., CH 149) (e.g., channel information and/or bandwidth information) of the available frequency band (e.g., 5 GHz) to the electronic device 101. The schedule response may include information on an interval in which the available frequency band (e.g., 5 GHz) is used.

In operation 2104, the electronic device 101 and the first external electronic device 102 may change an existing interval corresponding to 2.4 GHz CH 6 in the second data link (e.g., NDL 5 GHz CH 149+2.4 GHz CH 6) to an interval corresponding to the available frequency band (e.g., 5 GHz) and the channel (e.g., CH 149) of the available frequency band (e.g., 5 GHz), and may perform communication via a new third data link (e.g., NDL 5 GHz CH 149).

Figure 21B:
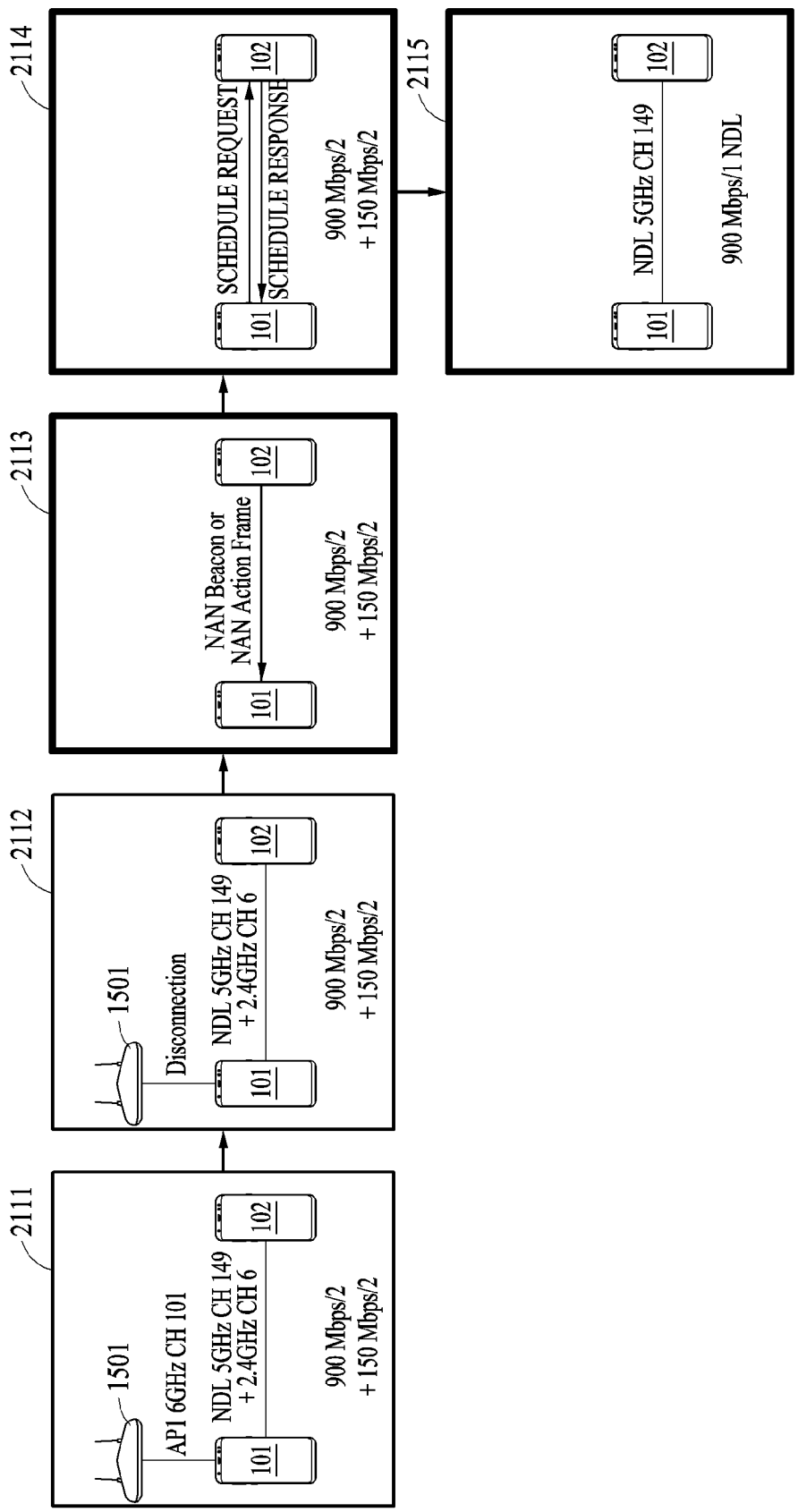
FIG. 21B is a diagram illustrating an example in which the scheduling operation of FIG. 18 is performed according to various embodiments.

FIG. 21B is a diagram illustrating an example in which the scheduling operation of FIG. 18 is performed according to various embodiments.

In FIG. 21B, it may be assumed that the electronic device 101 is a device of the first type (e.g., a device for supporting frequency bands of 2.4 GHz, 5 GHz, and 6 GHz, and supporting an RSDB) and that the first external electronic device 102 is a device of the second type (e.g., a device for supporting frequency bands of 2.4 GHz and 5 GHz, and supporting an RSDB).

In operation 2111, a first data link (e.g., AP1 6 GHz CH 101) using a frequency band (e.g., 6 GHz) as a first communication protocol (e.g., Wi-Fi) may be set between the electronic device 101 and the fourth external electronic device 1501, and a second data link (e.g., NDL 5 GHz CH 149+2.4 GHz CH 6) using both frequency bands of 5 GHz and 2.4 GHz as a second communication protocol (e.g., NAN) may be set between the electronic device 101 and the first external electronic device 102.

In operation 2112, the first data link (e.g., AP1 6 GHz CH 101) between the electronic device 101 and the fourth external electronic device 1501 may be terminated.

In operation 2113, the electronic device 101 may receive a beacon (e.g., a synchronization beacon) or NAF including available frequency band information (e.g., 5 GHz, and 2.4 GHz) of the first external electronic device 102 from the first external electronic device 102.

In operation 2114, due to the termination of the first data link (e.g., AP1 6 GHz CH 101), the interval of the available frequency band of the electronic device 101 may be changed from 50% use of 5 GHz CH 149+50% use of 2.4 GHz CH 6 to 100% use of 6 GHz, 100% use of 5 GHz, or 100% use of 2.4 GHz. The electronic device 101 may identify at least one available frequency band (e.g., 5 GHz, and 2.4 GHz) that may be used by both the electronic device 101 and the first external electronic device 102 among available frequency bands (e.g., 5 GHz, and 2.4 GHz) of the first external electronic device 102 and available frequency bands (e.g., 6 GHz, 5 GHz, and 2.4 GHz) of the electronic device 101. The electronic device 101 may compare a frequency band (e.g., 5 GHz, and 2.4 GHz) used in the second data link (e.g., NDL 5 GHz CH 149+2.4 GHz CH 6) to an available frequency band (e.g., 5 GHz, and 2.4 GHz) that may be newly used between the electronic device 101 and the first external electronic device 102 according to priorities. An available frequency band (e.g., 5 GHz) having a relatively high priority may be used in an interval of a frequency band (e.g., 2.4 GHz) of the second data link (e.g., NDL 5 GHz CH 149+2.4 GHz CH 6), and accordingly the electronic device 101 may transmit a schedule request (e.g., SCHEDULE REQUEST) including a new available frequency band (e.g., 5 GHz) and/or a channel (e.g., CH 149) (e.g., channel information and/or bandwidth information) of the available frequency band (e.g., 5 GHz) to the first external electronic device 102 in order to use the new available frequency band (e.g., 5 GHz) in a corresponding interval. The first external electronic device 102 may identify the new available frequency band (e.g., 5 GHz) and/or the channel (e.g., CH 149) of the available frequency band (e.g., 5 GHz) included in the schedule request received from the electronic device 101, and may transmit a schedule response (e.g., SCHEDULE RESPONSE), which includes set information on the available frequency band (e.g., 5 GHz) and/or the channel (e.g., CH 149) (e.g., channel information and/or bandwidth information) to set a frequency band of a new data link, to the electronic device 101. The schedule response may include information on an interval in which the available frequency band (e.g., 5 GHz) is used.

In operation 2115, the electronic device 101 and the first external electronic device 102 may change an existing interval corresponding to 2.4 GHz CH 6 in the second data link (e.g., NDL 5 GHz CH 149+2.4 GHz CH 6) to an interval corresponding to the available frequency band (e.g., 5 GHz) and the channel (e.g., CH 149) of the available frequency band (e.g., 5 GHz), and may perform communication via a new third data link (e.g., NDL 5 GHz CH 149).

Figure 21C:
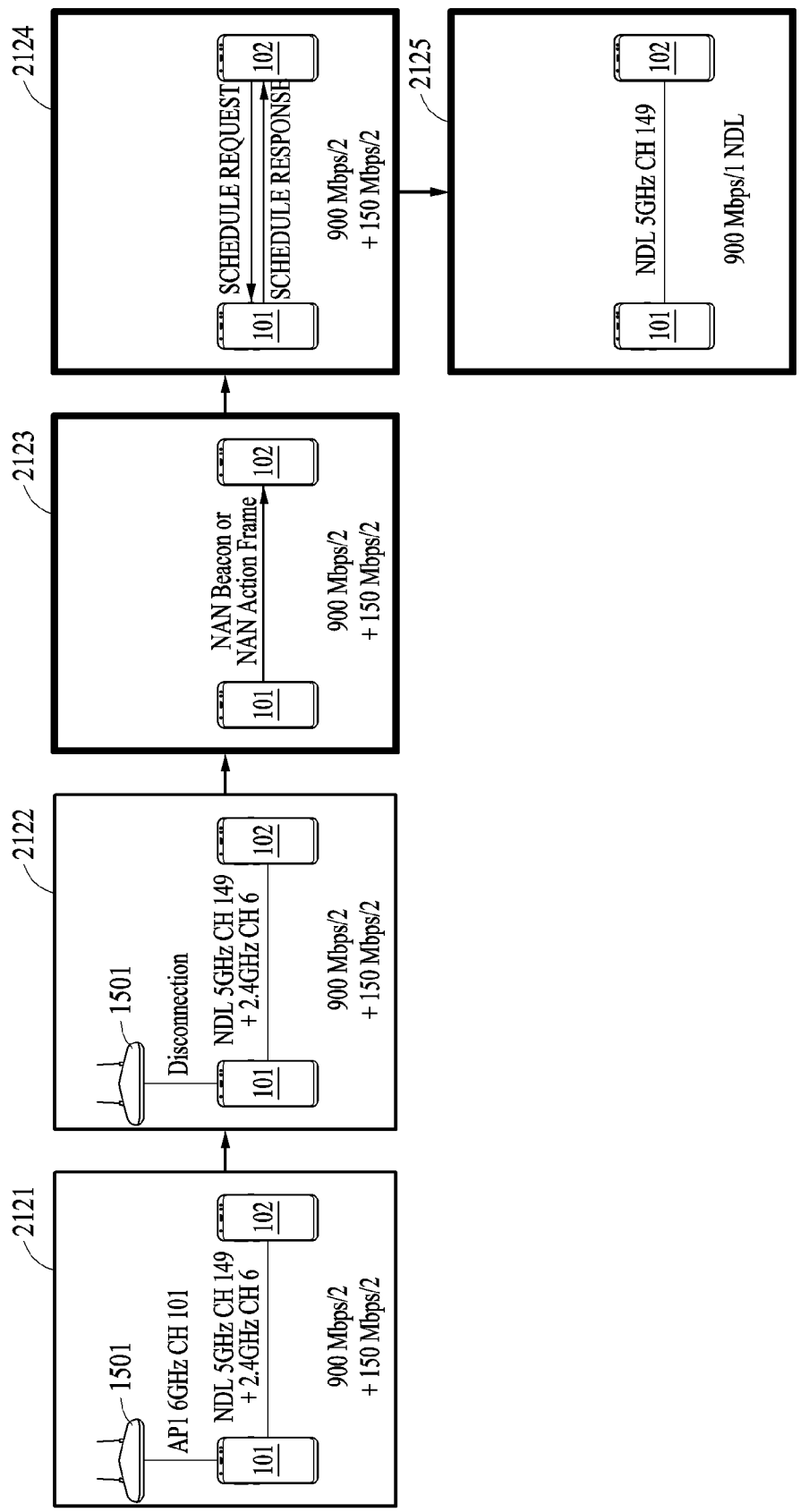
FIG. 21C is a diagram illustrating an example in which the scheduling operation of FIG. 19 is performed according to various embodiments.

FIG. 21C is a diagram illustrating an example in which the scheduling operation of FIG. 19 is performed according to various embodiments.

In FIG. 21C, it may be assumed that the electronic device 101 is a device of the first type (e.g., a device for supporting frequency bands of 2.4 GHz, 5 GHz, and 6 GHz, and supporting an RSDB) and that the first external electronic device 102 is a device of the second type (e.g., a device for supporting frequency bands of 2.4 GHz and 5 GHz, and supporting an RSDB).

In operation 2121, a first data link (e.g., AP1 6 GHz CH 101) using a frequency band (e.g., 6 GHz) as a first communication protocol (e.g., Wi-Fi) may be set between the electronic device 101 and the fourth external electronic device 1501, and a second data link (e.g., NDL 5 GHz CH 149+2.4 GHz CH 6) using both frequency bands of 5 GHz and 2.4 GHz as a second communication protocol (e.g., NAN) may be set between the electronic device 101 and the first external electronic device 102.

In operation 2122, the first data link (e.g., AP1 6 GHz CH 101) between the electronic device 101 and the fourth external electronic device 1501 may be terminated.

In operation 2123, due to the termination of the first data link (e.g., AP1 6 GHz CH 101), the interval of the available frequency band of the electronic device 101 may be changed from 50% use of 5 GHz CH 149+50% use of 2.4 GHz CH 6 to 100% use of 6 GHz, 100% use of 5 GHz, or 100% use of 2.4 GHz. The electronic device 101 may transmit a beacon (e.g., a synchronization beacon) or NAF including available frequency band information (e.g., 6 GHz, 5 GHz, and 2.4 GHz) of the electronic device 101 to the first external electronic device 102.

In operation 2124, the first external electronic device 102 may identify at least one available frequency band (e.g., 5 GHz, and 2.4 GHz) that may be used by both the electronic device 101 and the first external electronic device 102 among available frequency bands (e.g., 5 GHz, and 2.4 GHz) of the first external electronic device 102 and available frequency bands (e.g., 6 GHz, 5 GHz, and 2.4 GHz) of the electronic device 101. The first external electronic device 102 may compare a frequency band (e.g., 5 GHz, and 2.4 GHz) used in the second data link (e.g., NDL 5 GHz CH 149+2.4 GHz CH 6) to an available frequency band (e.g., 5 GHz, and 2.4 GHz) that may be newly used between the electronic device 101 and the first external electronic device 102 according to priorities. An available frequency band (e.g., 5 GHz) having a relatively high priority may be used in an interval of a frequency band (e.g., 2.4 GHz) of the second data link (e.g., NDL 5 GHz CH 149+2.4 GHz CH 6), and accordingly the first external electronic device 102 may transmit a schedule request (e.g., SCHEDULE REQUEST) including a new available frequency band (e.g., 5 GHz) and/or a channel (e.g., CH 149) (e.g., channel information and/or bandwidth information) of the available frequency band (e.g., 5 GHz) to the electronic device 101 in order to use the new available frequency band (e.g., 5 GHz) in a corresponding interval. The electronic device 101 may identify the new available frequency band (e.g., 5 GHz) and/or the channel (e.g., CH 149) of the available frequency band (e.g., 5 GHz) included in the schedule request received from the first external electronic device 102, and may transmit a schedule response (e.g., SCHEDULE RESPONSE), which includes set information on the available frequency band (e.g., 5 GHz) and/or the channel (e.g., CH 149) (e.g., channel information and/or bandwidth information) to set a frequency band of a new data link, to the first external electronic device 102. The schedule response may include information on an interval in which the available frequency band (e.g., 5 GHz) is used.

In operation 2125, the electronic device 101 and the first external electronic device 102 may change an existing interval corresponding to 2.4 GHz CH 6 in the second data link (e.g., NDL 5 GHz CH 149+2.4 GHz CH 6) to an interval corresponding to the available frequency band (e.g., 5 GHz) and the channel (e.g., CH 149) of the available frequency band (e.g., 5 GHz), and may perform communication via a new third data link (e.g., NDL 5 GHz CH 149).

Figure 21D:
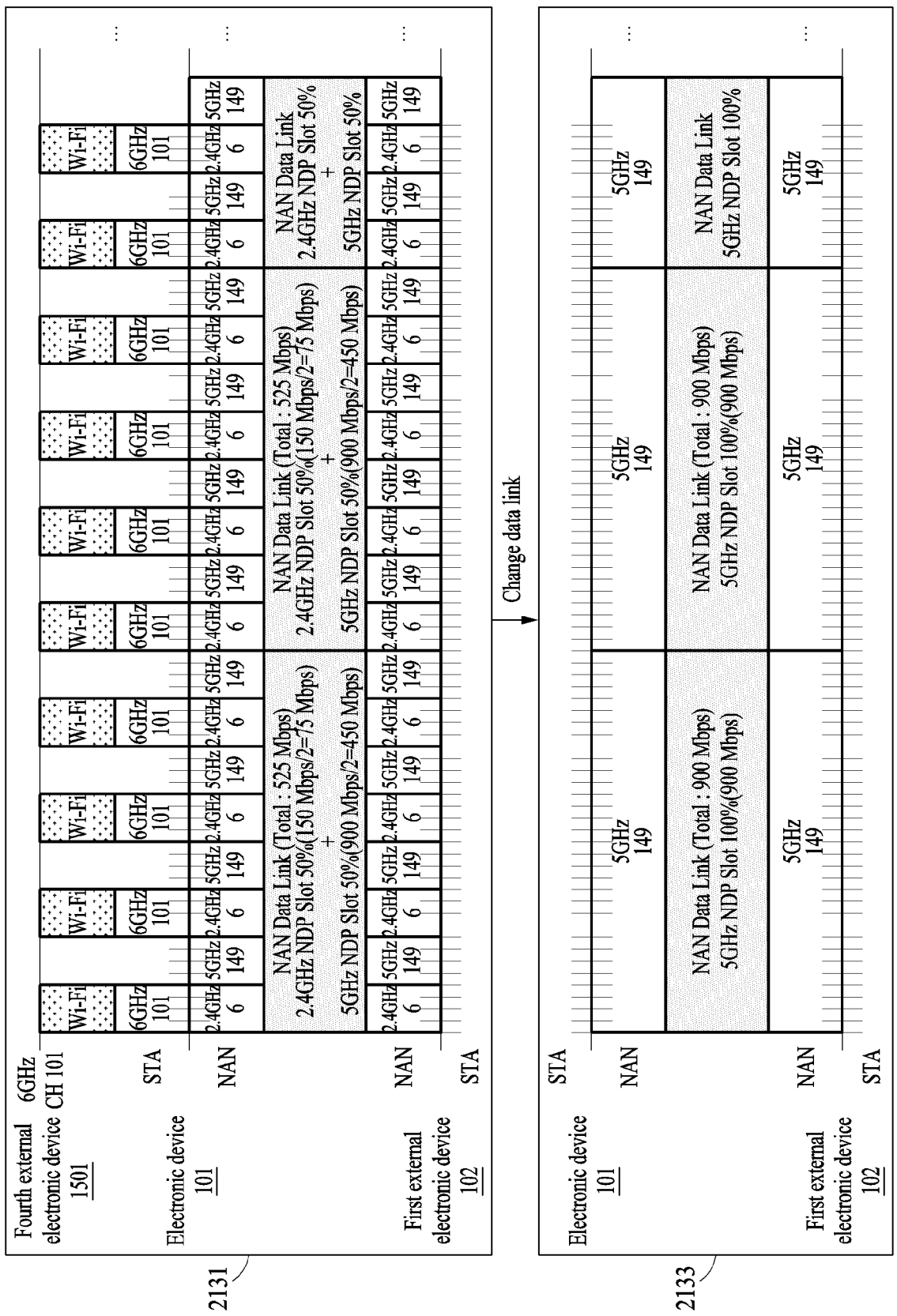
FIG. 21D is a diagram illustrating slot configurations of data links of FIGS. 21A, 21B and 21C according to various embodiments.

FIG. 21D is a diagram illustrating slot configurations of data links of FIGS. 21A, 21B and 21C according to various embodiments.

FIG. 21D illustrates a slot configuration of a data link through an NDL scheduling operation. A first slot configuration 2131 may be a slot configuration of a data link formed when the electronic device 101 and the fourth external electronic device 1501 are connected and when the electronic device 101 and the first external electronic device 102 are connected. A second slot configuration 2133 may be a slot configuration of a data link formed when a schedule for a new data link is set between the electronic device 101 and the first external electronic device 102 due to a termination of the connection to the fourth external electronic device 1501.

Referring to the first slot configuration 2131 of FIG. 21D, when the electronic device 101 is connected to the fourth external electronic device 1501, the electronic device 101 may perform communication (e.g., NAN communication) based on 2.4 GHz CH 6 using a second communication protocol concurrently in a slot (or interval) in which communication (e.g., Wi-Fi communication) is performed based on 6 GHz CH 101 using a first communication protocol, and may perform communication (e.g., NAN communication) based on 5 GHz CH 149 using the second communication protocol in a slot (or interval) in which the first communication protocol is not used. The second data link (e.g., NDL 5 GHz CH 149+2.4 GHz CH 6) may use 5 GHz CH 149 for 50% and 2.4 GHz CH 6 for 50%. The maximum performance of the second data link (e.g., NDL 5 GHz CH 149+2.4 GHz CH 6) may be a sum (e.g., about 525 Mbps) performance (e.g., about 450 Mbps) of 5 GHz CH 149 and performance (e.g., about 75 Mbps) of 2.4 GHz CH 6.

Referring to the second slot configuration 2133 of FIG. 21D, due to the termination of the first data link (e.g., AP1 6 GHz CH 101), the interval of the available frequency band of the electronic device 101 may be changed from 50% use of 5 GHz CH 149+50% use of 2.4 GHz CH 6 to 100% use of 6 GHz, 100% use of 5 GHz, or 100% use of 2.4 GHz. The electronic device 101 and the first external electronic device 102 may support both NAN 5 GHz and NAN 2.4 GHz. NAN 5 GHz may be superior in performance to NAN 2.4 GHz among frequency bands that may be supported by both the electronic device 101 and the first external electronic device 102, and accordingly NAN 5 GHz may have a higher priority than that of NAN 2.4 GHz. A new scheduling operation may be performed between the electronic device 101 and the first external electronic device 102 so that the existing interval corresponding to 2.4 GHz CH 6 in the second data link (e.g., NDL 5 GHz CH 149+2.4 GHz CH 6) between the electronic device 101 and the first external electronic device 102 may be changed to a NAN 5 GHz frequency band and that the NAN 5 GHz frequency band may be used. The data link between the electronic device 101 and the first external electronic device 102 may be changed to 100% use of 5 GHz CH 149, and actually measured performance of the changed data link may be about 900 Mbps.

Figure 22A:
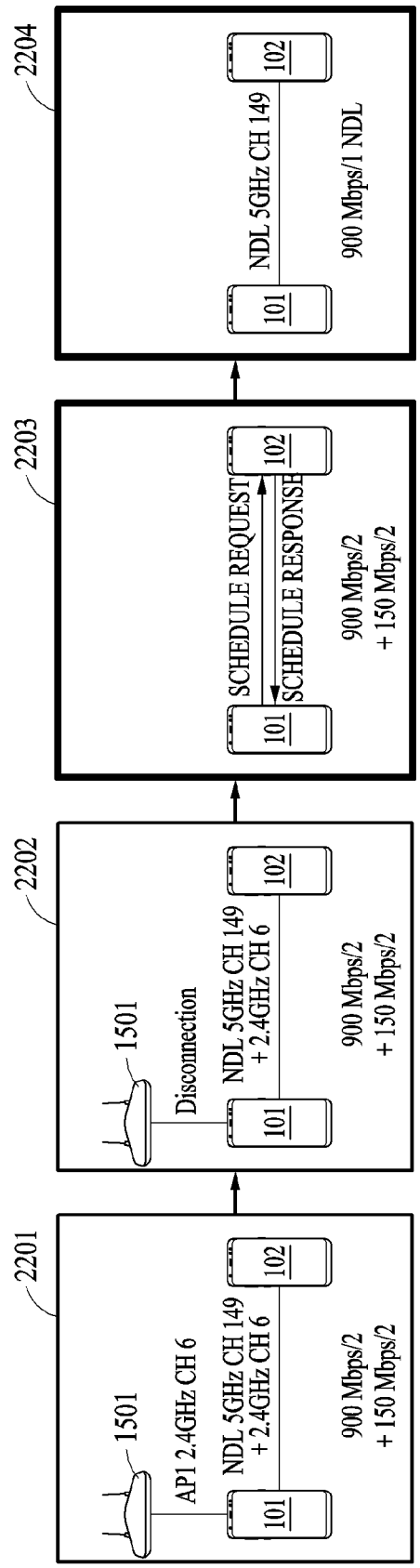
FIG. 22A is a diagram illustrating an example in which the scheduling operation of FIG. 18 is performed according to various embodiments.

FIG. 22A is a diagram illustrating an example in which the scheduling operation of FIG. 18 is performed according to various embodiments.

In FIG. 22A, it may be assumed that the electronic device 101 is a device of the third type (e.g., a device that supports frequency bands of 2.4 GHz and 5 GHz, and does not support an RSDB) and that the first external electronic device 102 is a device of the first type (e.g., a device for supporting frequency bands of 2.4 GHz, 5 GHz, and 6 GHz, and supporting an RSDB).

In operation 2201, a first data link (e.g., AP1 2.4 GHz CH 6) using a frequency band (e.g., 2.4 GHz) as a first communication protocol (e.g., Wi-Fi) may be set between the electronic device 101 and the fourth external electronic device 1501, and a second data link (e.g., NDL 5 GHz CH 149+2.4 GHz CH 6) using both frequency bands of 5 GHz and 2.4 GHz as a second communication protocol (e.g., NAN) may be set between the electronic device 101 and the first external electronic device 102. It may be difficult for the electronic device 101 in which the first data link (e.g., AP1 2.4 GHz CH 6) with the fourth external electronic device 1501 is formed to fully use a frequency band (e.g., 5 GHz) during setting a data link with the first external electronic device 102, and the electronic device 101 may form a data link by time division of 5 GHz CH 149 50%+2.4 GHz CH 6 50%.

When the first data link (e.g., AP1 2.4 GHz CH 6) between the electronic device 101 and the fourth external electronic device 1501 is terminated, the electronic device 101 may determine that an available frequency band of the electronic device 101 is changed to 5 GHz+2.4 GHz in operation 2202. An interval of the available frequency band of the electronic device 101 may be changed from 50% use of 5 GHz CH 149+50% use of 2.4 GHz CH 6 to 100% use of 5 GHz, or 100% use of 2.4 GHz.

In operation 2203, the electronic device 101 may transmit a schedule request (e.g., SCHEDULE REQUEST) including available frequency band information (e.g., 5 GHz, and 2.4 GHz) to the first external electronic device 102. The first external electronic device 102 may use 5 GHz CH 149 for 50% and 2.4 GHz CH 6 for 50% in the second data link (e.g., NDL 5 GHz CH 149+2.4 GHz CH 6). The first external electronic device 102, which is the device of the first type, may use frequency bands of 6 GHz, 5 GHz, and 2.4 GHz. The first external electronic device 102 may select at least one available frequency band (e.g., 5 GHz, and 2.4 GHz) that may be used by both the electronic device 101 and the first external electronic device 102, based on the available frequency band information (e.g., 5 GHz, and 2.4 GHz) included in the schedule request received from the electronic device 101. An available frequency band (e.g., 5 GHz) having a relatively high priority may be used in an interval of a frequency band (e.g., 2.4 GHz) of the second data link (e.g., NDL 5 GHz CH 149+2.4 GHz CH 6), and accordingly the first external electronic device 102 may select a channel (e.g., CH 149) that may be used by both the electronic device 101 and the first external electronic device 102 in the available frequency band (e.g., 5 GHz), and may transmit a schedule response (e.g., SCHEDULE RESPONSE) including information on the available frequency band (e.g., 5 GHz) and the channel (e.g., CH 149) (e.g., channel information and/or bandwidth information) of the available frequency band (e.g., 5 GHz) to the electronic device 101. The schedule response may include information on an interval in which the available frequency band (e.g., 5 GHz) is used.

In operation 2204, the electronic device 101 and the first external electronic device 102 may change an existing interval corresponding to 2.4 GHz CH 6 in the second data link (e.g., NDL 5 GHz CH 149+2.4 GHz CH 6) to an interval corresponding to the available frequency band (e.g., 5 GHz) and the channel (e.g., CH 149) of the available frequency band (e.g., 5 GHz), and may perform communication via a new third data link (e.g., NDL 5 GHz CH 149).

Figure 22B:
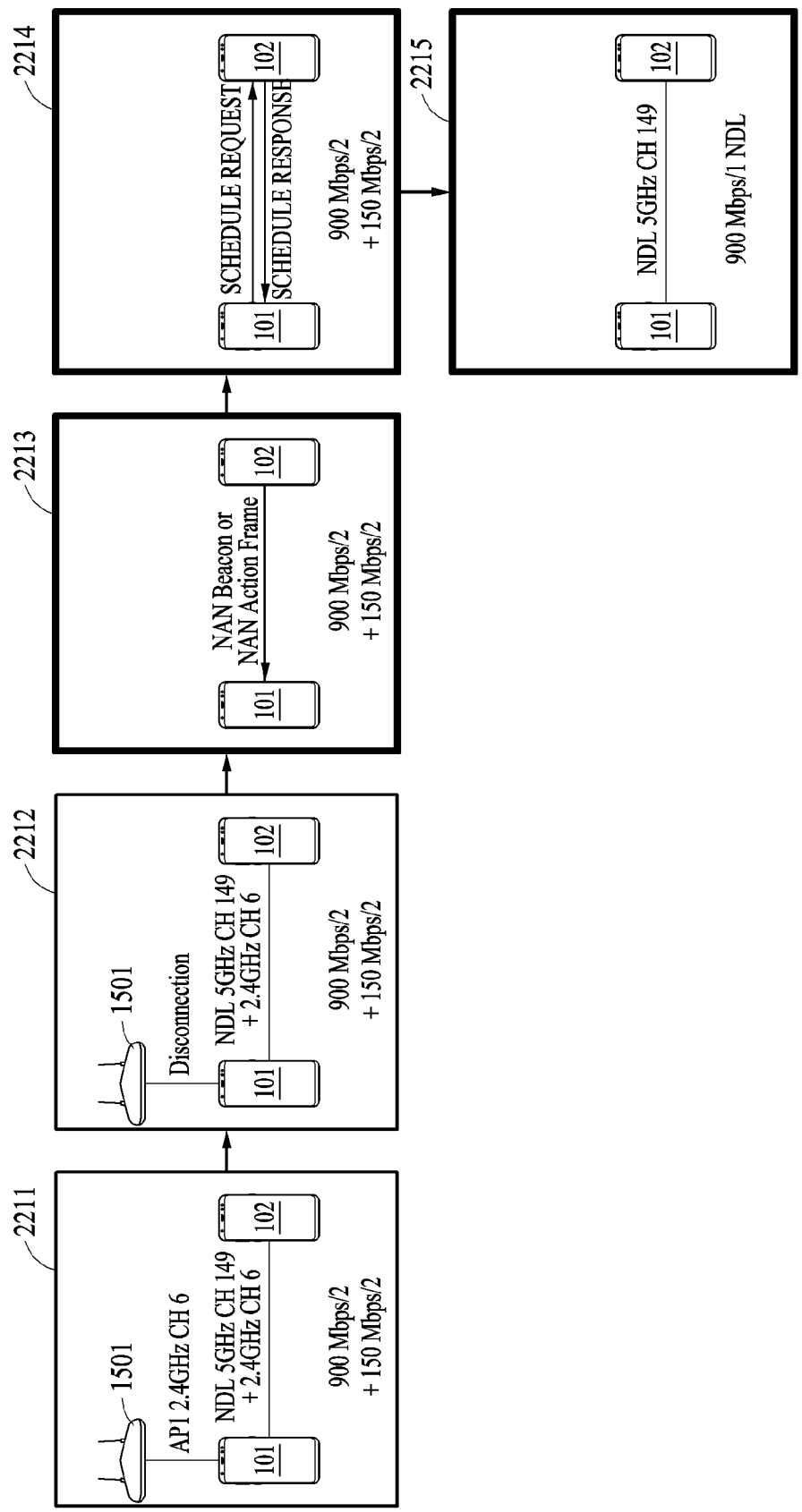
FIG. 22B is a diagram illustrating an example in which the scheduling operation of FIG. 18 is performed according to various embodiments.

FIG. 22B is a diagram illustrating an example in which the scheduling operation of FIG. 18 is performed.

In FIG. 22B, it may be assumed that the electronic device 101 is a device of the third type (e.g., a device that supports frequency bands of 2.4 GHz and 5 GHz, and does not support an RSDB) and that the first external electronic device 102 is a device of the first type (e.g., a device for supporting frequency bands of 2.4 GHz, 5 GHz, and 6 GHz, and supporting an RSDB).

In operation 2211, a first data link (e.g., AP1 2.4 GHz CH 6) using a frequency band (e.g., 2.4 GHz) as a first communication protocol (e.g., Wi-Fi) may be set between the electronic device 101 and the fourth external electronic device 1501, and a second data link (e.g., NDL 5 GHz CH 149+2.4 GHz CH 6) using both frequency bands of 5 GHz and 2.4 GHz as a second communication protocol (e.g., NAN) may be set between the electronic device 101 and the first external electronic device 102.

In operation 2212, the first data link (e.g., AP1 2.4 GHz CH 6) between the electronic device 101 and the fourth external electronic device 1501 may be terminated.

In operation 2213, the electronic device 101 may receive a beacon (e.g., a synchronization beacon) or NAF including available frequency band information (e.g., 6 GHz, 5 GHz, and 2.4 GHz) of the first external electronic device 102 from the first external electronic device 102.

In operation 2214, due to the termination of the first data link (e.g., AP1 2.4 GHz CH 6), the interval of the available frequency band of the electronic device 101 may be changed from 50% use of 5 GHz CH 149+50% use of 2.4 GHz CH 6 to 100% use of 5 GHz, or 100% use of 2.4 GHz. The electronic device 101 may identify at least one available frequency band (e.g., 5 GHz, and 2.4 GHz) that may be used by both the electronic device 101 and the first external electronic device 102 among available frequency bands (e.g., 6 GHz, 5 GHz, and 2.4 GHz) of the first external electronic device 102 and available frequency bands (e.g., 5 GHz, and 2.4 GHz) of the electronic device 101. The electronic device 101 may compare a frequency band (e.g., 5 GHz, and 2.4 GHz) used in the second data link (e.g., NDL 5 GHz CH 149+2.4 GHz CH 6) to an available frequency band (e.g., 5 GHz, and 2.4 GHz) that may be newly used between the electronic device 101 and the first external electronic device 102 according to priorities. An available frequency band (e.g., 5 GHz) having a relatively high priority may be used in an interval of a frequency band (e.g., 2.4 GHz) of the second data link (e.g., NDL 5 GHz CH 149+2.4 GHz CH 6), and accordingly the electronic device 101 may transmit a schedule request (e.g., SCHEDULE REQUEST) including a new available frequency band (e.g., 5 GHz) and/or a channel (e.g., CH 149) (e.g., channel information and/or bandwidth information) of the available frequency band (e.g., 5 GHz) to the first external electronic device 102 in order to use the new available frequency band (e.g., 5 GHz) in a corresponding interval. The first external electronic device 102 may identify the new available frequency band (e.g., 5 GHz) and/or the channel (e.g., CH 149) of the available frequency band (e.g., 5 GHz) included in the schedule request received from the electronic device 101, and may transmit a schedule response (e.g., SCHEDULE RESPONSE), which includes set information on the available frequency band (e.g., 5 GHz) and/or the channel (e.g., CH 149) (e.g., channel information and/or bandwidth information) to set a frequency band of a new data link, to the electronic device 101. The schedule response may include information on an interval in which the available frequency band (e.g., 5 GHz) is used.

In operation 2215, the electronic device 101 and the first external electronic device 102 may change an existing interval corresponding to 2.4 GHz CH 6 in the second data link (e.g., NDL 5 GHz CH 149+2.4 GHz CH 6) to an interval corresponding to the available frequency band (e.g., 5 GHz) and the channel (e.g., CH 149) of the available frequency band (e.g., 5 GHz), and may perform communication via a new third data link (e.g., NDL 5 GHz CH 149).

Figure 22C:
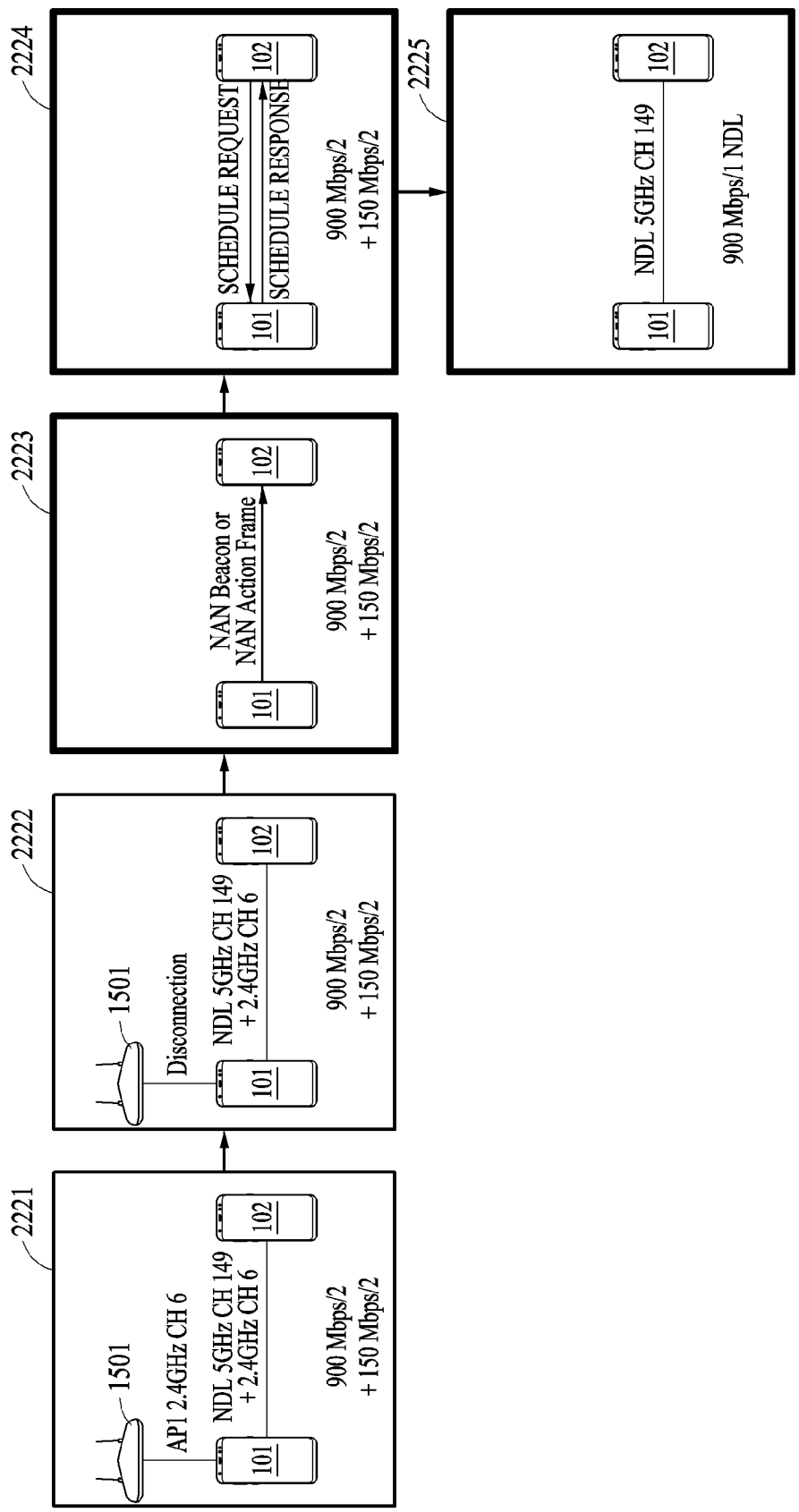
FIG. 22C is a diagram illustrating an example in which the scheduling operation of FIG. 19 is performed according to various embodiments.

FIG. 22C is a diagram illustrating an example in which the scheduling operation of FIG. 19 is performed according to various embodiments.

In FIG. 22C, it may be assumed that the electronic device 101 is a device of the third type (e.g., a device that supports frequency bands of 2.4 GHz and 5 GHz, and does not support an RSDB) and that the first external electronic device 102 is a device of the first type (e.g., a device for supporting frequency bands of 2.4 GHz, 5 GHz, and 6 GHz, and supporting an RSDB).

In operation 2221, a first data link (e.g., AP1 2.4 GHz CH 6) using a frequency band (e.g., 2.4 GHz) as a first communication protocol (e.g., Wi-Fi) may be set between the electronic device 101 and the fourth external electronic device 1501, and a second data link (e.g., NDL 5 GHz CH 149+2.4 GHz CH 6) using both frequency bands of 5 GHz and 2.4 GHz as a second communication protocol (e.g., NAN) may be set between the electronic device 101 and the first external electronic device 102.

In operation 2222, the first data link (e.g., AP1 2.4 GHz CH 6) between the electronic device 101 and the fourth external electronic device 1501 may be terminated.

In operation 2223, due to the termination of the first data link (e.g., AP1 2.4 GHz CH 6), the interval of the available frequency band of the electronic device 101 may be changed from 50% use of 5 GHz CH 149+50% use of 2.4 GHz CH 6 to 100% use of 5 GHz, or 100% use of 2.4 GHz. The electronic device 101 may transmit a beacon (e.g., a synchronization beacon) or NAF including available frequency band information (e.g., 5 GHz, and 2.4 GHz) of the electronic device 101 to the first external electronic device 102.

In operation 2224, the first external electronic device 102 may identify at least one available frequency band (e.g., 5 GHz, and 2.4 GHz) that may be used by both the electronic device 101 and the first external electronic device 102 among available frequency bands (e.g., 6 GHz, 5 GHz, and 2.4 GHz) of the first external electronic device 102 and available frequency bands (e.g., 5 GHz, and 2.4 GHz) of the electronic device 101. The first external electronic device 102 may compare a frequency band (e.g., 5 GHz, and 2.4 GHz) used in the second data link (e.g., NDL 5 GHz CH 149+2.4 GHz CH 6) to an available frequency band (e.g., 5 GHz, and 2.4 GHz) that may be newly used between the electronic device 101 and the first external electronic device 102 according to priorities. An available frequency band (e.g., 5 GHz) having a relatively high priority may be used in an interval of a frequency band (e.g., 2.4 GHz) of the second data link (e.g., NDL 5 GHz CH 149+2.4 GHz CH 6), and accordingly the first external electronic device 102 may transmit a schedule request (e.g., SCHEDULE REQUEST) including a new available frequency band (e.g., 5 GHz) and/or a channel (e.g., CH 149) (e.g., channel information and/or bandwidth information) of the available frequency band (e.g., 5 GHz) to the electronic device 101 in order to use the new available frequency band (e.g., 5 GHz) in a corresponding interval. The electronic device 101 may identify the new available frequency band (e.g., 5 GHz) and/or the channel (e.g., CH 149) of the available frequency band (e.g., 5 GHz) included in the schedule request received from the first external electronic device 102, and may transmit a schedule response (e.g., SCHEDULE RESPONSE), which includes set information on the available frequency band (e.g., 5 GHz) and/or the channel (e.g., CH 149) (e.g., channel information and/or bandwidth information) to set a frequency band of a new data link, to the first external electronic device 102. The schedule response may include information on an interval in which the available frequency band (e.g., 5 GHz) is used.

In operation 2225, the electronic device 101 and the first external electronic device 102 may change an existing interval corresponding to 2.4 GHz CH 6 in the second data link (e.g., NDL 5 GHz CH 149+2.4 GHz CH 6) to an interval corresponding to the available frequency band (e.g., 5 GHz) and the channel (e.g., CH 149) of the available frequency band (e.g., 5 GHz), and may perform communication via a new third data link (e.g., NDL 5 GHz CH 149).

Figure 22D:
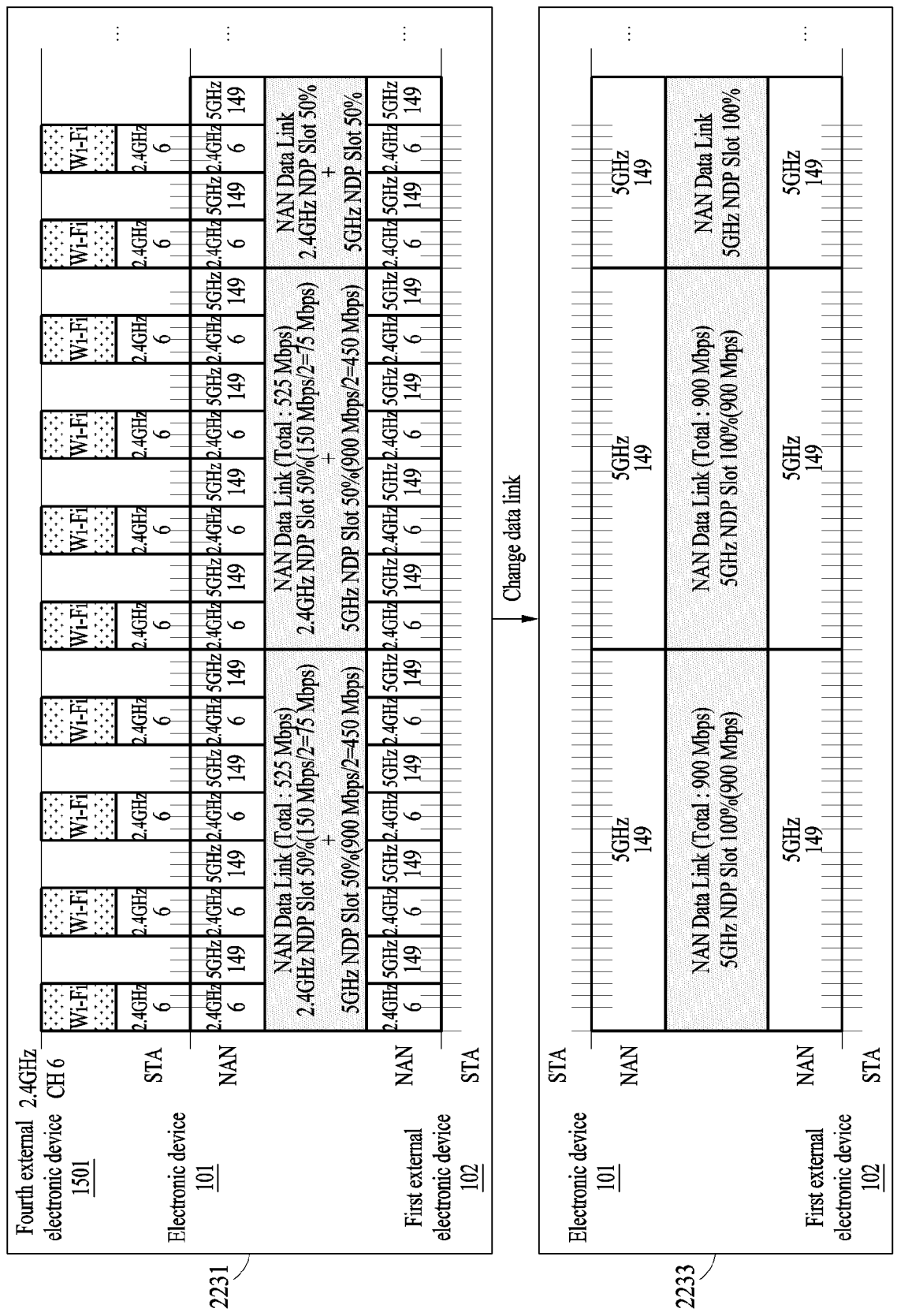
FIG. 22D is a diagram illustrating slot configurations of data links of FIGS. 22A, 22B and 22C according to various embodiments.

FIG. 22D is a diagram illustrating slot configurations of data links of FIGS. 22A, 22B and 22C according to various embodiments.

FIG. 22D illustrates a slot configuration of a data link through an NDL scheduling operation. A first slot configuration 2231 may be a slot configuration of a data link formed when the electronic device 101 and the fourth external electronic device 1501 are connected and when the electronic device 101 and the first external electronic device 102 are connected. A second slot configuration 2233 may be a slot configuration of a data link formed when a schedule for a new data link is set between the electronic device 101 and the first external electronic device 102 due to a termination of the connection of the electronic device 101 and the fourth external electronic device 1501.

Referring to the first slot configuration 2231 of FIG. 22D, when the electronic device 101 is connected to the fourth external electronic device 1501, the electronic device 101 may perform communication (e.g., NAN communication) based on 2.4 GHz CH 6 using a second communication protocol concurrently in a slot (or interval) in which communication (e.g., Wi-Fi communication) is performed based on 2.4 GHz CH 6 using a first communication protocol, and may perform communication (e.g., NAN communication) based on 5 GHz CH 149 using the second communication protocol in a slot (or interval) in which the first communication protocol is not used. The second data link (e.g., NDL 5 GHz CH 149+2.4 GHz CH 6) may use 5 GHz CH 149 for 50% and 2.4 GHz CH 6 for 50%. The maximum performance of the second data link (e.g., NDL 5 GHz CH 149+2.4 GHz CH 6) may be a sum (e.g., about 525 Mbps) performance (e.g., about 450 Mbps) of 5 GHz CH 149 and performance (e.g., about 75 Mbps) of 2.4 GHz CH 6.

Referring to the second slot configuration 2233 of FIG. 22D, due to the termination of the first data link (e.g., AP1 2.4 GHz CH 6), the electronic device 101 may change the interval of the available frequency band of the electronic device 101 from 50% use of 5 GHz CH 149+50% use of 2.4 GHz CH 6 to 100% use of 5 GHz, or 100% use of 2.4 GHz. The electronic device 101 and the first external electronic device 102 may support both NAN 5 GHz and NAN 2.4 GHz. NAN 5 GHz may be superior in performance to NAN 2.4 GHz among frequency bands that may be supported by both the electronic device 101 and the first external electronic device 102, and accordingly NAN 5 GHz may have a higher priority than that of NAN 2.4 GHz. A new scheduling operation may be performed between the electronic device 101 and the first external electronic device 102 so that the existing interval corresponding to 2.4 GHz CH 6 in the second data link (e.g., NDL 5 GHz CH 149+2.4 GHz CH 6) between the electronic device 101 and the first external electronic device 102 may be changed to a NAN 5 GHz frequency band and that the NAN 5 GHz frequency band may be used. The data link between the electronic device 101 and the first external electronic device 102 may be changed to 100% use of 5 GHz CH 149, and actually measured performance of the changed data link may be about 900 Mbps.

Figure 23:
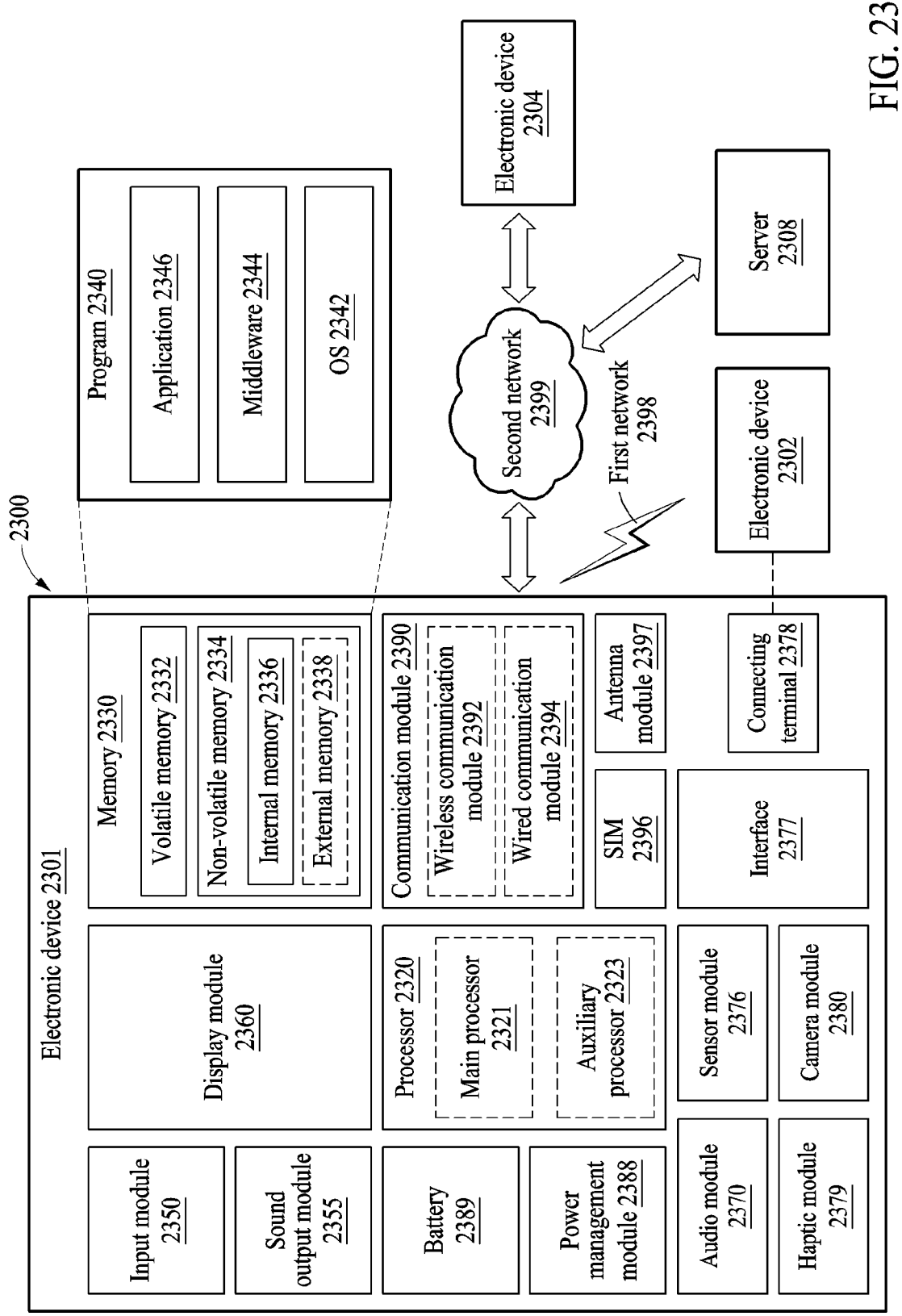
FIG. 23 is a block diagram illustrating an example electronic device in a network environment according to various embodiments.

FIG. 23 is a block diagram illustrating an example electronic device 2301 in a network environment 2300 according to various example embodiments. Referring to FIG. 23, the electronic device 2301 (e.g., the electronic devices 101, 102, 103, or 104 of FIGS. 1 to 22D) in the network environment 2300 may communicate with an electronic device 2302 via a first network 2398 (e.g., a short-range wireless communication network), or communicate with at least one of an electronic device 2304 or a server 2308 via a second network 2399 (e.g., a long-range wireless communication network). According to an example embodiment, the electronic device 2301 may communicate with the electronic device 2304 via the server 2308. According to an example embodiment, the electronic device 2301 may include a processor 2320, a memory 2330, an input module 2350, a sound output module 2355, a display module 2360, an audio module 2370, and a sensor module 2376, an interface 2377, a connecting terminal 2378, a haptic module 2379, a camera module 2380, a power management module 2388, a battery 2389, a communication module 2390, a subscriber identification module (SIM) 2396, or an antenna module 2397. In various example embodiments, at least one of the components (e.g., the connecting terminal 2378) may be omitted from the electronic device 2301, or one or more other components may be added in the electronic device 101. In various example embodiments, some of the components (e.g., the sensor module 2376, the camera module 2380, or the antenna module 2397) may be integrated as a single component (e.g., the display module 2360).

The processor 2320 may execute, for example, software (e.g., a program 2340) to control at least one other component (e.g., a hardware or software component) of the electronic device 2301 connected to the processor 2320, and may perform various data processing or computation. According to an example embodiment, as at least a part of data processing or computation, the processor 2320 may store a command or data received from another component (e.g., the sensor module 2376 or the communication module 2390) in a volatile memory 2332, process the command or the data stored in the volatile memory 2332, and store resulting data in a non-volatile memory 2334. According to an example embodiment, the processor 2320 may include a main processor 2321 (e.g., a central processing unit (CPU) or an application processor (AP)), or an auxiliary processor 2323 (e.g., a graphics processing unit (GPU), a neural processing unit (NPU), an image signal processor (ISP), a sensor hub processor, or a communication processor (CP)) that is operable independently from, or in conjunction with the main processor 2321. For example, when the electronic device 2301 includes the main processor 2321 and the auxiliary processor 2323, the auxiliary processor 2323 may be adapted to consume less power than the main processor 2321 or to be specific to a specified function. The auxiliary processor 2323 may be implemented separately from the main processor 2321 or as a part of the main processor 2321.

The auxiliary processor 2323 may control at least some of functions or states related to at least one (e.g., the display module 2360, the sensor module 2376, or the communication module 2390) of the components of the electronic device 2301, instead of the main processor 2321 while the main processor 2321 is in an inactive (e.g., sleep) state or along with the main processor 2321 while the main processor 2321 is an active state (e.g., executing an application). According to an example embodiment, the auxiliary processor 2323 (e.g., an ISP or a CP) may be implemented as a portion of another component (e.g., the camera module 2380 or the communication module 2390) that is functionally related to the auxiliary processor 2323. According to an example embodiment, the auxiliary processor 2323 (e.g., an NPU) may include a hardware structure specified for artificial intelligence model processing. An artificial intelligence model may be generated by machine learning. Such learning may be performed by, for example, the electronic device 2301 in which artificial intelligence is performed, or performed via a separate server (e.g., the server 2308). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 2330 may store various data used by at least one component (e.g., the processor 2320 or the sensor module 2376) of the electronic device 2301. The various data may include, for example, software (e.g., the program 2340) and input data or output data for a command related thereto. The memory 2330 may include the volatile memory 2332 or the non-volatile memory 2334.

The program 2340 may be stored as software in the memory 2330, and may include, for example, an operating system (OS) 2342, middleware 2344, or an application 2346.

The input module 2350 may receive a command or data to be used by another component (e.g., the processor 2320) of the electronic device 2301, from the outside (e.g., a user) of the electronic device 2301. The input module 2350 may include, for example, a microphone, a mouse, a keyboard, a key (e.g., a button), or a digital pen (e.g., a stylus pen).

The sound output module 2355 may output a sound signal to the outside of the electronic device 2301. The sound output module 2355 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 2360 may visually provide information to the outside (e.g., a user) of the electronic device 2301. The display module 2360 may include, for example, a control circuit for controlling a display, a hologram device, or a projector and control circuitry to control a corresponding one of the display, the hologram device, and the projector. According to an example embodiment, the display module 2360 may include a touch sensor adapted to detect a touch, or a pressure sensor adapted to measure the intensity of force incurred by the touch.

The audio module 2370 may convert a sound into an electric signal or vice versa. According to an example embodiment, the audio module 2370 may obtain the sound via the input module 2350 or output the sound via the sound output module 2355 or an external electronic device (e.g., the electronic device 2302 such as a speaker or a headphone) directly or wirelessly connected to the electronic device 2301.

The sensor module 2376 may detect an operational state (e.g., power or temperature) of the electronic device 2301 or an environmental state (e.g., a state of a user) external to the electronic device 2301, and generate an electrical signal or data value corresponding to the detected state. According to an example embodiment, the sensor module 2376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2377 may support one or more specified protocols to be used for the electronic device 2301 to be coupled with the external electronic device (e.g., the electronic device 2302) directly (e.g., wiredly) or wirelessly. According to an example embodiment, the interface 2377 may include, for example, a high-definition multimedia interface (HDMI), a universal serial bus (USB) interface, a secure digital (SD) card interface, or an audio interface.

The connecting terminal 2378 may include a connector via which the electronic device 2301 may be physically connected to an external electronic device (e.g., the electronic device 2302). According to an example embodiment, the connecting terminal 2378 may include, for example, an HDMI connector, a USB connector, an SD card connector, or an audio connector (e.g., a headphone connector).

The haptic module 2379 may convert an electric signal into a mechanical stimulus (e.g., a vibration or a movement) or an electrical stimulus which may be recognized by a user via his or her tactile sensation or kinesthetic sensation. According to an example embodiment, the haptic module 2379 may include, for example, a motor, a piezoelectric element, or an electric stimulator.

The camera module 2380 may capture a still image and moving images. According to an example embodiment, the camera module 2380 may include one or more lenses, image sensors, image signal processors, or flashes.

The power management module 2388 may manage power supplied to the electronic device 2301. According to an example embodiment, the power management module 2388 may be implemented as, for example, at least a part of a power management integrated circuit (PMIC).

The battery 2389 may supply power to at least one component of the electronic device 2301. According to an example embodiment, the battery 2389 may include, for example, a primary cell which is not rechargeable, a secondary cell which is rechargeable, or a fuel cell.

The communication module 2390 may support establishing a direct (e.g., wired) communication channel or a wireless communication channel between the electronic device 2301 and the external electronic device (e.g., the electronic device 2302, the electronic device 2304, or the server 2308) and performing communication via the established communication channel. The communication module 2390 may include one or more communication processors that are operable independently of the processor 2320 (e.g., an AP) and that support a direct (e.g., wired) communication or a wireless communication. According to an example embodiment, the communication module 2390 may include a wireless communication module 2392 (e.g., a cellular communication module, a short-range wireless communication module, or a global navigation satellite system (GNSS) communication module) or a wired communication module 2394 (e.g., a local area network (LAN) communication module, or a power line communication (PLC) module). A corresponding one of these communication modules may communicate with the external electronic device 2304 via the first network 2398 (e.g., a short-range communication network, such as Bluetooth™, wireless-fidelity (Wi-Fi) direct, or infrared data association (IrDA)) or the second network 2399 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multi components (e.g., multi chips) separate from each other. The wireless communication module 2392 may identify and authenticate the electronic device 2301 in a communication network, such as the first network 2398 or the second network 2399, using subscriber information (e.g., international mobile subscriber identity (IMSI)) stored in the SIM 2396. The wireless communication module 2392 may support a first communication protocol (e.g., Wi-Fi) and a second communication protocol (e.g., NAN). The first communication protocol may support a communication operation other than the NAN communication operation, and the second communication protocol may support the NAN communication operation.

The wireless communication module 2392 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2392 may support a high-frequency band (e.g., a mmWave band) to achieve, e.g., a high data transmission rate. The wireless communication module 2392 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 2392 may support various requirements specified in the electronic device 2301, an external electronic device (e.g., the electronic device 2304), or a network system (e.g., the second network 2399). According to an example embodiment, the wireless communication module 2392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2397 may transmit or receive a signal or power to or from the outside (e.g., the external electronic device) of the electronic device 101. According to an example embodiment, the antenna module 2397 may include an antenna including a radiating element including a conductive material or a conductive pattern formed in or on a substrate (e.g., a printed circuit board (PCB)). According to an example embodiment, the antenna module 2397 may include a plurality of antennas (e.g., array antennas). In such a case, at least one antenna appropriate for a communication scheme used in a communication network, such as the first network 2398 or the second network 2399, may be selected by, for example, the communication module 2390 from the plurality of antennas. The signal or the power may be transmitted or received between the communication module 2390 and the external electronic device via the at least one selected antenna. According to an example embodiment, another component (e.g., a radio frequency integrated circuit (RFIC)) other than the radiating element may be additionally formed as a part of the antenna module 2397.

According to various example embodiments, the antenna module 2397 may form a mmWave antenna module. According to an example embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 2301 and the external electronic device 2304 via the server 2308 coupled with the second network 2399. Each of the external electronic devices 2302 or 2304 may be a device of the same type as or a different type from the electronic device 2301. According to an example embodiment, all or some of operations to be executed by the electronic device 2301 may be executed at one or more external electronic devices (e.g., the external devices 2302 and 2304, and the server 2308). For example, if the electronic device 2301 needs to perform a function or a service automatically, or in response to a request from a user or another device, the electronic device 2301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 2301. The electronic device 2301 may provide the outcome, with or without further processing of the outcome, as at least part of a reply to the request. To that end, a cloud computing, distributed computing, mobile edge computing (MEC), or client-server computing technology may be used, for example. The electronic device 2301 may provide ultra low-latency services using, e.g., distributed computing or mobile edge computing. In an example embodiment, the external electronic device 2304 may include an Internet-of-things (IoT) device. The server 2308 may be an intelligent server using machine learning and/or a neural network. According to an example embodiment, the external electronic device 2304 or the server 2308 may be included in the second network 2399. The electronic device 2301 may be applied to intelligent services (e.g., smart home, smart city, smart car, or healthcare) based on 5G communication technology or IoT-related technology.

The electronic devices according to various example embodiments may be various types of electronic devices. The electronic device may include, for example, a portable communication device (e.g., a smartphone), a computer device, a portable multimedia device, a portable medical device, a camera, a wearable device, a home appliance device, or the like. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 2340) including one or more instructions that are stored in a storage medium (e.g., the internal memory 2336 or the external memory 2338) that is readable by a machine (e.g., the electronic device 2301) For example, a processor (e.g., the processor 2320) of the machine (e.g., the electronic device 2301) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

An electronic device (e.g., the electronic device 2301 of FIG. 23) according to various example embodiments may include: at least one wireless communication module (e.g., the wireless communication module 2392 of FIG. 23) comprising wireless communication circuitry configured to support a first communication protocol and a second communication protocol, at least one processor (e.g., the processor 2320 of FIG. 23) operatively connected to the wireless communication module, and a memory (e.g., the memory 2330 of FIG. 23) electrically connected to the processor and configured to store instructions executable by the processor. When the instructions are executed by the processor, the processor may be configured to: using the wireless communication module, set a schedule for a first data link that uses a first frequency band as the second communication protocol with a first external electronic device (e.g., operation 710 of FIG. 7), set a schedule for a second data link that uses a second frequency band as the second communication protocol with a second external electronic device (e.g., operation 720 of FIG. 7), and change the second data link to a third data link that uses a third frequency band and perform communication with the second external electronic device based on the third frequency band being available due to a termination of the first data link (e.g., operation 730 of FIG. 7).

According to various example embodiments, the first communication protocol may support a communication operation other than a neighbor awareness networking (NAN) communication operation, and the second communication protocol may support a NAN communication operation.

According to various example embodiments, the third frequency band may include an available frequency band having a higher priority than that of the second frequency band among one or more available frequency bands available by both the electronic device and the second external electronic device.

According to various example embodiments, at least one of information on the third frequency band and an available frequency band available by the electronic device may be included in at least one of a NAN availability attribute and an unaligned schedule attribute.

According to various example embodiments, the processor may be configured to control the electronic device to transmit, to the second external electronic device, a schedule request including information on an available frequency band available by the electronic device for setting a schedule for the third data link in response to the termination of the first data link.

According to various example embodiments, the processor may be configured to: obtain information on an available frequency band available by the second external electronic device from the second external electronic device, select an available frequency band having a higher priority than a priority of the second frequency band from among one or more available frequency bands available by both the electronic device and the second external electronic device, based on the information on the available frequency band, and control the electronic device to transmit a schedule request including information on the available frequency band having the higher priority than the priority of the second frequency band to the second external electronic device.

According to various example embodiments, the processor may be configured to control the electronic device to: transmit information on an available frequency band available by the electronic device to the second external electronic device, in response to the termination of the first data link, and receive a schedule request including information on an available frequency band having a higher priority than the priority of the second frequency band among one or more available frequency bands available by both the electronic device and the second external electronic device from the second external electronic device.

According to various example embodiments, the processor may be configured to control the electronic device to receive at least one of a beacon and a NAN action frame (NAF) including information on the available frequency band available by the second external electronic device from the second external electronic device.

According to various example embodiments, the processor may be configured to: include the information on the available frequency band available by the electronic device in at least one of a beacon and a NAF and transmit at least one of the beacon and the NAF including the information on the available frequency band available by the electronic device to the second external electronic device.

An electronic device (e.g., the electronic device 2301 of FIG. 23) according to various example embodiments may include at least one wireless communication module (e.g., the wireless communication module 2392 of FIG. 23) comprising wireless communication circuitry configured to support a first communication protocol and a second communication protocol, at least one processor (e.g., the processor 2320 of FIG. 23) operatively connected to the wireless communication module, and a memory (e.g., the memory 2330 of FIG. 23) electrically connected to the processor and configured to store instructions executable by the processor. When the instructions are executed by the processor, the processor may be configured to: using the wireless communication module, set a schedule for a first data link that uses a first frequency band as the first communication protocol with a first external electronic device (e.g., operation 1610 of FIG. 16), set a schedule for a second data link that uses both the first frequency band and a second frequency band as the second communication protocol with a second external electronic device (e.g., operation 1620 of FIG. 16), and change the second data link to a third data link that uses an interval of a frequency band having a lower priority between the first frequency band and the second frequency band as an interval of a third frequency band and perform communication with the second external electronic device, based on an interval of a frequency band used in the second data link being changeable due to a termination of the first data link (e.g., operation 1630 of FIG. 16).

According to various example embodiments, the first communication protocol may support a communication operation other than a neighbor aware networking (NAN) communication operation, and the second communication protocol may support a NAN communication operation.

According to various example embodiments, the third frequency band may be an available frequency band having a higher priority than a priority of a frequency band used in the second data link among one or more available frequency bands available by both the electronic device and the second external electronic device.

According to various example embodiments, at least one of information on the third frequency band and an available frequency band available by the electronic device may be included in at least one of a NAN availability attribute and an unaligned schedule attribute.

According to various example embodiments, the processor may be configured to control the electronic device to transmit, to the second external electronic device, a schedule request including information on an available frequency band available by the electronic device for setting a schedule for the third data link in response to the termination of the first data link.

According to various example embodiments, the processor may be configured to: obtain information on an available frequency band available by the second external electronic device from the second external electronic device, select an available frequency band having a higher priority than a priority of a frequency band used in the second data link from among one or more available frequency bands available by both the electronic device and the second external electronic device, based on the information on the available frequency band, and control the electronic device to transmit a schedule request including information on the available frequency band having the higher priority than that of the frequency band used in the second data link to the second external electronic device.

According to various example embodiments, the processor may be configured to control the electronic device to: transmit information on an available frequency band available by the electronic device to the second external electronic device, in response to the termination of the first data link, and receive a schedule request including information on an available frequency band having a higher priority than a priority of a frequency band used in the second data link among one or more available frequency bands available by both the electronic device and the second external electronic device from the second external electronic device.

According to various example embodiments, the processor may be configured to receive at least one of a beacon and a NAF including information on the available frequency band available by the second external electronic device from the second external electronic device.

According to various example embodiments, the processor may be configured to include the information on the available frequency band available by the electronic device in at least one of a beacon and a NAN action frame (NAF) and transmit at least one of the beacon and the NAF including the information on the available frequency band available by the electronic device to the second external electronic device.

A method of operating an electronic device (e.g., the electronic device 2301 of FIG. 23) according to various example embodiments may include: (e.g., operation 710 of FIG. 7) setting a schedule for a first data link that uses a first frequency band as a second communication protocol with a first external electronic device, (e.g., operation 720 of FIG. 7) setting a schedule for a second data link that uses a second frequency band as the second communication protocol with a second external electronic device, and (e.g., operation 730 of FIG. 7) changing the second data link to a third data link that uses a third frequency band and performing communication with the second external electronic device based on the third frequency band being available due to a termination of the first data link.

An electronic device (e.g., the electronic device 2301 of FIG. 23) according to various example embodiments may include at least one wireless communication module (e.g., the wireless communication module 2392 of FIG. 23) comprising wireless communication circuitry configured to support a first communication protocol and a second communication protocol, at least one processor (e.g., the processor 2320 of FIG. 23) operatively connected to the wireless communication module, and a memory (e.g., the memory 2330 of FIG. 23) electrically connected to the processor and configured to store instructions executable by the processor. When the instructions are executed by the processor, the processor may be configured to: using the wireless communication module, set a schedule for a first data link that uses a first frequency band as the first communication protocol with a first external electronic device (e.g., operation 710 of FIG. 7), set a schedule for a second data link that uses a second frequency band as the second communication protocol with a second external electronic device (e.g., operation 720 of FIG. 7), and change the second data link to a third data link that uses a third frequency band and perform communication with the second external electronic device based on the third frequency band being available due to a termination of the first data link (e.g., operation 730 of FIG. 7).

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
at least one wireless communication module comprising wireless communication circuitry;
at least one processor, comprising processor circuitry, operatively connected to the wireless communication module; and
a memory electrically connected to the at least one processor and configured to store instructions executable by the processor,
wherein when the instructions are executed by the at least one processor, the at least one processor is configured, using the wireless communication module, to:
set a schedule for a first data link that uses a first frequency band with a first external electronic device;
set a schedule for a second data link that uses a second frequency band with a second external electronic device; and
change the second data link to a third data link that uses a third frequency band and perform communication with the second external electronic device, based on the third frequency band being available due to a termination of a connection on the first data link.

2. The electronic device of claim 1, wherein
one of the first data link and the second data link uses a first communication protocol and the other of the first data link and the second data link uses a second communication protocol;
the first communication protocol supports a communication operation other than a neighbor awareness networking (NAN) communication operation, and
the second communication protocol supports the NAN communication operation.

3. The electronic device of claim 1, wherein the third frequency band is an available frequency band having a higher priority than a priority of the second frequency band among one or more available frequency bands available by both the electronic device and the second external electronic device.

4. The electronica device of claim 3, wherein at least one of information on the third frequency band and an available frequency band available by the electronic device is included in at least one of a neighbor awareness networking (NAN) availability attribute and an unaligned schedule attribute.

5. The electronic device of claim 1, wherein the at least one processor is configured to control the electronic device to transmit, to the second external electronic device, a schedule request including information on an available frequency band available by the electronic device for setting a schedule for the third data link in response to the termination of the connection on the first data link.

6. The electronic device of claim 1, wherein the at least one processor is configured to:
obtain information on an available frequency band available by the second external electronic device from the second external electronic device;
select an available frequency band having a higher priority than a priority of the second frequency band from among one or more available frequency bands available by both the electronic device and the second external electronic device, based on the information on the available frequency band; and
control the electronic device to transmit a schedule request including information on the available frequency band having the higher priority than that of the second frequency band to the second external electronic device.

7. The electronic device of claim 6, wherein the at least one processor is configured to receive at least one of a beacon and a neighbor awareness networking (NAN) action frame (NAF) including information on the available frequency band available by the second external electronic device from the second external electronic device.

8. The electronic device of claim 1, wherein the at least one processor is configured to:
control the electronic device to transmit information on an available frequency band available by the electronic device to the second external electronic device, in response to the termination of the connection on the first data link; and
control the electronic device to receive a schedule request including information on an available frequency band having a higher priority than a priority of the second frequency band among one or more available frequency bands available by both the electronic device and the second external electronic device from the second external electronic device.

9. The electronic device of claim 8, wherein the at least one processor is configured to: include the information on the available frequency band available by the electronic device in at least one of a beacon and a NAF and control the electronic device to transmit at least one of the beacon and the NAF including the information on the available frequency band available by the electronic device to the second external electronic device.

10. An electronic device, comprising:
at least one wireless communication module comprising wireless communication circuitry;
at least one processor comprising processor circuitry operatively connected to the wireless communication module; and a memory electrically connected to the at least one processor and configured to store instructions executable by the processor, wherein when the instructions are executed by the at least one processor, the at least one processor is configured, using the wireless communication module, to:

set a schedule for a first data link that uses a first frequency band with a first external electronic device;

set a schedule for a second data link that uses both the first frequency band and a second frequency band with a second external electronic device; and change the second data link to a third data link that uses an interval of a frequency band having a lower priority between the first frequency band and the second frequency band as an interval of a third frequency band, and perform communication with the second external electronic device, based on an interval of a frequency band used in the second data link being changeable due to a termination of a connection on the first data link.

11. The electronic device of claim 10, wherein one of the first data link and the second data link uses a first communication protocol and the other of the first data link and the second data link uses a second communication protocol;

the first communication protocol supports a communication operation other than a neighbor awareness networking (NAN) communication operation, and the second communication protocol supports the NAN communication operation.

12. The electronic device of claim 10, wherein the third frequency band is an available frequency band having a higher priority than a priority of a frequency band used in the second data link among one or more available frequency bands available by both the electronic device and the second external electronic device.

13. The electronic device of claim 12, wherein at least one of information on the third frequency band and an available frequency band available by the electronic device is included in at least one of a neighbor awareness networking (NAN) availability attribute and an unaligned schedule attribute.

14. The electronic device of claim 10, wherein the at least one processor is configured to control the electronic device to transmit a schedule request including information on an available frequency band available by the electronic device for setting a schedule of the third data link to the second external electronic device, in response to the termination of the connection on the first data link.

15. The electronic device of claim 10, wherein the at least one processor is configured to:

obtain information on an available frequency band available by the second external electronic device from the second external electronic device;

select an available frequency band having a higher priority than a priority of a frequency band used in the second data link from among one or more available frequency bands available by both the electronic device and the second external electronic device, based on the information on the available frequency band; and control the electronic device to transmit a schedule request including information on the available frequency band having the higher priority than the priority of the frequency band used in the second data link to the second external electronic device.

16. The electronic device of claim 15, wherein the at least one processor is configured to control the electronic device to receive at least one of a beacon and a neighbor awareness networking (NAN) action frame (NAF) including information on the available frequency band available by the second external electronic device from the second external electronic device.

17. The electronic device of claim 10, wherein the at least one processor is configured to:

control the electronic device to transmit information on an available frequency band available by the electronic device to the second external electronic device, in response to the termination of the connection on the first data link; and control the electronic device to receive a schedule request including information on an available frequency band having a higher priority than a priority of a frequency band used in the second data link among one or more available frequency bands available by both the electronic device and the second external electronic device from the second external electronic device.

18. The electronic device of claim 17, wherein the at least one processor is configured to: include the information on the available frequency band available by the electronic device in at least one of a beacon and a neighbor awareness networking (NAF) and control the electronic device to transmit at least one of the beacon and the NAF including the information on the available frequency band available by the electronic device to the second external electronic device.

19. A method of operating an electronic device, the method comprising:

setting a schedule for a first data link that uses a first frequency band with a first external electronic device;

setting a schedule for a second data link that uses a second frequency band with a second external electronic device; and changing the second data link to a third data link that uses a third frequency band and performing communication with the second external electronic device, based on the third frequency band being available due to a termination of a connection on the first data link.

* * * * *